US011882223B2

(12) United States Patent
Van Duren et al.

(10) Patent No.: US 11,882,223 B2
(45) Date of Patent: Jan. 23, 2024

(54) METHODS OF USING CERTIFICATE-BASED SECURITY WITH DRONE IDENTITY AND BROADCASTING

(71) Applicant: QUALCOMM Incorporated, San Diego, CA (US)

(72) Inventors: Drew Foster Van Duren, Templeton, CA (US); Stefano Faccin, San Ysidro, CA (US); William Whyte, Belmont, MA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 17/241,127

(22) Filed: Apr. 27, 2021

(65) Prior Publication Data

US 2021/0336797 A1 Oct. 28, 2021

Related U.S. Application Data

(60) Provisional application No. 63/016,780, filed on Apr. 28, 2020.

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/3263* (2013.01); *H04L 9/3297* (2013.01)

(58) Field of Classification Search
None
See application file for complete search history.

(56) References Cited

U.S. PATENT DOCUMENTS 8,694,782 B2 * 4/2014 Lambert ............... H04L 9/0844
713/168
9,663,226 B2   5/2017 Canavor et al.
(Continued)

FOREIGN PATENT DOCUMENTS

CN          101917273 A      12/2010
EP            3338473 B1 *   10/2021 ......... H04L 63/0492

OTHER PUBLICATIONS

ETSI TS 102 867: "Intelligent Transport Systems (ITS); Security; Stage 3 Mapping for IEEE 1609.2", V1.1.1 (Jun. 2012), ETSI Draft, V1.1.1 (May 23, 2012), pp. 1-26.
(Continued)

*Primary Examiner* — Jeffrey C Pwu
*Assistant Examiner* — Mayasa A. Shaawat
(74) *Attorney, Agent, or Firm* — The Marbury Law Group/Qualcomm Incorporated

(57) ABSTRACT

Various embodiments enable broadcast communications security. Various embodiments enable the authentication of broadcast communications. Various embodiments may enable asymmetric authentication and integrity protection of small size messages, such as one or more signed messages totaling a length of 250 bytes or less. Various embodiments may support cryptographic signing of beacon type messages using certificates. Various embodiments may include generating a beacon type message, cryptographically signing the beacon type message at least in part using a certificate to generate a signed beacon message, and sending the signed beacon type message in one or more broadcast transmissions in conjunction with, or independently of, certificate information used to verify the signed beacon message.

44 Claims, 23 Drawing Sheets

(56) References Cited

U.S. PATENT DOCUMENTS

| | | | |
|---|---|---|---|
| 10,149,159 B1* | 12/2018 | Perfitt | H04L 9/3265 |
| 10,946,960 B2* | 3/2021 | Van Niekerk | B64C 39/024 |
| 2014/0215594 A1* | 7/2014 | Lambert | H04W 12/50 |
| | | | 726/7 |
| 2019/0156380 A1* | 5/2019 | Bonnell | G06Q 50/32 |
| 2019/0312738 A1 | 10/2019 | Barrett et al. | |
| 2021/0314748 A1* | 10/2021 | Cominetti | H04L 9/3247 |

OTHER PUBLICATIONS

"IEEE Standard for Wireless Access in Vehicular Environments—Security Services for Applications and Management Messages", IEEE Std 1609.2-2016 (Revision of IEEE Std 1609.2-2013), IEEE Vehicular Technology Society, IEEE Standard, IEEE, Piscataway, NJ, USA, Mar. 2016 (Mar. 2016), 240 pages, XP068106437, ISBN: 978-1-5044-0767-0 section 5.1 section 5.2 section 5.3 section 6.3 section 6.4 appendix D.

Anonymous: "Open Drone ID Bluetooth Broadcast Specification v 0.64.3", Nov. 8, 2018 (Nov. 8, 2018), pp. 1-12, XP055822035, Retrieved from the Internet: URL: https://github.com/opendroneid/specs/raw/master/OpenDroneID_Bluetooth_0.64.3.pdf [retrieved on Jul. 7, 2021] section 3 section 6.

Anonymous: "Open Drone ID Message Specification v 0.64.3", Mar. 3, 2019 (Mar. 3, 2019), pp. 1-13, XP055822039, Retrieved from the Internet: URL:https://github.com/opendroneid/specs/raw/master/OpenDroneID_Message_0.64.3.pdf [retrieved on Jul. 7, 2021] section 3.

International Search Report and Written Opinion—PCT/US2021/029562—ISA/EPO—dated Jul. 15, 2021 16 pages.

* cited by examiner

AUTHENTICATION DATA/SIGNATURE

| PDU Name/Identifier | Value | Typereference | Built-in Type | Default Value | Constraints |
|---|---|---|---|---|---|
| ∨ ⚙ TestIeee1609Dot2Data | | TestIeee1609Do... | SEQUENCE | | (3,3) |
| ⊚ protocolVersion | 3 | | INTEGER | | |
| ⊚ content | signedData | | CHOICE | | |
| ∨ ⚙ signedData | | Ieee1609Dot2C... | SEQUENCE | | |
| ⊚ hashId | sha256 | | SignedData | | |
| ∨ ⚙ tbsData | | HashAlgorithm | ENUMERATED | | |
| ∨ ⚙ payload | | ToBeSignedData | SEQUENCE | | |
| ∨ ☑ ⚙ data | | SignedDataPayl... | SEQUENCE | | |
| ⊚ protocolVersion | 3 | Ieee1609Dot2D... | SEQUENCE | | (3,3) |
| ⊚ content | unsecuredData | | INTEGER | | |
| ∨ ⚙ unsecuredData | '1234567890123456789012345678901234567890123456789012345678901234567890H | | CHOICE | | |
| ☐ extDataHash | | Opaque | OCTET STRING | | |
| ∨ ⚙ headerInfo | | HashedData | CHOICE | | |
| ⊚ psid | 1 | HeaderInfo | SEQUENCE | | |
| ☐ ⊚ ⚙ generationTime | | Psid | INTEGER | | (0..MAX) |
| ☐ ⊚ ⚙ expiryTime | | Time64 | INTEGER | | (0..18446744073709551615) |
| ☐ ⊚ ⚙ generationLocation | | Time64 | INTEGER | | (0..18446744073709551615) |
| ☐ ⊚ ⚙ p2pcdLearningRequest | | ThreeDLocation | SEQUENCE | | |
| ☐ ⊚ ⚙ missingCrlIdentifier | | HashedId3 | OCTET STRING | | (SIZE(3)) |
| ☐ ⊚ ⚙ encryptionKey | | MissingCrlIdenti... | SEQUENCE | | |
| ☐ ⊚ ⚙ inlineP2pcdRequest | | EncryptionKey | CHOICE | | |
| ☐ ⊚ ⚙ requestedCertificate | | SequenceOfHas... | SEQUENCE OF | | |
| ☐ ⊚ ⚙ pduFunctionalType | | Certificate | SEQUENCE | | |
| ☐ ⊚ ⚙ ccsaOriginatingExtension | | PduFunctionalTy... | INTEGER | | (0..255) |
| ☐ ⊚ ⚙ etsiOriginatingExtension | | | SEQUENCE OF | | SIZE(1..MAX) |
| ☐ ⊚ ⚙ ieeeOriginatingExtension | | | SEQUENCE OF | | SIZE(1..MAX) |
| ☐ ⊚ ⚙ isoOriginatingExtension | | | SEQUENCE OF | | SIZE(1..MAX) |
| ∨ ⚙ signer | digest | | CHOICE | | |
| ⊚ digest | '0000000000000000H | SignerIdentifier | OCTET STRING | | |
| ∨ ⚙ signature | ecdsaNistP256Signature | HashedId8 | CHOICE | | (SIZE(8)) |
| ∨ ⚙ ecdsaNistP256Signature | | Signature | SEQUENCE | | |
| ⊚ rSig | x-only | EcdsaP256Signa... | CHOICE | | |
| ⊚ sSig | '0000000000000000000000000000000000000000000000000000000000000000H | EccP256CurvePo... | OCTET STRING | | (SIZE(32)) |

FIG. 12C

METHODS OF USING CERTIFICATE-BASED SECURITY WITH DRONE IDENTITY AND BROADCASTING

RELATED APPLICATIONS

This application claims the benefit of priority to U.S. Provisional Application No. 63/016,780, entitled "Methods Of Using Certificate-Based Security With Drone Identity And Broadcasting" filed Apr. 28, 2020, the entire contents of which are hereby incorporated herein by reference for all purposes.

BACKGROUND

Improvements to today's communication systems have facilitated the emergence of many different types of devices that can benefit from secure communications, such as robotic vehicles (e.g., unmanned aerial systems (UASs), unmanned aerial vehicles (UAVs), autonomous cars, etc.), Internet of Things (IOT) devices, etc. While many devices may benefit from secure communications, constraints associated with some devices, such as message size constraints, communication channel bandwidth constraints, connection unreliability, etc., have previously hindered the use of certificate-based security in communications of such constrained devices.

SUMMARY

Various aspects enable broadcast communications security. Various aspects enable the authentication of broadcast communications. Various aspects may enable asymmetric, cryptographic authentication and integrity protection of small messages, such as one or more signed messages totaling a length of 250 bytes or less. Various aspects may support the cryptographic signing of beacon type messages using certificates. Various aspects may include methods for providing broadcast communications security performed by a processor of a device, such as a wireless device (e.g., an unmanned aerial system (UAS), Internet of Things (IoT) device, broadcast receiver, user equipment (UE), an autonomous vehicle, or a semi-autonomous vehicle, a robot, a roadside infrastructure device etc.). Various aspects may include generating a beacon type message, cryptographically signing the beacon type message at least in part using a certificate to generate a signed beacon message, and sending the signed beacon type message in one or more broadcast transmissions from the device. Various aspects may include generating a beacon type message, cryptographically signing the beacon type message at least in part using a certificate to generate a signed beacon message, and sending the signed beacon type message in one or more broadcast transmissions from the device. In some aspects, the sending of the signed beacon type message in one or more broadcast transmissions from the device may be in conjunction with, or independent of, certificate information used to verify the signed beacon message.

In some aspects, cryptographically signing the beacon type message at least in part using the certificate's private key to generate the signed beacon type message may include generating a message payload, generating a digital signature using at least in part the certificate and a private key of the device, the private key corresponding to a public key of the device associated with the certificate, generating a certificate identifying hash of the certificate, and embedding the message payload, the digital signature, and the certificate identifying hash in the beacon type message to generate the signed beacon type message.

In some aspects, the message payload may include a device message, and generating the digital signature using at least in part the certificate's private key may include determining a signing timestamp, generating a hash of the certificate, combining the device message, the signing timestamp, and the hash of the certificate to form a header and to-be-authenticated payload, and generating the digital signature using at least in part the to-be-authenticated payload and the private key. Generating the certificate identifying hash of the certificate may include selecting a subset or entirety of the hash of the certificate to be the certificate identifying hash, and embedding the message payload, the digital signature, and the certificate identifying hash in the beacon type message to generate the signed beacon type message may include embedding the message payload, the signing timestamp, the digital signature, and the certificate identifying hash in the beacon type message to generate the signed beacon type message. In some aspects, the signing timestamp may be included in a header of the signed beacon message in addition to, or instead of, being in a payload of the signed beacon type message. In some aspects, the byte portion may be a least or most significant eight, sixteen or twenty-four bytes of the hash of the certificate. In some aspects, the byte portion may be the full hash of the certificate or less than the full hash of the certificate.

In some aspects, generating the message payload may include determining a signing timestamp, determining a message set of one or more device messages, generating a hash of a combination of the message set and the signing timestamp, selecting a first byte portion of the hash of the combination of the message set and the signing timestamp as the message payload, generating the digital signature using at least in part the certificate and the private key may include generating the digital signature using at least in part the first byte portion, the certificate, and the private key, generating the certificate identifying hash of the certificate may include generating a hash of the certificate, and selecting a second byte portion of the hash of the certificate to be the certificate identifying hash, and embedding the message payload, the digital signature, and the certificate identifying hash in the beacon type message to generate the signed beacon type message may include embedding the message payload, the signing timestamp, the digital signature, and the certificate identifying hash in the beacon type message to generate the signed beacon type message.

In some aspects, the first byte portion may be a most or least significant twelve, sixteen or twenty-four bytes of the hash of the combination of the message set and the signing timestamp, and the second byte portion may be an appended hash of the certificate or a subset thereof. In some aspects, the first byte portion may be a full or partial output of the hash of the combination of the message or message set and the signing timestamp and the second byte portion may be a subset or complete hash of the certificate.

In some aspects, the signed beacon type message may further include the certificate or the certificate may be included in a different signed beacon type message. Various aspects may further include generating a second beacon type message including the certificate, and sending the second beacon type message in another one or more broadcast transmissions from the device. In some aspects, the beacon type messages may be Bluetooth beacon frames. In some aspects, the Bluetooth beacon frames may be small Bluetooth 4 beacon frames or Bluetooth 5 extended advertisements. In some aspects, the beacon type messages may be Wi-Fi beacon frames. In some aspects, the Wi-Fi beacon frames may be Wi-Fi Neighbor Awareness Networking (NAN) service discovery frames.

Various aspects may further include generating an unsigned beacon type messages pointing to the signed beacon type message or a signed or unsigned certificate broadcast beacon or service advertising message, and sending the unsigned beacon type message in one or more broadcast transmissions on a different channel than a channel of the one or more broadcast transmissions of the signed beacon type message. In some aspects, the signed beacon type message may be a Bluetooth 5 extended advertising frame or a Wi-Fi NAN service discovery frame.

In some aspects, the message payload, the digital signature, and the certificate identifying hash may have a combined size of 109, 125, 250, or 255 bytes or less. In some aspects, the certificate broadcast beacon or advertisement may have a combined size of 109, 125, 250 or 255 bytes or less and may be sent by the signer, a proxy or an intermediary. In some aspects, a subset of the message payload may have sizes of 25 bytes sent in separate frames.

In some aspects, the device messages may be ASTM messages. In some aspects, the device may be a UAS and the device messages may be ASTM F3411-19 messages. In some aspects, the signed beacon type message may be an ASTM F3411-19 authentication message, an IEEE 1609.2 signed message contained within an ASTM F3411-10 compliant frame, or other unique protocol message fitting in similarly small message size constraints. In some aspects, a bit portion of the certificate may correspond to a serial number, universally unique identifier (UUID) or session identifier (session ID) assigned to the UAS or its operator. In some aspects, an embedded certificate identifier may be a cryptographic binding of both a UAS identifier and operator identifier, for example the full or partial hash value of a secret operator-identifying key in conjunction with the UAS identifier and a counter or other non-repeating or unique parameter, or an embedded certificate identifier may be a keyed message authentication code using the same inputs. In some aspects, the UUID or certificate identifier may not be embedded in the certificate but may be a first or last 64, 96, 100, or 128 bits of the certificate/hash. In some aspects, the certificate may include embedded permission bits indicating a vehicle type, operator type, role, and/or other permission of a UAS or its operator. In some aspects, the signed beacon type message may include a message consistency indication. In some aspects, device messages may be Automatic Dependent Surveillance-Broadcast (ADS-B) messages to be broadcast over a small beacon or service advertisement frame.

In some aspects, the certificate may be an implicit format certificate not including a full version of the public key. In some aspects, the certificate may include a public key reconstruction value, the public key reconstruction value configured to allow the public key to be reconstructed. In various aspects, sending the signed beacon type message in one or more broadcast transmissions from the device may include sending the signed beacon type message in a plurality of broadcast pages or broadcast frames from the device. In some aspects, the plurality of broadcast pages or broadcast frames from the device may be five broadcast pages or broadcast frames from the device.

Various aspects may include receiving a signed beacon type message from a device, the signed beacon type message cryptographically signed at least in part using a certificate private key of the device, determining whether the signed beacon type message is valid based at least in part on the certificate, processing the signed beacon type message in response to determining that the signed beacon type message is valid, and discarding the signed beacon type message in response to determining that the signed beacon type message is not valid. In some aspects, the signed beacon type message may include a certificate identifying hash of the certificate. Various aspects may further include determining an identity of the certificate based at least in part on the certificate identifying hash of the certificate, and retrieving the certificate based on the determined identity or identities associated with the certificate.

In some aspects, retrieving the certificate based on the determined identity of the certificate may include retrieving the certificate from a certificate authority server remote from the broadcast receiver device. In some aspects, retrieving the certificate based on the determined identity of the certificate may include retrieving the certificate from a memory of the broadcast receiver device. In some aspects, retrieving the certificate based on the determined identity of the certificate may include retrieving the certificate from a memory in the broadcast receiver device of a previous transmission sent from the broadcast sender. In some aspects, the certificate may be received from the device in another beacon type message.

In some aspects, the broadcast receiver device may be a law enforcement broadcast receiver device. In some aspects, processing the signed beacon type message in response to determining that the signed beacon type message is valid may include determining an unmanned aerial vehicle identity, an operator identity of an unmanned aerial vehicle, or a composite of the unmanned aerial vehicle identity and operator identity, at least in part using the signed beacon type message. In some aspects, processing the signed beacon type message in response to determining that the signed beacon type message is valid may include determining an unmanned aerial vehicle identity or operator of an unmanned aerial vehicle identity at least in part on using the signed beacon type message. In some aspects, a broadcast identifier may be contained within a signing certificate and the identifier may be a cryptographic output of a keyed hash, message authentication code algorithm or public key signing algorithm. In some aspects, the broadcast identifier may be contained within a signing certificate and the identifier may be a cryptographic output of a keyed hash, message authentication code algorithm or public key signing algorithm using the UAS and/or UAS operator identifying information as inputs. In some aspects, the keyed hash, message authentication code or public key signing algorithm may be invoked repeatedly with a unique counter input or nonce, and each output may constitute another identifier of a short-lived broadcast ID certificate associated with the unmanned aerial vehicle and unmanned aerial vehicle operator. In some aspects, the keyed hash, message authentication code or public key signing algorithm may be invoked repeatedly with a unique counter input and/or nonce, and each output may constitute another identifier of a short-lived (session ID) Broadcast ID certificate associating the UAS and UAS operator. In various aspects, the message payload may be an Automatic Dependent Surveillance-Broadcast (ADS-B) message to be broadcast over a small beacon or service advertisement frame.

Further aspects include a wireless device having a processor configured with processor-executable instructions to perform operations of any of the methods summarized above. Various aspects include a wireless device having means for performing functions of any of the methods summarized above. Various aspects include a non-transitory processor-readable medium having stored thereon processor-executable instructions configured to cause a processor of a wireless device to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 12C illustrates elements of signed data for use in a beacon type message in accordance with various embodiments.

DETAILED DESCRIPTION

Figure 1:
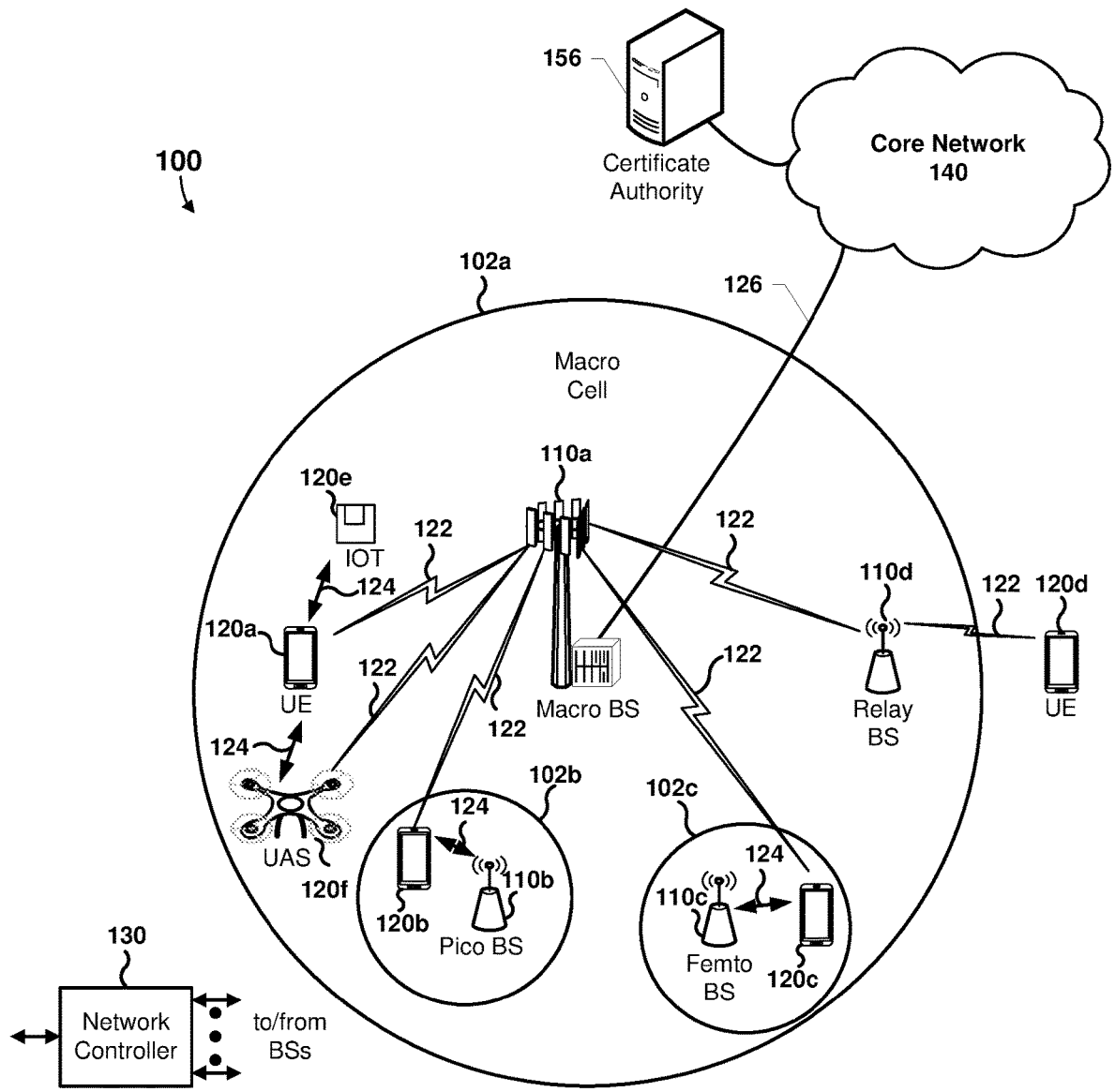
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems, methods, and devices enabling broadcast communications security. Various embodiments enable the authentication of broadcast communications. Various embodiments may enable asymmetric cryptographic authentication and integrity protection for small size messages, such as messages of a length of 125 bytes or less. Various embodiments may support the cryptographic signing of beacon type messages using certificates. As a specific example, various embodiments may support cryptographic signing of beacon type messages (e.g., Bluetooth 4 frames, Bluetooth 5 extended advertising frames, Wi-Fi Neighbor Awareness Networking (NAN) service frames, etc.) using implicit format certificates. Various embodiments may enable cryptographic signing of beacon type messages using implicit format certificates such that the cryptographic overhead of a signed beacon type message is no more than 109 or 125 bytes in length. Various embodiments may enable a signed beacon type message, such as a signed beacon type message of a length of 125 bytes or less, to be authenticated without any pairing operations between a device (e.g., an unmanned aerial system (UAS), an Internet of Things (IoT) device, a vehicle, a robot, etc.) broadcasting the signed beacon type message and a broadcast receiver device (e.g., a user equipment (UE), law enforcement device, etc.) receiving the broadcast signed beacon type message. Various embodiments may enable a device (e.g., an UAS, an IoT device, a vehicle, a robot, etc.) to be identified by its certificate, its embedded certificate ID or a full or partial hash output of its certificate. As a specific example, various embodiments may enable a UAS to be identified by a certificate associated with a signed ASTM F3411-19 authentication message broadcast by the device using Bluetooth or Wi-Fi beacon frames.

The term "wireless device" is used herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, wireless router devices, wireless appliances, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "IoT device" is used herein to refer to any of a variety of devices including a processor and transceiver for communicating with other devices or a network. For ease of description, examples of IoT devices are described as communicating via radio frequency (RF) wireless communication links, but IoT devices may communicate via wired or wireless communication links with another device (or user), for example, as a participant in a communication network, such as the IoT. Such communications may include communications with another wireless device, a base station (including a cellular communication network base station and an IoT base station), an access point (including an IoT access point), or other wireless devices.

Various embodiments may be implemented in any device, system or network that is capable of transmitting and receiving RF signals according to any of the Institute of Electrical and Electronics Engineers (IEEE) 16.11 standards, or any of the IEEE 802.11 standards, the Bluetooth® standard (e.g., Bluetooth 4, Bluetooth 5, etc.), code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B. High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as an IEEE 802.15.4 protocol (for example, Thread, ZigBee, and Z-Wave), 6LoWPAN, Bluetooth Low Energy (BLE), LTE Machine-Type Communication (LTE MTC), Narrow Band LTE (NB-LTE), Cellular IoT (CIoT), Narrow Band IoT (NB-IoT), BT Smart, Wi-Fi (e.g., Wi-Fi NAN, etc.), LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), Weightless, or a system utilizing 3G, 4G or 5G, Cellular V2X or further implementations thereof, technology.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) is used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single IoT device. The proximity of the SOCs facilitates high speed communications and the sharing of memory and resources.

The term "multicore processor" is used herein to refer to a single integrated circuit (IC) chip or chip package that contains two or more independent processing cores (e.g., central processing unit (CPU) core, internet protocol (IP) core, graphics processor unit (GPU) core, etc.) configured to read and execute program instructions. A SOC may include multiple multicore processors, and each processor in an SOC may be referred to as a core. The term "multiprocessor" is used herein to refer to a system or device that includes two or more processing units configured to read and execute program instructions.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "robotic vehicle" and "drone" refer to one of various types of vehicles including an onboard computing device configured to provide some autonomous or semi-autonomous capabilities. Examples of robotic vehicles include but are not limited to: aerial vehicles, such as an unmanned aerial vehicle (UAV) or unmanned aerial systems (UAS); ground vehicles (e.g., an autonomous or semi-autonomous car, a vacuum robot, etc.); water-based vehicles (i.e., vehicles configured for operation on the surface of the water or under water); space-based vehicles (e.g., a spacecraft or space probe); and/or some combination thereof. In some embodiments, the robotic vehicle may be manned. In other embodiments, the robotic vehicle may be unmanned. In embodiments in which the robotic vehicle is autonomous, the robotic vehicle may include an onboard computing device configured to maneuver and/or navigate the robotic vehicle without remote operating instructions (i.e., autonomously), such as from a human operator (e.g., via a remote computing device). In embodiments in which the robotic vehicle is semi-autonomous, the robotic vehicle may include an onboard computing device configured to receive some information or instructions, such as from a human operator (e.g., via a remote computing device), and autonomously maneuver and/or navigate the robotic vehicle consistent with the received information or instructions. In some implementations, the robotic vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic vehicle. Specific non-limiting examples of rotorcraft include tricopters (three rotors), quadcopters (four rotors), hexacopters (six rotors), and octocopters (eight rotors). However, a rotorcraft may include any number of rotors.

Asymmetric authentication, or signing, also sometimes referred to as public key cryptography, enables secure communications between parties without the requirement of sharing a secret key among the parties as is required in symmetric cryptography. As the parties are not required to share secret, identical keys with one another in asymmetric cryptography, asymmetric cryptographic signing reduces the problems and risks associated with sharing of secret keys that are faced in symmetric signing and authentication.

Asymmetric cryptography relies on key pairs of public keys and corresponding private keys. A public key is made freely available and the private key is kept secret and not shared during communications. Any message encrypted by a public key can only be decrypted using that public key's corresponding private key and any message encrypted or signed by a private key can only be decrypted or verified using that private key's corresponding public key.

Asymmetric cryptographic systems may use certificates, often referred to as digital certificates, public key certificates, authorization certificates or identity certificates, to verify ownership of a public key, to identify a sender of a certificate, and/or to verify a sender of a certificate and/or public key. A certificate may be an information package that identifies a public key owner or a trusted entity associated with the certificate that is authorized to perform an action or communicate a specific message. A public key of the public key owner may be embedded in the certificate. Certificates including public keys may be referred to as explicit format certificates. Rather than the public key itself, a public key reconstruction value configured to allow the public key to be reconstructed (or generated) may be included in a certificate. Certificates including a public key reconstruction value (and not including a full version of a public key itself) may be referred to as implicit format certificates. A device receiving an implicit format certificate may use the public key reconstruction value within the certificate to reconstruct (or generate) the public key.

Certificates may be issued by a certificate authority (CA). Certificates may be signed by a CA's private key and given an associated public key or public key reconstruction value associating the public key with the CA signature. A receiver of a certificate may use the CA's public key or the certificate's reconstruction value to verify the signed message and validate the associated signing certificate.

While certificates can enable secure communications, typical certificates, such as X.509 certificates, used throughout the communications networks (e.g., the Internet) today frequently range in size between 200-800 bytes and are thus unsuitable for use in securing small size messages, such as messages of a length of 125 bytes or less. As a specific example, typical certificates, such as X.509 certificates, are unsuitable for locally authenticating American Society for Testing and Materials (ASTM) standard F3411-19 "Standard Specification for Remote ID and Tracking" (referred to herein as "ASTM F3411-19") defined UAS Broadcast ID messages. Using X.509 or similarly sized certificate necessitates sending signed messages to a networked authenticator for verification, and if no network connectivity is available the received broadcast cannot be authenticated. No message structure in ASTM F3411-19, including the ASTM F3411-19 authentication message provides enough space to fit a certificate of 200-800 bytes. Furthermore, common signature formats, such as PKCS7 (Cryptographic Message Syntax), attached certificate(s) and associated encodings do not fit within the ASTM F3411-19 authentication message payload or size limitations.

Additionally, typical certificates, such as X.509 certificates, require the certificates to be retrieved from or operate on messages relayed via a network-reachable directory service. Absent connectivity to a network-reachable directory service, such as absent radio access network (RAN) connectivity, absent availability to Wi-Fi hotspots, etc., typical certificate authentication mechanisms do not support retrieval of certificates or invocation of external signature verifications and therefore cannot provide trust to the authenticity and integrity of messages. As a specific example, typical certificates, such as X.509 certificates, would require broadcast receivers to still have to have to retrieve UAS certificates via a network-reachable directory service or request such service to verify the signed messages. Absent connectivity, the broadcast receivers could not retrieve certificates and therefore could not trust the authenticity and integrity of a UAS Broadcast ID or other message type.

Various embodiments may provide asymmetric authentication methods and systems that overcome the limitations of typical certificates, such as X.509 certificates. Various embodiments may support certificate-based signing of small size messages, such as messages of a length of 125 bytes or less. As a specific example, various embodiments may enable certificate-based signing of ASTM F3411-19 authentication messages. As other examples, various embodiments may enable certificate-based signing of messages sent from IoT devices, robots, vehicles, distributed sensors, etc. Various embodiments may leverage IEEE 1609.2 certificates format and signature scheme aspects to cryptographically sign beacon type messages, especially small size beacon type messages, such as beacon type messages authenticated internally or externally to the authentication message in a length of 125 bytes or less.

Various embodiments are discussed herein with reference to specific devices, message types, cryptography standards, and/or communications technologies, such as UASs, ASTM F3411-19 messages, IEEE 1609.2, and/or Bluetooth 4, Bluetooth 5, and Wi-Fi NAN. These discussions of specific devices, message types, cryptographic standards, and/or communications technologies are used merely as examples to better illustrate aspects of the various embodiments. The specific devices, message types, cryptographic standards, and/or communications technologies, such as UASs, ASTM F3411-19 messages, IEEE 1609.2, and/or Bluetooth 4, Bluetooth 5, and Wi-Fi NAN, may be substituted with other devices, other message types, other cryptographic standards, and/or other communications technologies without departing from the scope of the various embodiments. As just some examples, IoT devices, robots, vehicles, roadside infrastructure devices, etc., and other communications technologies, such as Zigbee, LTE MTC, Bluetooth LE, etc., may be substituted in the various UAS and ASTM F3411-19 discussed examples.

Small unmanned aerial systems (UAS) or "drones" have become very popular with both industrial and hobby applications. As a result, millions of drones are expected to be flying in the airspaces of most countries of the world. In major industrial countries, millions of small UAS can pose serious problems for the safety, security, and privacy of the general public. UAS or drones can pose a threat to people and can pose a threat to personal privacy when flown over private property. Just as pressing is the risk that a UAS can pose to manned aircraft, especially low flying helicopters and aircraft in the vicinity of airports. There have been a number of incidents in which drones entering the airspace over airports have led to the interruption of commercial air traffic and the economic disruptions associated with airport closures.

Law enforcement has few tools to identify and track UASs as well as enforce emerging laws and regulations covering UASs. To address this problem, a number of Unmanned Traffic Management (UTM) concepts are in development. These include proposals and regulations developed by NASA/FAA and the creation of the Global UTM Alliance (GUTMA) to develop concepts for identifying, tracking and flight control of UASs.

As an example of such efforts, the started the UAS ID Aviation Rulemaking Committee (ARC) to make drone identity and tracking recommendations to Federal Aviation Administration (FAA). The ARC report (published September, 2017) stated: "Transmission and receipt of required UAS information is not network dependent for direct broadcast" and "the ARC recommends the FAA adopt an industry standard for data transmission, which may need to be created, to ensure UA equipment and public safety receivers are interoperable. This will also help mitigate concerns about proprietary technology licensing and vendor exclusivity."

The National Aeronautics and Space Administration (NASA) released the Notice of Proposed Rule Making (NPRM) on Dec. 31, 2019, which is at https://www.govinfo.gov/content/pkg/FR-2019-12-31/pdf/2019-28100.pdf. This document poses policy for "Standard" Remote Identification for UASs, involving network-supported identifications, "Limited" Remote Identification, which depend on local beacons without network support, Static Identity (e.g., a UAS Serial Number, and "Private" Identity or identifiers (e.g., UUID/SessionId). This document addressed using broadcast technology "that is compatible with personal wireless devices. The FAA envisions that remote identification broadcast equipment would broadcast using spectrum similar to that used by Wi-Fi and Bluetooth devices." The requirements of 'when' Standard vs. Broadcast (or both) identification is required still need to be resolved, but both are needed and must be secure.

The NPRM offers a view of the requirements that may be imposed on UAS. "[T]he FAA is proposing to require all UAS with remote identification equipment to incorporate cybersecurity protections for the transmission and broadcast of the message elements, as appropriate. Cybersecurity protections are necessary to defend against cyber threats that could adversely affect the authenticity or integrity of the remote identification information being transmitted by the UAS to a Remote ID USS or being broadcast from the unmanned aircraft."

The ASTM started a subcommittee F38.02 following the ARC recommendations, publishing F3411-19 in February, 2020. This document identifies three broadcast solutions using Bluetooth 4 beacon frames, Bluetooth 5 beacons, and WiFi Neighbor Awareness Networking (NAN). Bluetooth 4 beacon frames ("legacy advertisement frames") would make 25 bytes available between beacon counter and cyclic redundancy check (CRC) for identification and authentication information. Bluetooth 5 beacons with Extended Advertising would point to a 255 Byte secondary frame (referred to as Extended Advertising) on a non-beacon channel. WiFi Neighbor Awareness Networking (NAN) would provide a management frame [type 0, sub-type 13 "action"] defined in 802.11-2016 Part 11 which provides for NAN service discovery frames, up to 255 Bytes in length.

ASTM F3411-19 includes the following message elements: a Basic ID Message (Type 0x0) to be used for a drone's identification (e.g., serial number, UUID, etc.) that is limited to 25 Bytes; a LocationNector Message (Type 0x1) that provides the drone's Location, speed, direction, and altitude that is also limited to 25 Bytes; an Authentication Message (Type 0x2) that includes an Authenticate message set that may be up to 125 Bytes (5 'pages') to accommodate legacy beacon (BT4); a Self ID Message (Type 0x3) that may be a short text describing the drone's current actions and that is limited to 25 Bytes; a System Message (Type 0x4) that identifies the operator location and/or flight region and is limited to 25 Bytes; an Operator ID Message (Type 0x5) that includes a regulator-issued operator ID and is limited to 25 Bytes; and a Message Pack (Type 0xF), which is a set of n messages sent in one frame that must fit within 250 Bytes, including the header, but is applicable only to Bluetooth 5 and WiFi technologies.

ASTM F3411-19 specifies three types of identity: UAS Serial Number; 'Session ID' (UUID), which is a short-lived identifier; and a CAA-issued operator identifier. The problem is that these identities are useless unless the identities can be looked up and/or authenticated in a back-end system, or the identities are 'self-authenticating' with a locally known digital certificate. F3411-19 does not explain how to have self-authenticating identities and mandates network connectivity to digitally verify received broadcast messages. Further, authentication typically involves the use of digital certificates that may or may not be retrievable or usable over a communication network suitable for use with UASs.

Conventional Authentication messages may be hobbled by Bluetooth 4 beacon size constraints that limits pages to 25 bytes each to reach an aggregate message size of 125 bytes. Providing both authentication and drone ID (e.g., authTypes UAS ID Signature) or operator IDs (e.g., Operator ID Signature) within this limited message size may not be feasible using conventional authentication methods. Further, the use of the message set (i.e., authType 'Message Set') is available only in BT5-Extended or WiFi which allow for 250-byte messages. Other than authentication messages, there is no specific set of security capabilities defined in F3411 (e.g., no anti-replay, anti-spoof, privacy). Further the identity and authentication relationships are not specified.

A suitable solution to the need for communicating authentication and identity messages in an UAS architecture should be able to satisfy a number of goals. The solution should enable broadcast receivers to trust the authenticity and integrity of broadcasts when disconnected from IP/cellular services while minimizing cryptographic security overhead to fit into the frame size and field constraints of Bluetooth and Wi-Fi beacons, as defined in ASTM 3411-19. The solution should support privacy-preserving, secure broadcast in which UAS Service Supplier (USS) identity information is not linkable to the operator and is only accessible to authorized parties such as regulators and law enforcement. The solution should support network-disconnected as well networked, including when UAS and Receiver are both connected to network, UAS and Receiver are both disconnected from the network, the UAS is connected to network while the Receiver is disconnected from network, and when the UAS is disconnected from network while the Receiver is connected to the network.

The solution should support, but not restrict USS/UTM network authentication methods such that various commercial, industry-standard network authentication methods are usable to USS operators. Transport layer security (TLS) using IEEE 1609.2 (ISO 21177), X.509 certificates, OAUTH, cellular CN services and many others may be used in network security and authentication. Different USS/UTM systems may support different methods based on cost, commercial viability as well as functional needs and differentiation in service offerings.

Ideally, the solution should minimize cost and time to deploy, integrate well into secure supply chain methodologies for the enrollment and bootstrap of UAS platforms, support security needs the FAA and industry may not even understand they need yet. To facilitate deployment, the solution should leverage matured standards that enjoy international adoption and deployment, and leverage secure hardware/firmware technology that is available today, deployable in industrial and consumer electronic devices, and already supportable by 3rd party security services (e.g., Public Key Infrastructure (PKI) providers).

In view of the goals for a solution it is clear that standard Internet certificate-based solutions (e.g., X.509, PKCS7 . . . ) will not work in the UAS application because the certificates are too large with 200-800 Byte certificate sizes and require a large PKCS7 or other Cryptographic Message Syntax (CMS) structural and encoding overhead.

The transportation industry's Wireless Access in Vehicular Environments (WAVE) protocol is defined in the IEEE 1609-series of standards. While 1609.2 security was engineered for V2X communications, it functions above the radio access layers and is suitable for use in a variety of mobile IoT, application or network security communications architectures. Given the small size of the 1609.2 certificate and its digital signature construction, 1609.2 certificates are well-tailored for use in the small frame sizes associated with WiFi Neighbor Awareness Networking (NAN) and Bluetooth.x beacons normatively required in ASTM. Well-structured interfaces and primitives defined in 1609.2 provide broadcast senders and receivers a variety of messaging security controls such as authentication/integrity, anti-replay, mitigation of certificate mis-binding attacks as well as message consistency and relevance checks. Today, a variety of commercial services are available to support a 1609.2-based communications security ecosystem.

Therefore, various embodiments begin with the IEEE 1609.2 standard, which is already engineered for low bandwidth V2X 5.9 GHz environments, and designed for 'disconnected', mobile broadcasting or 'unicast', based on application needs and underlying media. Further, the IEEE 1609.2 standard provide small certificate sizes (~100 Bytes) that use standard Elliptic Curve Digital Signature Algorithm (ECDSA) cryptography that provides a small signature (ASN.1 SignedData) structure that fits a 25 Byte signed ASTM payload within the ASTM authentication message auth data field (that has a maximum size of 109 Bytes). Thus, an IEEE 1609.2 authentication can be signed and fit any arbitrary 25-Byte ASTM message, thereby supporting extensibility in authenticating new message types in ASTM or other standards that may emerge.

This is possible because IEEE 1609.2 was engineered for this type of environment, namely heterogeneous, distributed, mobile, disconnected or connected, vehicular machine-to-machine communications. Further there are two ways in 1609.2 to identify the signing certificate, including using HashedID8, which is a truncated hash of the signing certificate that the message receiver can use to lookup its cache of the certificate. In vehicle-to-everything (V2X) communications, vehicles only transmit their certificates, which are used to verify their signed messages, every so often (application-configurable) because attaching certificates to every signed message consumes too much radio frequency spectrum.

An IEEE 1609.2 certificate may be an 'Implicit Certificate' based on Elliptic Curve Qu Vanstone. The Certificate Authority (CA) is identified but the CA signature is not included. UAS Public key is not included (at least not directly). Included in the UAS certificate is a Public Key Reconstruction Value. The Receiver computes the UAS's public key from the Public Key Reconstruction Value and known Certificate Authority. The UAS's public key may then be used to verify the signed message. At the same time, this computation verifies the cryptographic chain (i.e., CA signature over the UAS certificate). As a result, an IEEE 1609.2 implicit certificate that is half the size or less—depending on configuration—of a typical Internet X.509 certificate.

When verifying open drone ID broadcasts via a wireless network, certificates should still be discoverable in any scenario, connected or disconnected, otherwise law enforcement and other broadcast receivers could not verify/trust the UAS's messages when disconnected from a networked authentication 'verifier' service. When the receiver device is connected to a network, verification of drone ID broadcasts can be achieved by the message receiver extracting the HashedId8 (certificate hash) from the signature and performing a query via the authentication service to receive the certificate and verify it. Otherwise, the message receiver may relay the entire signature data and signed payload to the authentication service who holds the public key certificate. For example, the Drone Authentication Service can either indicate that the message is authenticated or send the full UAS certificate and let the message receiver verify it and all subsequent broadcasts from the drone on its own.

When the receiver device is disconnected (e.g., when the police is operating in a valley where there is no cellular connectivity, WiFi hotspots, etc.), the UAS broadcasts its certificate either adaptively or on a scheduled interval (say, every 5-10 seconds), or on demand, and message receivers cache the certificate transmitted by the drone and use it to verify all messages signed and broadcast from the drone. IEEE 1609.2 already has a mechanism for periodically broadcasting certificates called Peer2Peer certificate distribution. The IEEE 1609.2 Peer2Peer certificate distribution message is small enough to be transmitted within the Authentication Data (which has a maximum of 109 Bytes) of an ASTM F3411-19 Authentication message (either using ASTM 'Private' authentication type space or ASTM formally adopting a new auth type of '1609.2-cert-broadcast.' Essentially, the UAS signs its own certificate broadcast. The certificate's validity is vouched for by the Certificate Authority, and the certificate's utility is demonstrated by the fact that it verifies signatures on all other messages the given UAS broadcasts.

IEEE 1609.2 has more features that can be used as well, including message consistency checking of message lifetime and whether the lifetime has expired, and message generation locations and whether the sender is authorized to transmit certain message content within the locations. Certificate Service Specific Permissions (SSP) are permission bits embeddable in a certificate that indicate what the UAS is allowed to broadcast. For example, the SSP may indicate whether the drone is associated with a police, fire or rescue service and, based on such role, is authorized to travel and broadcast with few if any limitations. As another example, the SSP may indicate that the UAS is a radio controlled (RC) aircraft that is only allowed to operate within designated FAA flying areas. Such additional features take a little more overhead in the 1609.2 Security header, and therefore cannot be done in all F3411-19 message formats yet. However, such additional features could be supported should a new 1609.2-integrated message type be used with ASTM.

FIG. 1 is a system block diagram illustrating an example communication system 100 suitable for implementing any of the various embodiments. The communications system 100 may be a 5G New Radio (NR) network, or any other suitable network such as an LTE network, 5G (or later generation) network, etc. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of devices (for example illustrated as user equipment (UE) 120a-120d, IoT device 120e, and UAS 120f in FIG. 1). The communications system 100 may also include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station Subsystem serving this coverage area, or a combination thereof, depending on the context in which the term is used. The core network 140 may be any type core network, such as an LTE core network (e.g., an Evolved Packet Core (EPC) network), 5G core network, etc. While the communications system 100 is discussed with reference to various examples of types of wireless devices 120a-120f, such as UEs, UASs, IoT devices, etc., these are merely examples and the wireless devices 120a-120f may be any type device, such as a robot, vehicle, infrastructure device, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110a-110d may communicate with the core network 140 over a wired or wireless communication link 126. The wireless device (e.g., user equipment (UE)) 120a-120f may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device (e.g., UE) or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices (e.g., UEs, UASs, etc.) 120a, 120b, 120b, 120c, 120e, 120d, 120f may be dispersed throughout communications system 100, and each wireless device may be stationary or mobile. A wireless device also may be referred to as an access terminal, a terminal, a mobile station, a subscriber unit, a station, user equipment (UE), unmanned aerial system (UAS), broadcast receiver device (BRD), Internet of Things (IoT) device, etc.

A macro base station 110a may communicate with the communication network 140 over a wired or wireless communication link 126. The wireless devices 120a, 120b, 120c, 120f may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a sub-carrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device (e.g., UE) 120a-e may be included inside a housing that houses components of the wireless device, such as processor components, memory components, similar components, or a combination thereof.

In general, any number of communication systems and any number of wireless networks may be deployed in a given geographic area. Each communications system and wireless network may support a particular Radio access technology (RAT) and may operate on one or more frequencies. A RAT also may be referred to as a Radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an EPC network) in a 5G NSA network.

In some embodiments, two or more wireless devices 120a-f (for example, illustrated as the wireless device 120a and the IoT device 120e or wireless device 120a and UAS 120f) may communicate directly using one or more sidelink channels 124 (for example, without using a base station 110a-110d as an intermediary to communicate with one another). For example, wireless device 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a C-V2X protocol, Bluetooth communications, Wi-Fi communications, a mesh network, or similar networks, ADS-B broadcasts, or combinations thereof. In this case, the wireless device 120a-f may perform scheduling operations, resource selection operations, as well as other operations described elsewhere herein as being performed by the base station 110a.

In some embodiments, a certificate authority (CA) server 156 may provide certificates and manage keys, such as private keys, public keys, etc., in the network 100. The CA server 156 may provide certificates (e.g., explicit certificates, implicit certificates, etc.) and/or keys (e.g., private keys, public keys, etc.) to wireless devices 120a-f.

Figure 2A:
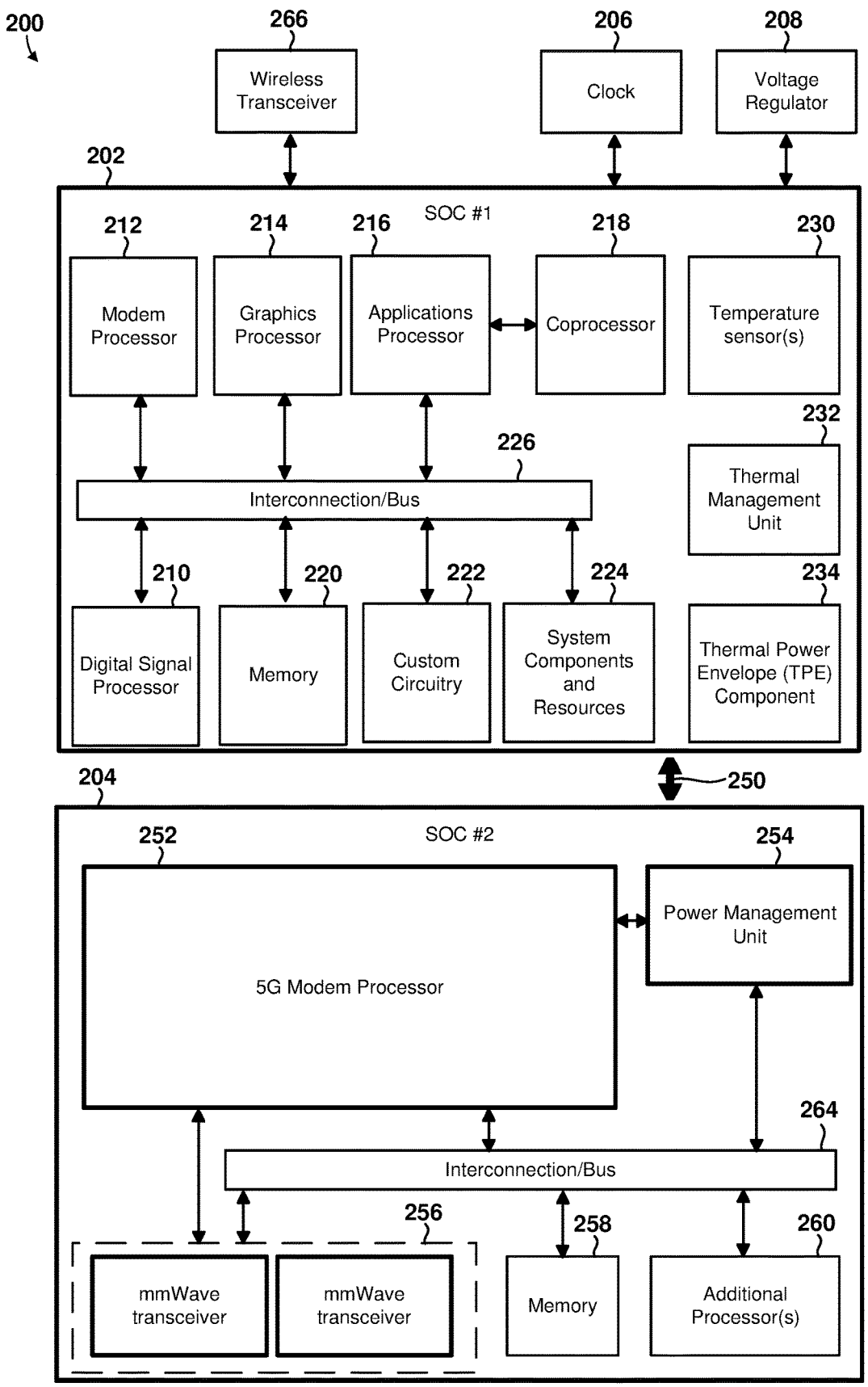
FIG. 2A is a component block diagram illustrating an example computing and wireless modem system suitable for implementing any of the various embodiments.

FIG. 2A is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2A, the illustrated example wireless device 200 (which may be a SIP in some embodiments) includes a two SOCs 202, 204 coupled to a clock 206, a voltage regulator 208, and a wireless transceiver 266 configured to send and receive wireless communications via an antenna (not shown) to/from network wireless devices, such as a base station 110a, and/or other wireless device (e.g., wireless devices 120a-f). In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G (or later generation) processing unit responsible for managing high volume, high speed (e.g., 5 Gbps, etc.), and/or very high frequency short wave length (e.g., 28 GHz mmWave spectrum, etc.) communications. In some embodiments, the wireless transceiver 266 may be a wireless transceiver configured to support peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), Bluetooth communications, Wi-Fi communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 2B:
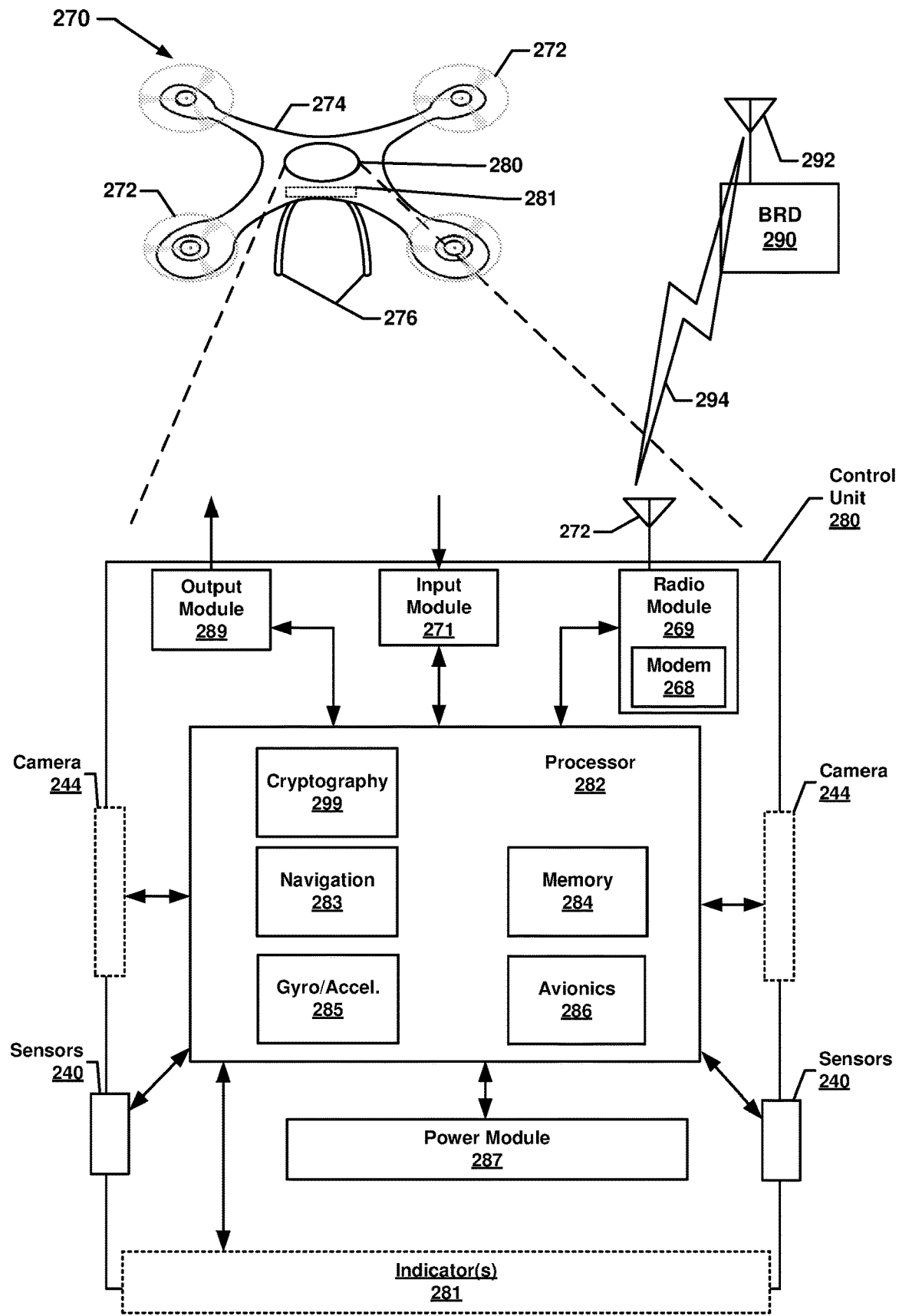
FIG. 2B is a component block diagram illustrating components of an unmanned aerial system (UAS) according to various embodiments.

Robotic vehicles may include unmanned aerial systems (UASs), such as winged or rotorcraft varieties of aerial robotic vehicles. FIG. 2B illustrates an example of a robotic vehicle 270, such as an aerial robotic vehicle (e.g., a UAS (e.g., UAS 120f), UAV, etc.), that utilizes multiple rotors 272 driven by corresponding motors to provide lift-off (or take-off) as well as other aerial movements (e.g., forward progression, ascension, descending, lateral movements, tilting, rotating, etc.). The robotic vehicle 270 is illustrated as an example of a robotic vehicle that may utilize various embodiments, but is not intended to imply or require that various embodiments are limited to aerial robotic vehicles or rotorcraft robotic vehicles.

Various embodiments may be used with winged robotic vehicles, land-based autonomous vehicles, water-borne autonomous vehicles, space-based autonomous vehicles, etc. Additionally, while various embodiments are discussed with reference to vehicles, such as UASs, vehicles are merely examples of devices that may utilize various embodiments, and the examples of vehicles, and specifically UASs, are not intended to imply or require that various embodiments are limited to vehicles or UASs. Various embodiments may be used with various different devices, such as Internet of Things (IoT) devices, infrastructure devices, robots, etc.

With reference to FIGS. 1-2B, the robotic vehicle 270 may be similar to the UAS 120f. The robotic vehicle 270 may include a number of rotors 272, a frame 274, landing columns 276 or skids, and one or more indicators 281, such as one or more LEDs, one or more incandescent bulb lights, one or more display screens, one or more speakers, one or more horns, one or more buzzers or bells, etc. The frame 274 may provide structural support for the motors associated with the rotors 272. The landing columns 276 may support the maximum load weight for the combination of the components of the robotic vehicle 270 and, in some cases, a payload. For ease of description and illustration, some detailed aspects of the robotic vehicle 270 are omitted such as wiring, frame structure interconnects, or other features that would be known to one of skill in the art. For example, while the robotic vehicle 270 is shown and described as having a frame 274 having a number of support members or frame structures, the robotic vehicle 270 may be constructed using a molded frame in which support is obtained through the molded structure. While the illustrated robotic vehicle 270 has four rotors 272, this is merely exemplary and various embodiments may include more or fewer than four rotors 272.

The robotic vehicle 270 may further include a control unit 280 that may house various circuits and devices used to power and control the operation of the robotic vehicle 270. The control unit 280 may include a processor 282, a power module 287, sensors 240, one or more cameras 244, an output module 289, an input module 271, and a radio module 269. Optionally, the control unit may also include one or more of the indicators 281. The power module 287, sensors 240, one or more cameras 244, output module 289, input module 271, radio module 269, and/or one or more indicators 281 may be connected to the processor 282.

The processor 282 may be configured with processor-executable instructions to control travel and other operations of the robotic vehicle 270, including operations of various embodiments. The processor 282 may include or be coupled to a navigation unit 283, a memory 284, a gyro/accelerometer unit 285, a cryptography module 299, and an avionics module 286. The processor 282, cryptography module 299, and/or the navigation unit 283 may be configured to communicate with another computing device (e.g., a broadcast receiver device, operator's computing device, observer's computing device, etc.) through wireless communications links, such as wireless communications links 122, 124.

The avionics module 286 may be coupled to the processor 282 and/or the navigation unit 283, and may be configured to provide travel control-related information such as altitude, attitude, airspeed, heading, and similar information that the navigation unit 283 may use for navigation purposes, such as dead reckoning between Global Navigation Satellite System (GNSS) position updates. The gyro/accelerometer unit 285 may include an accelerometer, a gyroscope, an inertial sensor, or other similar sensors. The avionics module 286 may include or receive data from the gyro/accelerometer unit 285 that provides data regarding the orientation and accelerations of the robotic vehicle 270 that may be used in navigation and positioning calculations, as well as providing data used in various embodiments.

The processor 282 may further receive additional information from the sensors 240, such as an image sensor or optical sensor (e.g., a sensor capable of sensing visible light, infrared, ultraviolet, and/or other wavelengths of light). The sensors 240 may also include a radio frequency (RF) sensor, a barometer, a humidity sensor, a sonar emitter/detector, a radar emitter/detector, a microphone or another acoustic sensor, a lidar sensor, a time-of-flight (TOF) 3-D camera, or another sensor that may provide information usable by the processor 282 for movement operations, navigation and positioning calculations, and determining environmental conditions.

The sensors 240 may also include one or more sensors configured to detect temperatures generated by one or more robotic vehicle components, such as thermometers, thermistors, thermocouples, positive temperature coefficient sensors, and other sensor components.

The power module 287 may include one or more batteries that may provide power to various components, including the processor 282, the sensors 240, the one or more cameras 244, the output module 289, the input module 271, the one or more indicators 281, and the radio module 269. In addition, the power module 287 may include energy storage components, such as rechargeable batteries. The processor 282 may be configured with processor-executable instructions to control the charging of the power module 287 (i.e., the storage of harvested energy), such as by executing a charging control algorithm using a charge control circuit. Alternatively, or additionally, the power module 287 may be configured to manage its own charging. The processor 282 may be coupled to the output module 289, which may output control signals for managing the motors that drive the rotors 272 and other components (including one or more indicators 281 if not connected directly to the processor 282).

The robotic vehicle 270 may be controlled through control of the individual motors of the rotors 272 as the robotic vehicle 270 progresses toward a destination. The control of the individual motors of the rotors 272 may enable the robotic vehicle to perform maneuvers (e.g., barrel rolls, dips, climbs, loops, etc.) The processor 282 may receive data from the navigation unit 283 and use such data in order to determine the present position and orientation of the robotic vehicle 270, as well as the appropriate course towards the destination or intermediate sites. In various embodiments, the navigation unit 283 may include a GNSS receiver system (e.g., one or more Global Position System (GPS) receivers) enabling the robotic vehicle 270 to navigate using GNSS signals. Alternatively or in addition, the navigation unit 283 may be equipped with radio navigation receivers for receiving navigation beacons or other signals from radio nodes, such as navigation beacons (e.g., very high frequency (VHF) omni-directional range (VOR) beacons), Wi-Fi access points, cellular network sites, radio station, remote computing devices, other robotic vehicles, etc.

The radio module 269 may be configured to receive navigation signals, such as signals from aviation navigation facilities, etc., and provide such signals to the processor 282 and/or the navigation unit 283 to assist in robotic vehicle navigation. In various embodiments, the navigation unit 283 may use signals received from recognizable RF emitters (e.g., AM/FM radio stations, Wi-Fi access points, and cellular network base stations) on the ground.

The navigation unit 283 may include a planning application that may perform calculations to plan a path of motion for the robotic vehicle within a volumetric space ("path planning"). In some embodiments, the planning application may perform path planning using information including information about aspects of a task to be performed by the robotic vehicle, environmental condition information, an amount of heat that may be generated by one or more components of the robotic vehicle in performing the task, as well as one or more thermal constraints.

The radio module 269 may include a modem 268 and a transmit/receive antenna 272. In some implementations, the radio module 269 and/or the modem 268 may be separate processors and/or components of the same SOC. The radio module 269 may be configured to conduct wireless communications with a variety of wireless communication devices (e.g., a broadcast receiver device (BRD) 290), examples of which include a wireless telephony base station or cell tower (e.g., a base station 110a), a network access point (e.g., an access point), a beacon, a smartphone, a tablet, a laptop, or another computing device with which the robotic vehicle 270 may communicate. As specific examples, the BRD 290 may be a wireless device of a law enforcement officer, emergency responder, military unit, or other government entity. The processor 282 may establish a bi-directional wireless communication link 294 via the modem 268 and the antenna 272 of the radio module 269 and the BRD 290 via a transmit/receive antenna 292. In some embodiments, the radio module 269 may be configured to support multiple connections with different wireless communication devices using different radio access technologies. In some embodiments, the radio module 269 may be configured to broadcast beacon type messages from the robotic vehicle 270, such as beacon messages for peer-to-peer (P2P) communications, beacon messages for device-to-device (D2D) communications, beacon messages for a vehicle-to-everything (V2X) protocol (which may include a vehicle-to-vehicle (V2V) protocol, a vehicle-to-infrastructure (V2I) protocol, or similar protocol), beacon messages for Bluetooth communications, beacon messages for Wi-Fi communications, etc.

In some embodiments, the cryptography module 299 may be configured to encrypt and/or decrypt data and/or messages sent by and/or received by the robotic vehicle. The cryptography module 299 may manage keys, such as public keys, private keys, etc., and/or certificates for the robotic vehicle 270. The cryptography module 299 may be configured to generate hashes of various values, such as using hash algorithms (e.g., secure hash algorithm (SHA) 256, etc.). In various embodiments, the cryptography module 299 may be configured to cryptographically sign messages, such as beacon type messages, of the robotic vehicle 270 to generate signed messages, such as signed beacon type messages.

In some embodiments, the BRD 290 may be connected to a server through intermediate access points. In an example, the BRD 290 may be a server of a robotic vehicle operator, a third-party service (e.g., package delivery, billing, etc.), or a site communication access point. The robotic vehicle 270 may communicate with a server through one or more intermediate communication links, such as a wireless telephony network that is coupled to a wide area network (e.g., the Internet) or other communication devices. In some embodiments, the robotic vehicle 270 may include and employ other forms of radio communication, such as mesh connections with other robotic vehicles or connections to other information sources (e.g., balloons or other stations for collecting and/or distributing weather or other data harvesting information).

In various embodiments, the control unit 280 may be equipped with an input module 271, which may be used for a variety of applications. For example, the input module 271 may receive images or data from an onboard camera 244 or sensor, or may receive electronic signals from other components (e.g., a payload).

While various components of the control unit 280 are illustrated as separate components, some or all of the components (e.g., the processor 282, the output module 289, the radio module 269, and other units) may be integrated together in a single device or module, such as a system-on-chip module.

Figure 3:
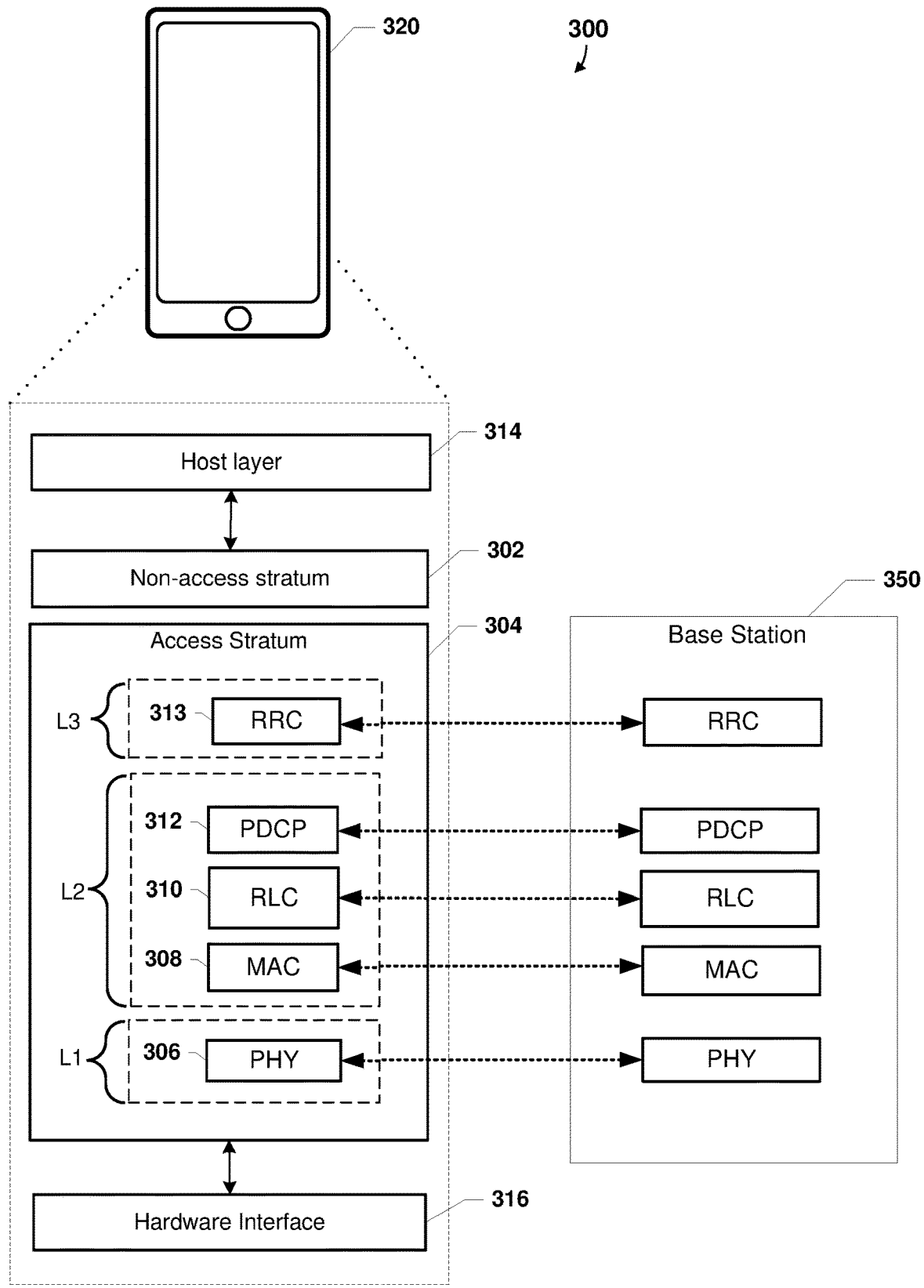
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments.

With reference to FIGS. 1-3, the wireless device 320 may implement the software architecture 300 to facilitate communication between a wireless device 320 (e.g., the wireless device 120a-120f, 200, 270) and the base station 350 (e.g., the base station 110a, BRD 290) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260, 282). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications, such as Wi-Fi communications, Bluetooth communications, V2X communications, IoT communications, etc.

The software architecture 300 may include a Non-Access Stratum (NAS) 302 and an Access Stratum (AS) 304. The NAS 302 may include functions and protocols to support Packet filtering, security management, mobility control, session management, and traffic and signaling between a SIM(s) of the wireless device and its core network 140. The AS 304 may include functions and protocols that support communication between a SIM(s) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a Media Access Control (MAC) sublayer 308, a Radio link Control (RLC) sublayer 310, and a Packet data convergence protocol (PDCP) 312 sublayer, each of which form logical connections terminating at the base station 350.

In the control plane, Layer 3 (L3) of the AS 304 may include a Radio Resource Control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the base station 350.

In various embodiments, the PDCP sublayer 312 may provide uplink functions including multiplexing between different Radio bearers and logical channels, sequence number addition, handover data handling, integrity protection, ciphering, and header compression. In the downlink, the PDCP sublayer 312 may provide functions that include in-sequence delivery of data packets, duplicate data Packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4A:
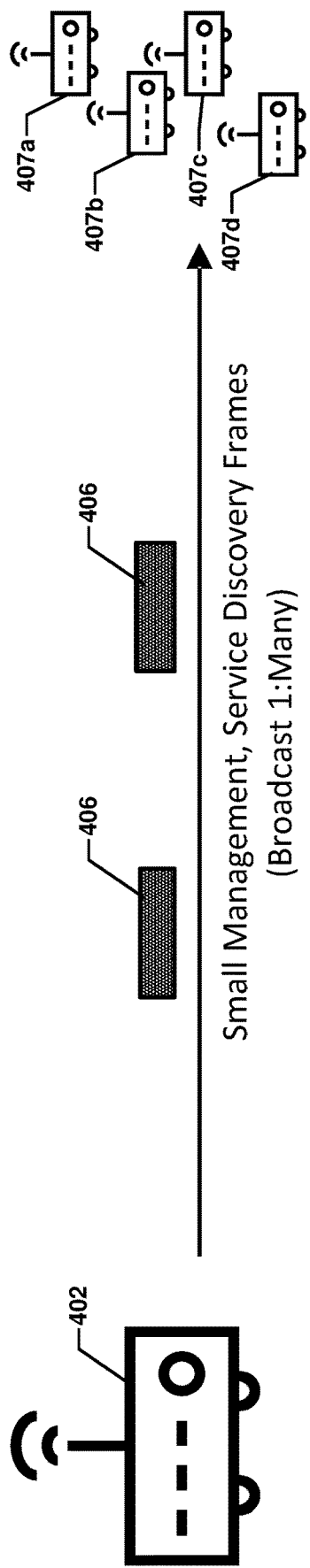
FIG. 4A illustrates an example broadcast of beacon type messages.

FIG. 4A illustrates an example broadcast of beacon type messages 406 by a device 402 to many other broadcast receiver devices 407a-407d. As used herein a "beacon type message" or "beacon-like" message may be a small, compact message typically broadcast as part of another radio access protocol in which each message's parent frame within the protocol provides no pairing, communications or security-related context, or association between the broadcaster and broadcast receiver. Given their small size, beacon type messages or beacon-like messages are frequently not secured, or are secured only through symmetric message authentication techniques. With reference to FIGS. 1-4A, the device 402 may be any device broadcasting beacon type messages 406, such as a wireless device (e.g., the wireless device 120a-120f, 200, 270, 320) or a base station (e.g., the base station 110a, 350, BRD 290). The broadcast receiver devices 407a-d may be any device receiving beacon type messages 406, such as a wireless device (e.g., the wireless device 120a-120f, 200, 270, 320) or a base station (e.g., the base station 110a, 350, BRD 290). The beacon type messages 406 may be management and service discovery frames broadcast to neighbors. For example, the beacon type messages 406 may be Wi-Fi Aware (uses Wi-Fi Neighbor Awareness Network, or 'NAN', specifically the NAN service discovery frames), Bluetooth beacon messages (e.g., Bluetooth 4 beacon messages, Bluetooth 5 beacon messages, etc.), Zigbee beacon messages, or any other type broadcast management and service discovery frames. The beacon type messages 406 are typically sent with no security association. Beacon type messages 406 may be small size messages, such as messages of a length of 125 bytes or less. As such, the beacon type messages 406 cannot support using typical certificates, such as X.509 certificates, often ranging in size between 200-500.

Figure 4B:
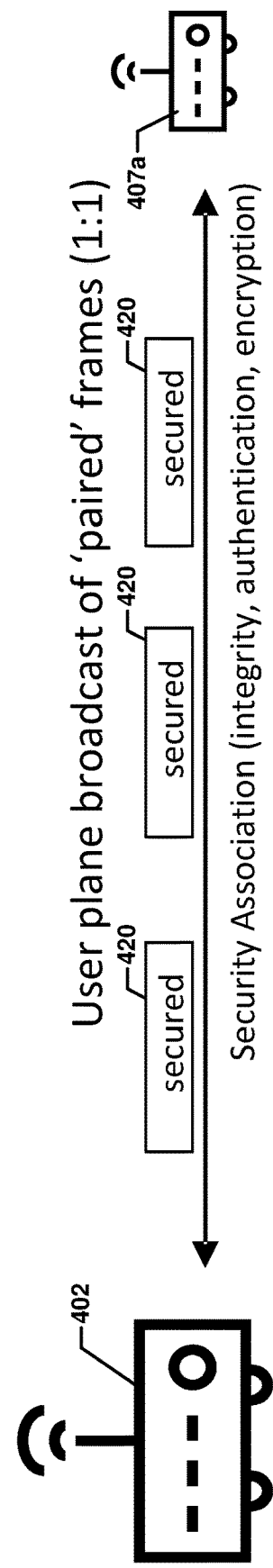
FIG. 4B illustrates an example of unpaired beacon or service discovery broadcast frames in addition to one to one transmission of secured messages after pairing of two devices.

FIG. 4B illustrates an example of one to one transmission of secured messages after pairing of two devices 402 and 407a. With reference to FIGS. 1-4A, after discovery, the devices 402 and 407a may perform operations to establish one to one communications and pair with one another according to the operations of the communication protocol used for communicating between the devices 402 and 407a, such as Wi-Fi pairing operations, Bluetooth pairing operations, etc. The pairing of the devices 407a and 402 enables security association between the two devices 402, 407a and symmetrically authenticated/encrypted messages 420 may be exchanged between the two devices 402, 407a. The symmetrically authenticated/encrypted messages 420 sent as part of pairing operations and/or sent after pairing is complete are not beacon type messages as the symmetrically authenticated/encrypted messages 420 are not intended for discovery, announcement, or advertisement of the devices 402, 407a.

Figure 5:
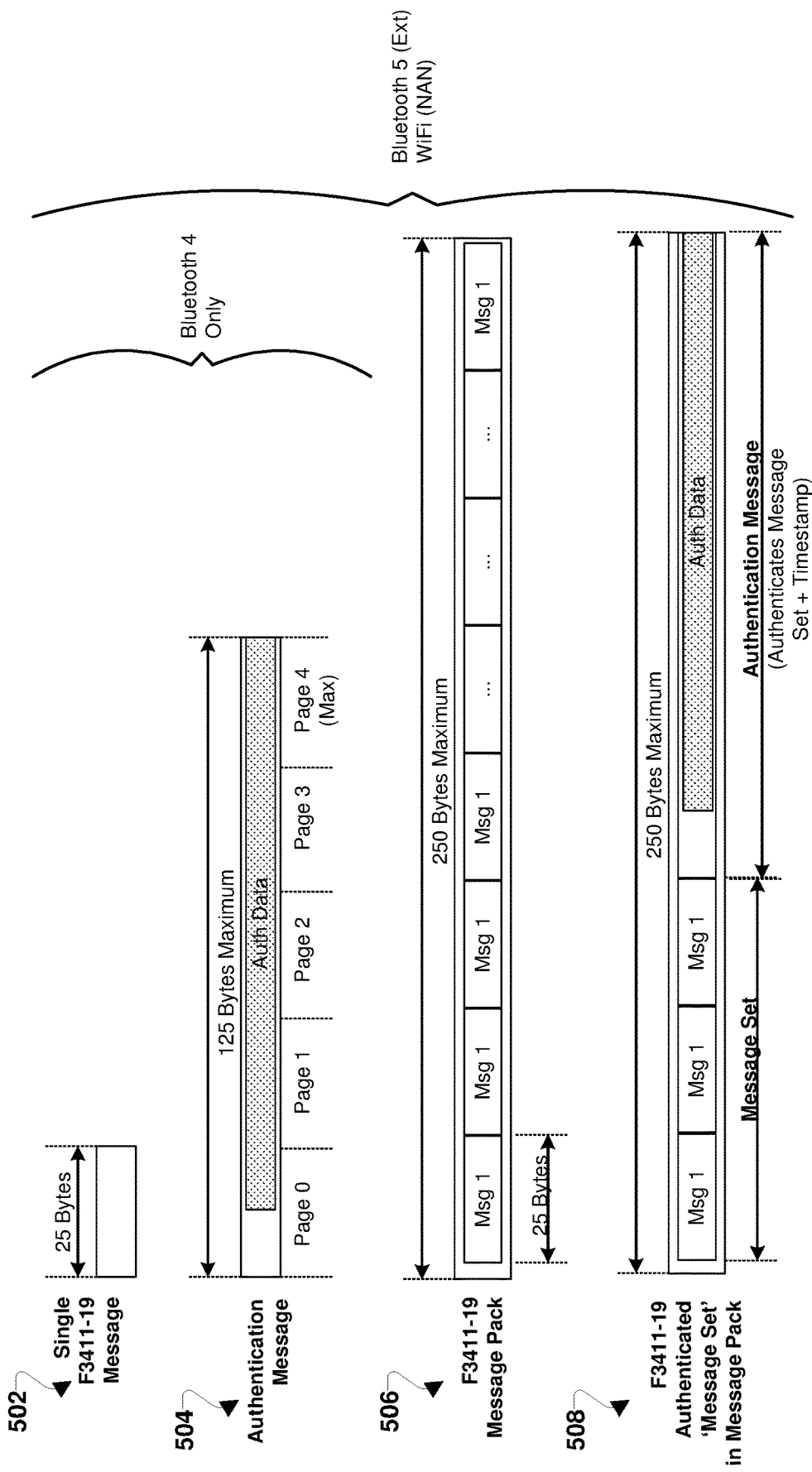
FIG. 5 illustrates aspects of ASTM F3411-19 messages.

FIG. 5 illustrates aspects of ASTM F3411-19 messages. With reference to FIGS. 1-5, the smallest single ASTM F3411-19 message 502 is twenty-five bytes. Examples of the twenty five byte ASTM F3411-19 messages 502 include a Basic ID Message (Type 0x0) to be used for a drone's identification (e.g., serial number. UUID, etc.) that is limited to 25 Bytes; a Location/Vector Message (Type 0x1) that provides the drone's Location, speed, direction, and altitude that is also limited to 25 Bytes; a Self ID Message (Type 0x3) that may be a short text describing the drone's current actions and that is limited to 25 Bytes; a System Message (Type 0x4) that identifies the operator location and/or flight region and is limited to 25 Bytes; an Operator ID Message (Type 0x5) that includes a regulator-issued operator ID and is limited to 25 Bytes. The 25-byte ASTM F3411-19 may be examples of device messages. Other examples of device messages may include Automatic Dependent Surveillance-Broadcast (ADS-B) messages. such as the broadcast small beacons or service advertisement frames supporting Next Generation (NextGen) aviation surveillance and tracking systems.

ASTM F3411-19 may also support messages 504 sent over multiple pages or frames, such as five pages or frames. Specifically, the message 504 may be an Authentication Message (Type 0x2) that includes an Authenticate message set that may be up to 125 Bytes (5 'pages') to accommodate legacy beacon (BT4);

ASTM F3411-19 may also support a message pack 506 or message set 508, such as a Message Pack (Type 0xF), which is a set of n messages sent in one frame that must fit within 250 Bytes, including the header, but is applicable only to Bluetooth 5 and WiFi technologies. As examples, the message set 508 may be Bluetooth 5 beacons with Extended Advertising that would point to a 255 Byte secondary frame (referred to as Extended Advertising) on a non-beacon channel. Similarly, WiFi Neighbor Awareness Networking (NAN) would provide a management frame [type 0, subtype 13 "action"] defined in 802.11-2016 Part 11 which provides for NAN service discovery frames, up to 255 Bytes in length.

Various embodiments may support certificate-based signing of small size messages, such as messages of a length of 125 bytes or less, sufficiently small to fit within multi-paged Bluetooth 4 beacons or Bluetooth 5 Extended Advertisement or WiFi NAN service Advertisement frames. As a specific example, various embodiments may enable certificate-based signing of ASTM F3411-19 authentication messages 504 and message sets 508. As other examples, various embodiments may enable certificate-based signing of messages sent from IoT devices, robots, vehicles, etc. Various embodiments may leverage IEEE 1609.2 certificates format and signature scheme aspects to cryptographically sign beacon type messages, especially small size beacon type messages, such as beacon type messages of a length of 125 bytes or less. Various embodiments utilize lightweight, strong cryptographic certificates specified in IEEE 1609.2 to authenticate and integrity-protect UAS Broadcast ID messages. Providing functional and secure Broadcast ID is vital when the UAS, broadcast receiver, or both communication endpoints have degraded or non-existent cellular or other IP connectivity and are unable to reach centralized authentication services. Various embodiments may meet basic operating concepts described in the FAA's proposed Drone ID and Tracking NPRM, apply the 1609.2 security model, and pave the way for the security services of 1609.2 to function within the constraints of ASTM F3411-19.

Figure 6A:
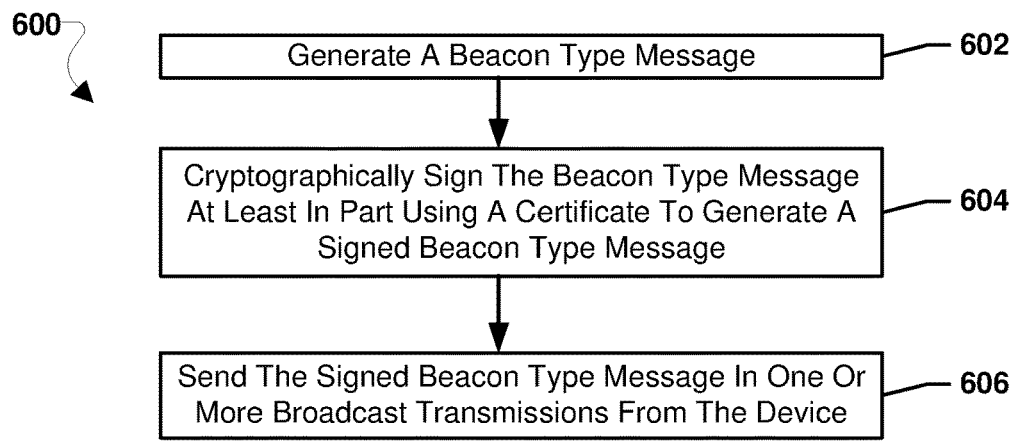
FIG. 6A is a process flow diagram illustrating a method for providing broadcast communications security in accordance with various embodiments.

FIG. 6A is a process flow diagram illustrating a method 600 for providing broadcast communications security that may be performed by a processor of a device. With reference to FIGS. 1-6A, the method 600 may be implemented by a processor (such as 210, 212, 214, 216, 218, 252, 260) of a device, such as a wireless device (e.g., the wireless device 120a-120f, 200, 270, 320 402, 407a-d) or a base station (e.g., the base station 110a, 350, BRD 290). In some embodiments, the operations of method 600 may be performed by a processor of a wireless device that is configured to broadcast small size messages, such as messages of a length of 125 bytes or less. As examples, the operations of method 600 may be performed by a processor of an IoT device, a processor of an autonomous, or semi-autonomous vehicle, a processor of a robot, a processor of a roadside infrastructure device, a processor of a UAS, etc. With reference to FIGS. 1-6A, means for performing each of the operations of the method 600 may be one or more processors of a device (e.g., a wireless device 120a-120f, 200, 270, 320 402, 407a-d, a base station 110a, 350, BRD 290, etc.), such as one or more of the processors 210, 212, 214, 216, 218, 252, 260 and/or the like.

In block 602, the processor may generate a beacon type message. A beacon type message may be a service, discovery, announcement, advertisement, or management type message or frame that may be sent in a one to many broadcast prior to any one to one paired communications between the device sending the beacon type message and another device. A beacon type message may be a small size message, such as message of a length of 125 bytes or less. Examples of beacon type messages may include Bluetooth beacon frames (e.g., Bluetooth 4 beacon frames, Bluetooth 5 beacon frames, Bluetooth 5 extended advertising frames, etc.), Wi-Fi beacon frames (e.g., Wi-Fi NAN service discovery frames, etc.), Zigbee beacon frames, ASTM F3411-19 authentication messages, etc.

In block 604, the processor may cryptographically sign the beacon type message at least in part using a certificate to generate a signed beacon type message. Cryptographically signing the beacon type message may include generating a digital signature using the certificate and/or other cryptographic elements (e.g., hash identifiers, certificate identifiers, timestamps, public key reconstruction values, explicit certificates, implicit certificates, etc.) and embedding the digital signature and/or other cryptographic elements in the beacon type message as cryptographic overhead to thereby generate a signed beacon. In various embodiments, the certificate may be an explicit certificate. In various embodiments, the certificate may an implicit certificate. In various embodiments, the certificate may be provided by a CA. In various embodiments, the certificate, or a portion of the certificate, may correspond to an identifier of the device, such as a universally unique identifier (UUID) or session identifier (session ID) assigned to a UAS. As a specific example, a bit portion of the certificate, such as a first 128 bits of the certificate, the last 128 bits of the certificate, the first 64 bits of the certificate, the last 64 bits of the certificate, the first 96 bits of the certificate, the last 96 bits of the certificate, the first 100 bits of the certificate, the last 100 bits of the certificate, etc., may correspond to the UUID or session ID assigned to a UAS.

A certificate used in block 604 may also contain an identifier (ID) defined by a cryptographic binding of a given UAS to a given UAS operator. Multiple such certificate IDs may be computed for the same tuple of {UAS, UAS_Operator}, representing broadcast certificates that may be short-lived but associated to the same drone and operator. In some aspects, an embedded certificate identifier may be a cryptographic binding of both a UAS identifier and an operator identifier, for example the full or partial hash value of a secret operator-identifying key in conjunction with the UAS identifier and a counter or other non-repeating or unique parameter, or may be a keyed message authentication code using the same inputs. As a specific example, in a UTM system each broadcast certificate may be identified by a cryptographic binding of the UAS identifier and operator identifier. Such cryptographic binding may reduce the number of certificate types and uses in the UTM system.

In various embodiments, the certificate may be an IEEE 1609.2 certificate. Various embodiments utilize lightweight, strong cryptographic certificates specified in IEEE 1609.2 to authenticate and integrity-protect UAS Broadcast ID messages. Providing functional and secure Broadcast ID is vital when the UAS, broadcast receiver, or both communication endpoints have degraded or non-existent cellular or other IP connectivity and are unable to reach centralized authentication services. Various embodiments may meet basic operating concepts described in the FAA's proposed Drone ID and Tracking NPRM, apply the 1609.2 security model, and pave the way for the security services of 1609.2 to function within the constraints of ASTM F3411-19.

IEEE 1609.2 is a standard that defines a compact cryptographic certificate format using NIST FIPS 186-4 Elliptic Curve Cryptography (ECC). IEEE 1609.2 certificates can be profiled as permissions-based and/or identity-based. These provide a level of trust in the holder of the certificate and is well-suited for both online and offline messaging. IEEE 1609.2 provides a security framework and set of primitives that enables the certificate to be used to meet a variety of communications security objectives beyond simple identification and authentication of the message or its sender, provides optional message consistency checks, relevance checks and 1609.2 security profile settings that can be tuned to the needs of a given application, and supports. mobile broadcast security in a network-disconnected environment. IEEE 1609.2 is a security technology engineered and standardized to be used in millions of network-disconnected, mobile devices (e.g., vehicle on-board equipment) as well as network-connected infrastructure devices. IEEE 1609.2-based security was engineered to function in environments characterized by severe bandwidth and message size limitations and/or high message broadcast rates. IEEE 1609.2 is also the de facto standard for securing vehicular and transportation infrastructure broadcast messages. The U.S. has standardized its use for all V2X broadcast communications. In late 2018, Europe (ETSI) adopted the 1609.2 certificate-based V2X messaging security for use throughout the European Union. In late 2019, the Chinese transportation standards body adopted 1609.2 to secure C-V2X vehicle/infrastructure broadcasting throughout China. Chipset manufacturers like Autotalks, Qualcomm, etc., have integrated 1609.2 certificates and associated secret and private key material into secure processors. IEEE 1609.2 security stacks and ancillary V2X PKI services exist today at Technology Readiness Level (TRL) 8-9. Thus, the aviation community and ASTM-compliant equipment makers can benefit from scaling-related cost reductions in software, hardware and PKI services offered by companies such as Green Hills ISS, Blackberry and others around the world supporting 1609.2. These services may be provided as integrated services within UTM/USS systems or as ancillary services to them.

IEEE 1609.2 certificates are the backbone of 1609.2 security services and are engineered to be very small and functional in bandwidth-constrained environments without sacrificing cryptographic strength. The 1609.2 certificate comes in both an explicit format in which the end entity's full public key is contained in the certificate, signed by a Certificate Authority (CA). It also comes in an implicit format "that allows the associated public key to be reconstructed from a reconstruction value and the certificate authority's public key rather than directly providing the associated public key."

Implicit certificates are based on the Elliptic Curve Qu-Vanstone Implicit Certificate Scheme (ECQV) and are significantly smaller in size than explicit certificates containing a full public key and Certificate Authority signature over the certificate. A 1609.2 implicit certificate is approximately 100 Bytes in length, small enough to be transmitted in an ASTM authentication or other custom message.

Pseudonym certificates, Identity and Application certificates are privacy-preserving 'authorization' certificate profiles defined using IEEE 1609.2 structures. Pseudonym certificates contain no long-term, static identity information linkable to the certificate owner. Pseudonym certificates are intended to have very short lifetimes and only be used for short durations to help preclude tracking and correlation threats. Identity and Application certificates contain static, identifying information specific to the certificate owner. These may be used for long periods of time. 1609.2 Identity and Application Certificates look identical (containing no linkage value) and vary only in the manner they are generated with the PKI provider. Either is acceptable for use to secure UAS broadcast messages.

IEEE 1609.2 cryptographic signatures leverage strong elliptic curve cryptography, specifically the ECDSA algorithm defined in the National Institute of Standards and Technology (NIST) Federal Information Processing Standard (FIPS) 186-4. Supported elliptic curves include NIST P256 and Brainpool P256. Cryptographic extensions have also been developed to support further internationalization, for example to allow the inclusion of Chinese SM-series cryptographic algorithms for use in China. Cryptographic signatures are defined in an IEEE 1609.2 Abstract Syntax Notation One (ASN.1) structure called SignedData. The embedded European Conference on Software Architecture (ECSA) 1609.2 signature is 64 Bytes in length. Per 1609.2, the signature may be performed 1) over an arbitrary Signed-Data Payload or 2) over the SHA-256 hash of arbitrary external data [HashedData]. The former must be used when applying 1609.2 to authenticate an ASTM message or message set.

In block 606, the processor may send the signed beacon type message in one or more broadcast transmissions from the device. Broadcasting the signed beacon type message may enable one to many delivery of the signed beacon type message. In various embodiments, the sending of the signed beacon type message may be periodic, such as every second, every ten seconds, etc. In various embodiments, sending the signed beacon type message in one or more broadcast transmission from the device may include sending the signed beacon type message in a plurality of broadcast pages or broadcast frames from the device, such as five broadcast pages or broadcast frames from the device (e.g., five Wi-Fi NAN pages, five Bluetooth 5 pages, five Bluetooth 4 pages, etc.).

Figure 6B:
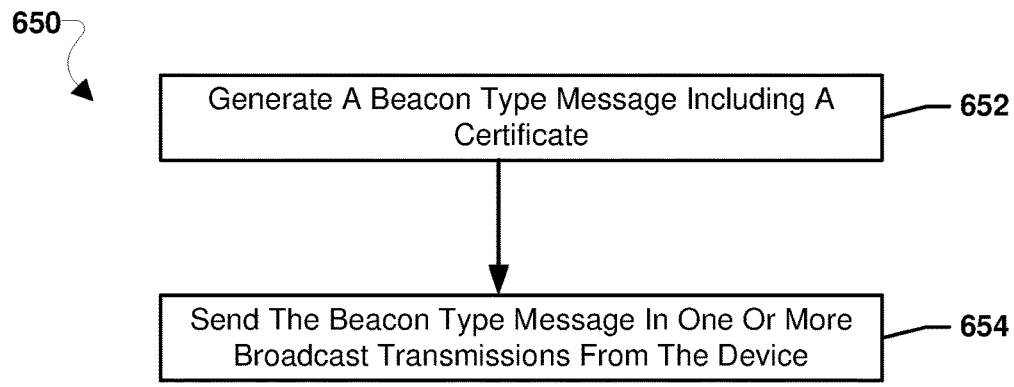
FIG. 6B is a process flow diagram illustrating a method for providing broadcast communications security in accordance with various embodiments.

FIG. 6B is a process flow diagram illustrating a method 650 for providing broadcast communications security that may be performed by a processor of a device. With reference to FIGS. 1-6B, the method 650 may be implemented by a processor (such as 210, 212, 214, 216, 218, 252, 260) of a device, such as a wireless device (e.g., the wireless device 120a-120f, 200, 270, 320 402, 407a-d) or a base station (e.g., the base station 110a, 350, BRD 290). In some embodiments, the operations of method 650 may be performed by a processor of a wireless device that is configured to broadcast small size messages, such as messages of a length of 125 bytes or less. As examples, the operations of method 650 may be performed by a processor of a IoT device, a processor of an autonomous, or semi-autonomous vehicle, a processor of a robot, a processor of a roadside infrastructure device, a processor of a UAS, etc. With reference to FIGS. 1-6B, means for performing each of the operations of the method 650 may be one or more processors of a device (e.g., a wireless device 120a-120f, 200, 270, 320 402, 407a-d, a base station 110a, 350, BRD 290, etc.), such as one or more of the processors 210, 212, 214, 216, 218, 252, 260 and/or the like. In various embodiments, the operations of method 650 may be performed in conjunction with the operations of method 600.

In block 652, the processor may generate a beacon type message including the certificate. The beacon type message may be a second beacon type message and may be similar to the beacon type message discussed with reference to block 602, such as a Bluetooth beacon frame (e.g., a Bluetooth 4 beacon frame, Bluetooth 5 beacon frame, Bluetooth 5 extended advertising frame, etc.), Wi-Fi beacon frames (e.g., Wi-Fi NAN service discovery frames, etc.), Zigbee beacon frames, ASTM F3411-19 authentication messages, etc. In some embodiments, the beacon type message generated in block 652 may be unsigned. In some embodiments, the beacon type message generated in block 652 may be signed, for example by performing the operations of block 604. In various embodiments, the certificate used to generate the signed beacon type message in block 604 may be the certificate included in the beacon type message in block 652.

In block 654, the processor may send the beacon type message in another one or more broadcast transmissions from the device. Broadcasting the beacon type message including the certificate may enable one to many delivery of the certificate to other devices. In various embodiments, the sending of the beacon type message including the certificate may be periodic, such as every second, every ten seconds, etc. In various embodiments, sending the beacon type message including the certificate in one or more broadcast transmission from the device may include sending the signed beacon type message in a plurality of broadcast pages or broadcast frames from the device, such as five broadcast pages or broadcast frames from the device (e.g., five Wi-Fi NAN pages, five Bluetooth 5 pages, five Bluetooth 4 pages, etc.). Sending the beacon type message including the certificate may provide the certificate of the device to other devices directly. In this manner, other devices may receive the certificate whether or not the other devices have network connectivity to a core network (e.g., core network 140) and/or CA server (e.g., CA server 156). In various embodiments, beacon broadcasts of the certificate may be in response to a command or other request that the device receives, such as from a ground-based electronic device, signaling over a network, etc.). In various embodiments, the beacon type message including the certificate may also include one or more CA certificates and/or trust chain content (or a pointer to such trust chain content). In various embodiments, CA certificates and/or trust chain content may be transmitted by third party devices, such as cellular base stations.

Figure 6C:
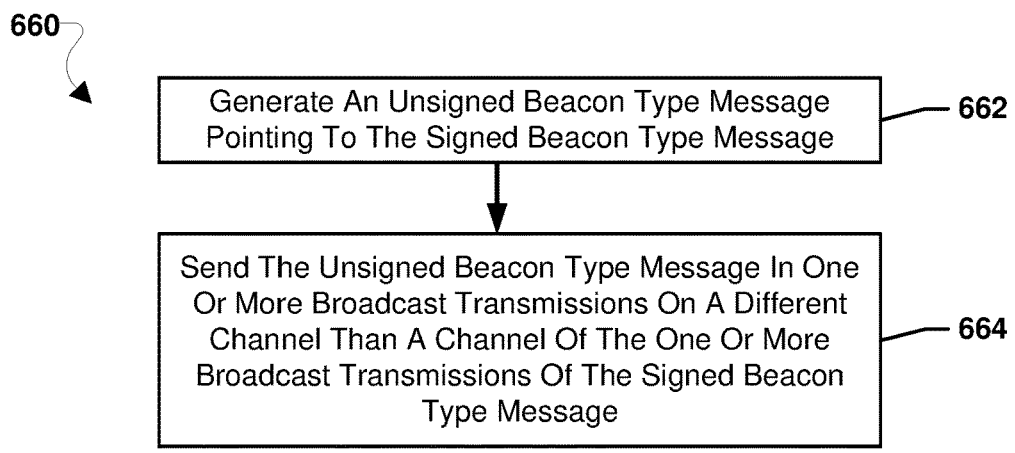
FIG. 6C is a process flow diagram illustrating a method for providing broadcast communications security in accordance with various embodiments.

FIG. 6C is a process flow diagram illustrating a method 660 for providing broadcast communications security that may be performed by a processor of a device. With reference to FIGS. 1-6C, the method 660 may be implemented by a processor (such as 210, 212, 214, 216, 218, 252, 260) of a device, such as a wireless device (e.g., the wireless device 120*a*-120*f*, 200, 270, 320 402, 407*a*-*d*) or a base station (e.g., the base station 110*a*, 350, BRD 290). In some embodiments, the operations of method 660 may be performed by a processor of a wireless device that is configured to broadcast small size messages, such as messages of a length of 125 bytes or less. As examples, the operations of method 660 may be performed by a processor of an IoT device, a processor of an autonomous, or semi-autonomous vehicle, a processor of a robot, a processor of a roadside infrastructure device, a processor of a UAS, etc. With reference to FIGS. 1-6C, means for performing each of the operations of the method 660 may be one or more processors of a device (e.g., a wireless device 120*a*-120*f*, 200, 270, 320 402, 407*a*-*d*, a base station 110*a*, 350, BRD 290, etc.), such as one or more of the processors 210, 212, 214, 216, 218, 252, 260 and/or the like. In various embodiments, the operations of method 660 may be performed in conjunction with the operations of methods 600 and/or 650.

In block 662, the processor may generate an unsigned beacon type message pointing to the signed beacon type message. The unsigned beacon type message may be a beacon message sent in a first channel that points to other beacon type messages broadcast in a second different channel. For example, the unsigned beacon type message may be a Bluetooth 5 beacon pointing to extended frames (e.g., up to 255 bytes) using a Bluetooth 5 Advertising Extension. As another example, the unsigned beacon type message may be a Wi-Fi NAN beacon pointing to a message pack or message set sent in another channel.

In block 664, the processor may send the unsigned beacon type message in one or more broadcast transmissions on a different channel than a channel of the one or more broadcast transmissions of the signed beacon type message. In this manner, the unsigned beacon type messages including pointers may be sent in a different channel than the signed beacon type message broadcast in block 606. Another device receiving the unsigned beacon type message including the pointer may listen to the other channel indicated in the pointer to receive the signed beacon type message.

Figure 7A:
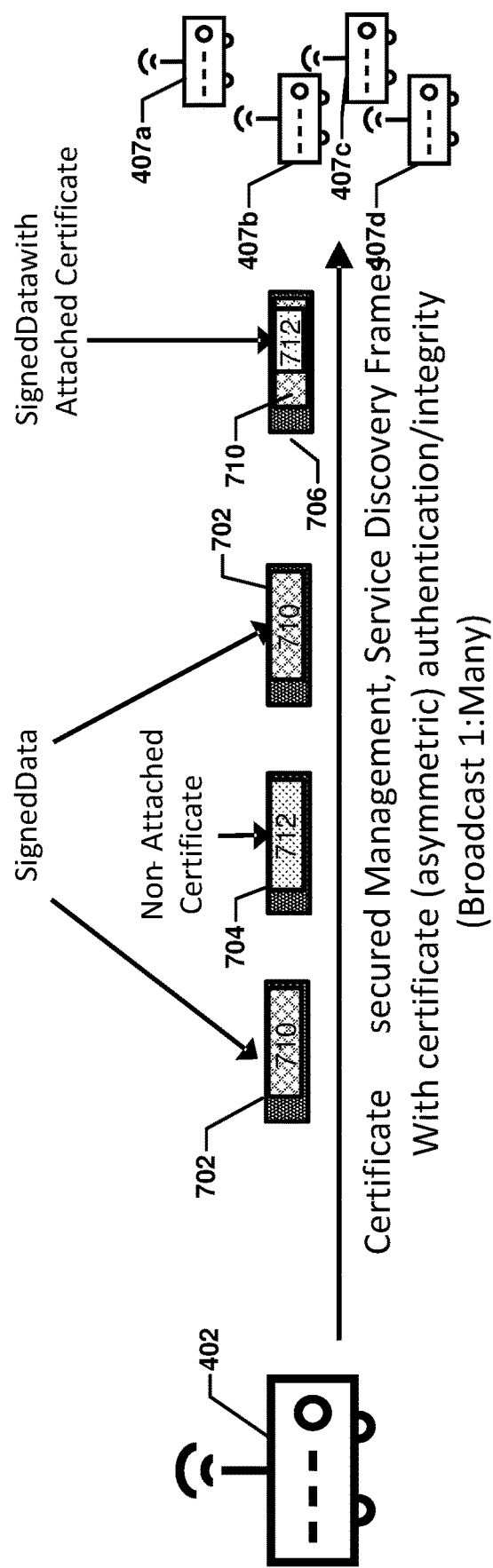
FIG. 7A is a block diagram illustrating broadcast transmission of beacon type messages in accordance with various embodiments.

FIG. 7A is a block diagram illustrating broadcast transmission of beacon type messages in accordance with various embodiments. With reference to FIGS. 1-7A, a broadcast of beacon type messages (e.g., Bluetooth 4 frames, Bluetooth 5 frames, Wi-Fi NAN frames, etc.) according to the operations of methods 600, 650, and/or 660 is illustrated in FIG. 7A. FIG. 7A illustrates that the wireless device 402 may broadcast signed beacon type messages 702. Signed beacon type messages 702 may include a cryptographic overhead 710, such as SignedData as referenced in IEEE 1609.2, that operates as a signature of the beacon type message 702. Beacon type message 704 may be broadcast by the wireless device 402 and may include the certificate 712. In some embodiments, the beacon type message 706 carrying the certificate 712 may also include the cryptographic overhead 710.

Figure 7B:
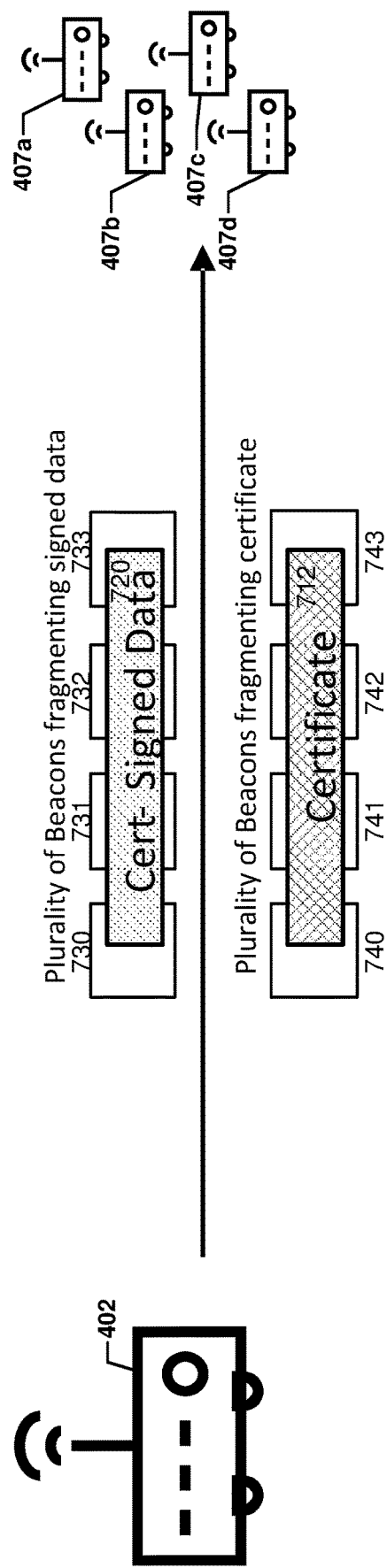
FIG. 7B is a block diagram illustrating broadcast transmission of beacon type messages in accordance with various embodiments.

FIG. 7B is a block diagram illustrating broadcast transmission of beacon type messages in accordance with various embodiments. With reference to FIGS. 1-7B, a broadcast of beacon type messages (e.g., Bluetooth 4 frames, Bluetooth 5 frames, Wi-Fi NAN frames, etc.) according to the operations of methods 600, 650, and/or 660 is illustrated in FIG. 7B. FIG. 7B illustrates that the wireless device 402 may fragment the certificate signed data 720 (e.g., the data of a message and the cryptographic overhead 710 signing that message data) across a plurality of beacon type messages 730, 731, 732, 733, such as across a plurality of frames or pages (e.g., Bluetooth frames or pages, Wi-Fi frames or pages, etc.). Similarly, FIG. 7B illustrates that the wireless device 402 may fragment the certificate 712 across a plurality of beacon type messages 740, 741, 742, 743, such as across a plurality of frames or pages (e.g., Bluetooth frames or pages, Wi-Fi frames or pages, etc.).

Figure 7C:
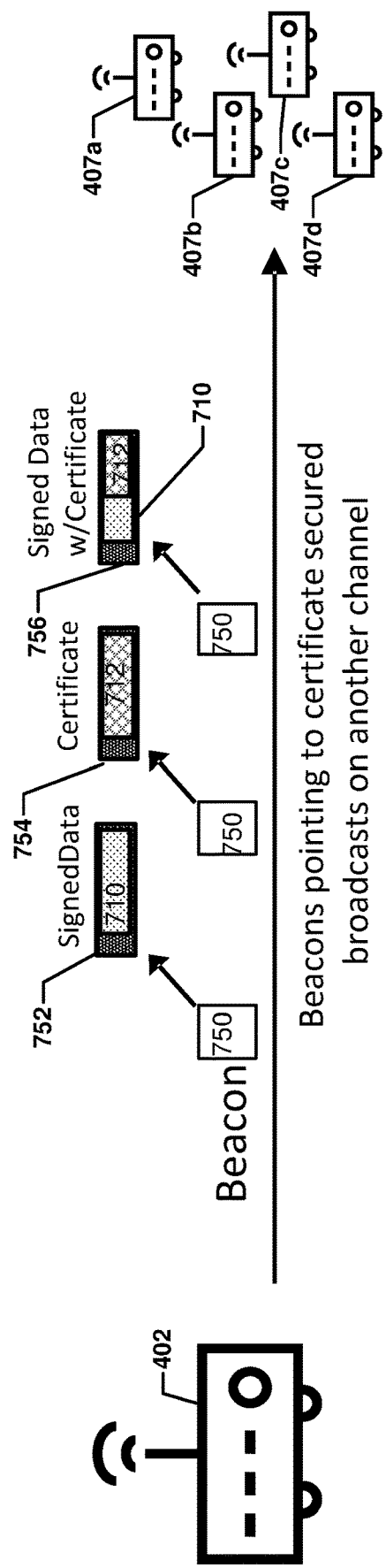
FIG. 7C is a block diagram illustrating broadcast transmission of beacon type messages in accordance with various embodiments.

FIG. 7C is a block diagram illustrating broadcast transmission of beacon type messages in accordance with various embodiments. With reference to FIGS. 1-7C, a broadcast of beacon type messages (e.g., Bluetooth 5 frames, Wi-Fi NAN frames, etc.) according to the operations of methods 600, 650, and/or 660 is illustrated in FIG. 7C. FIG. 7C illustrates that the wireless device 402 may send beacon type messages 750 including pointers to other beacon type messages 752, 754, 756 broadcast in a different channel. FIG. 7A illustrates that the wireless device 402 may broadcast signed beacon type messages 752. Signed beacon type messages 752 may include a cryptographic overhead 710, such as SignedData as referenced in IEEE 1609.2, that operates as a signature of the beacon type message 752. Beacon type message 754 may be broadcast by the wireless device 402 and may include the certificate 712. In some embodiments, the beacon type message 756 carrying the certificate 712 may also include the cryptographic overhead 710. As a specific example, the beacon type messages 750 may be Bluetooth 5 beacons pointing to extended frames 752, 754, 756 (up to 255 bytes in size) using the Bluetooth 5 Advertising Extension.

Figure 8:
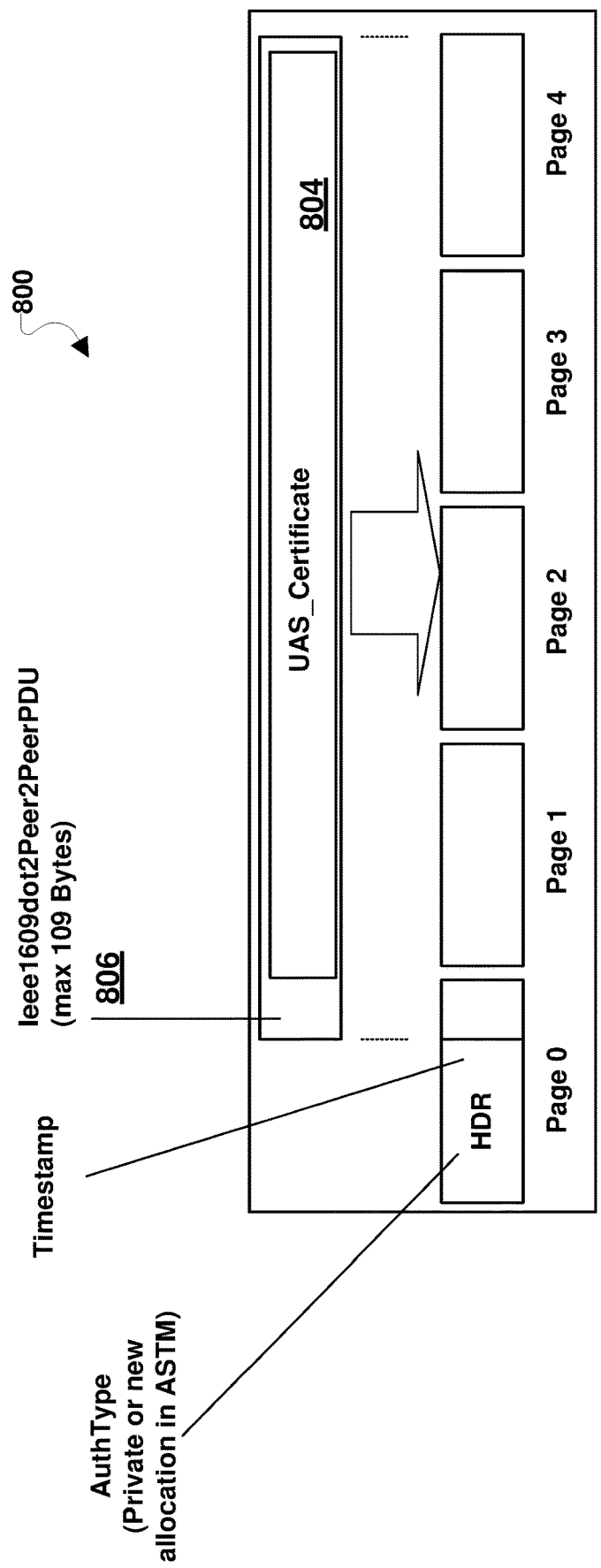
FIG. 8 is a block diagram illustrating a beacon type message in accordance with various embodiments.

FIG. 8 is a block diagram illustrating a beacon type message, such as a F3411-19 authentication message 800, in accordance with various embodiments. With reference to FIGS. 1-8, the F3411-19 authentication message 800 may be a beacon type message including a certificate of a device, such as a UAS certificate 804. The UAS certificate 804 may be carried in cryptographic overhead of the message, such as a P2PCD feature 806 of the message 800.

In some embodiments, the UAS may periodically broadcast its own certificate 804, a peer's or a CA certificate such as using the Peer-to-Peer certificate distribution (P2PCD) feature 806 in IEEE 1609.2. The P2PCD feature 806 was designed for use in disconnected environments when a message recipient is unable to verify a message due to a certificate missing from its trust chain. The UAS may use this technique to broadcast its certificate to surrounding devices.

The periodicity of UAS' certificate broadcasts may be static, adaptive, or responsive. In some embodiments, the UAS may broadcast its certificate every [certBroadcastInterval] second, by generating an Ieee1609dot2Peer2PeerPDU 806 with the content field containing the current UAS certificate, setting the ASTM Authentication message AuthType to A (i.e., private use) to indicate a dedicated authentication message used only to convey the UAS certificate, generating an ASTM Authentication message 800, populating its Authentication Data/Signature field (max. 109 Bytes) with the Ieee1609dot2Peer2PeerPDU 806, including a timestamp, and broadcasting the Authentication message 800. The UAS may only broadcast its current in-use certificate because receivers will typically reject any expired certificates.

Upon receiving a broadcasted Ieee1609dot2Peer2PeerPDU 806, broadcast receivers may parse and extract the UAS certificate information 804 from the Ieee1609dot2Peer2PeerPDU 806, cryptographically verify the certificate 804 based on its public key reconstruction value and known CA certificate, and perform a 1609.2 HashedId8 over the certificate (referred to as a certHash). If certHash is already known (i.e., the UAS authorization certificate and public key have already been cached), the broadcast receiver may discard the received certHash. Otherwise, the broadcast receiver may cache certHash and associate it to the reconstucted public key from the certificate 804.

Given the low flight speeds anticipated in most small UAS, a reasonable default certificate broadcast rate [certBroadcastInterval] may be on the order of 5 and 10 seconds but may be configurable or adaptive based on regional policies and available technology. Then all subsequent broadcast messages from the UAS may be immediately verifiable using the cached certificate.

Figure 9:
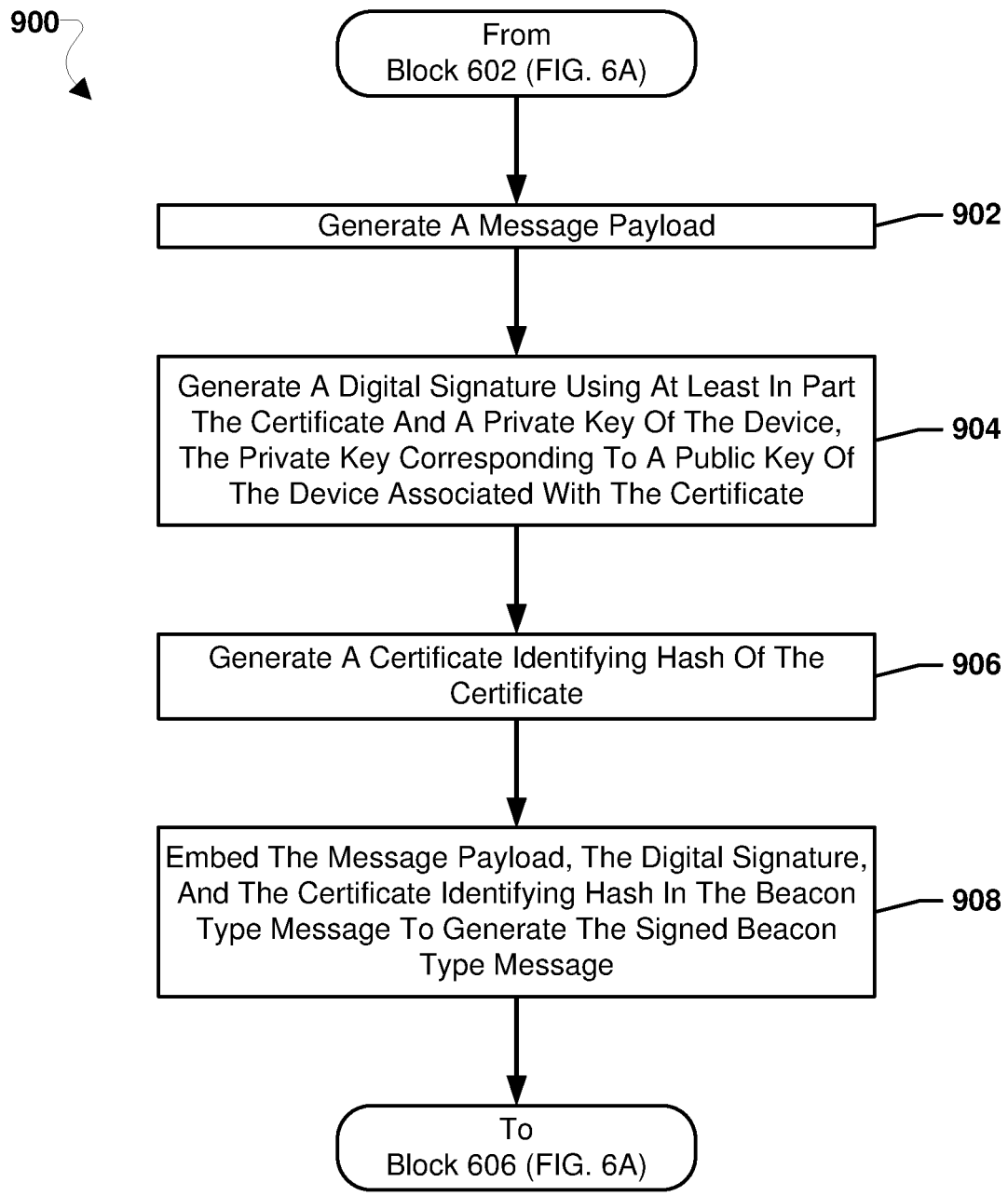
FIG. 9 is a process flow diagram illustrating a method for providing broadcast communications security in accordance with various embodiments.

FIG. 9 is a process flow diagram illustrating a method 900 for providing broadcast communications security in accordance with various embodiments. With reference to FIGS. 1-9, the method 900 may be implemented by a processor (such as 210, 212, 214, 216, 218, 252, 260) of a device, such as a wireless device (e.g., the wireless device 120a-120f, 200, 270, 320 402, 407a-d) or a base station (e.g., the base station 110a, 350, BRD 290). In some embodiments, the operations of method 900 may be performed by a processor of a wireless device that is configured to broadcast small size messages, such as messages of a length of 125 bytes or less. As examples, the operations of method 900 may be performed by a processor of an IoT device, a processor of an autonomous, or semi-autonomous vehicle, a processor of a robot, a processor of a roadside infrastructure device, a processor of a UAS, etc. With reference to FIGS. 1-9, means for performing each of the operations of the method 900 may be one or more processors of a device (e.g., a wireless device 120a-120f, 200, 270, 320 402, 407a-d, a base station 110a, 350, BRD 290, etc.), such as one or more of the processors 210, 212, 214, 216, 218, 252, 260 and/or the like. In various embodiments, the operations of method 900 may be performed in conjunction with the operations of methods 600, 650, and/or 660. In various embodiments, the operations of method 900 may be performed to cryptographically sign the beacon type message at least in part using the certificate to generate the signed beacon type message upon generating a beacon type message in block 602 of method 600 (FIG. 6A).

In block 902, the processor may generate a message payload. In some embodiments, a message payload may be a device message. As examples, the device message may be an ASTM message, such as an ASTM F3411-19 message. As a specific example, the device message may be a 25 byte ASTM F3411-19 message. In some embodiments, the message payload may be a hash of other data, or a portion of a hash of other data, such as a least significant sixteen bytes of a hash of other data. The other data may be data within the message, such as a timestamp of the message, other messages in a message set, header elements, etc. In some embodiments, the message payload may be an Automatic Dependent Surveillance-Broadcast (ADS-B) message to be broadcast over a small beacon or service advertisement frame.

In block 904, the processor may generate a digital signature using at least in part the certificate and a private key of the device, the private key corresponding to a public key of the device associated with the certificate. For example, the processor may generate a digital signature according to an IEEE 1609.2 security profile. In some embodiments, the digital signature may be a signature having a size of 64 bytes or a compressed signature of 32 bytes.

In block 906, the processor may generate a certificate identifying hash of the certificate. The certificate identifying hash of the certificate may be a truncated hash of the certificate used by a broadcast receiver to lookup the full certificate. As an example, the certificate identifying hash of the certificate may be generated using the HashedID8 function defined in IEEE 1609.2.

In block 908, the processor may embed the message payload, the digital signature, and the certificate identifying hash in the beacon type message to generate the signed beacon type message. In some embodiments, the message payload, the digital signature, and the certificate identifying hash may have a combined size of 109 bytes or less. In some embodiments, the embedded message payload, digital signature, and certificate identifying hash may be cryptographic overhead embedded in the beacon type message to thereby sign the beacon type message. As an example, the embedded message payload, digital signature, and certificate identifying hash may be embedded as IEEE 1609.2 SignedData.

Upon generating the signed message, the processor may perform operations of block 606 of FIG. 6A to send the signed beacon message.

Figure 10:
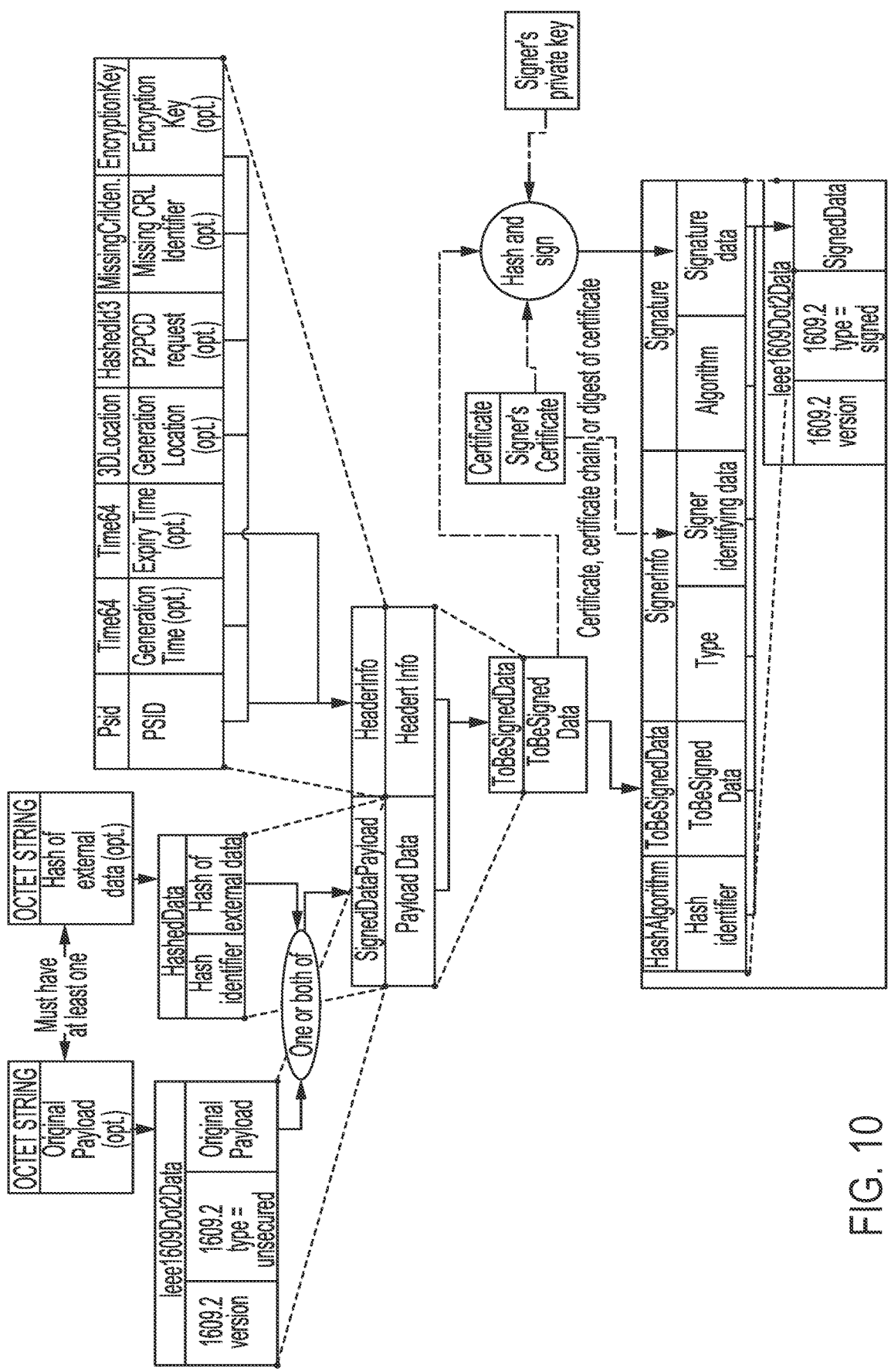
FIG. 10 is a signature profile in accordance with various embodiments.

FIG. 10 is a signature profile in accordance with various embodiments. With reference to FIGS. 1-10, the signature profile of FIG. 10 may be an IEEE 1609.2 signature profile that may result in IEEE 1609.2 SignedData element having a size of 109 bytes or less. FIG. 10 illustrates that to reduce the size of the SignedData element, only the Provider Service Identifier (PSID) header information element may be include in the signing signature. Other IEEE 1609.2 header information elements may be optional and not included to limit the IEEE 1609.2 SignedData element to having a size of 109 bytes or less. Other IEEE 1609.2 header information elements, such as generation time, expiry time, generation location, P2PCD request, Missing Certificate Revocation list (CRL) identifier, and/or encryption key may be optionally included in the signature profile, but may result in an IEEE 1609.2 SignedData element having a size of greater than 109 bytes. In some embodiments, the SignedData element may be larger than 109 bytes, such as 120 bytes or less, 125 bytes or less, etc. In some embodiments, ASTM messages or other type messages may be expanded to support security structures larger than 109 bytes, such as security structures of 120 bytes or less, 125 bytes of less, etc. In embodiments in which a signed data structure (e.g., an IEEE 1609.2 SignedData element, etc.) occupies an extended frame/advertisement type message (e.g., such as a beacon type message of 250 bytes, such as a Bluetooth 5 extended advertising frame or a Wi-Fi NAN service discovery frame, the full extended frame/advertisement type message (e.g., the full 250 bytes) may be used for both signing data and attaching the certificate together in the extended frame/advertisement type message.

Figure 11:
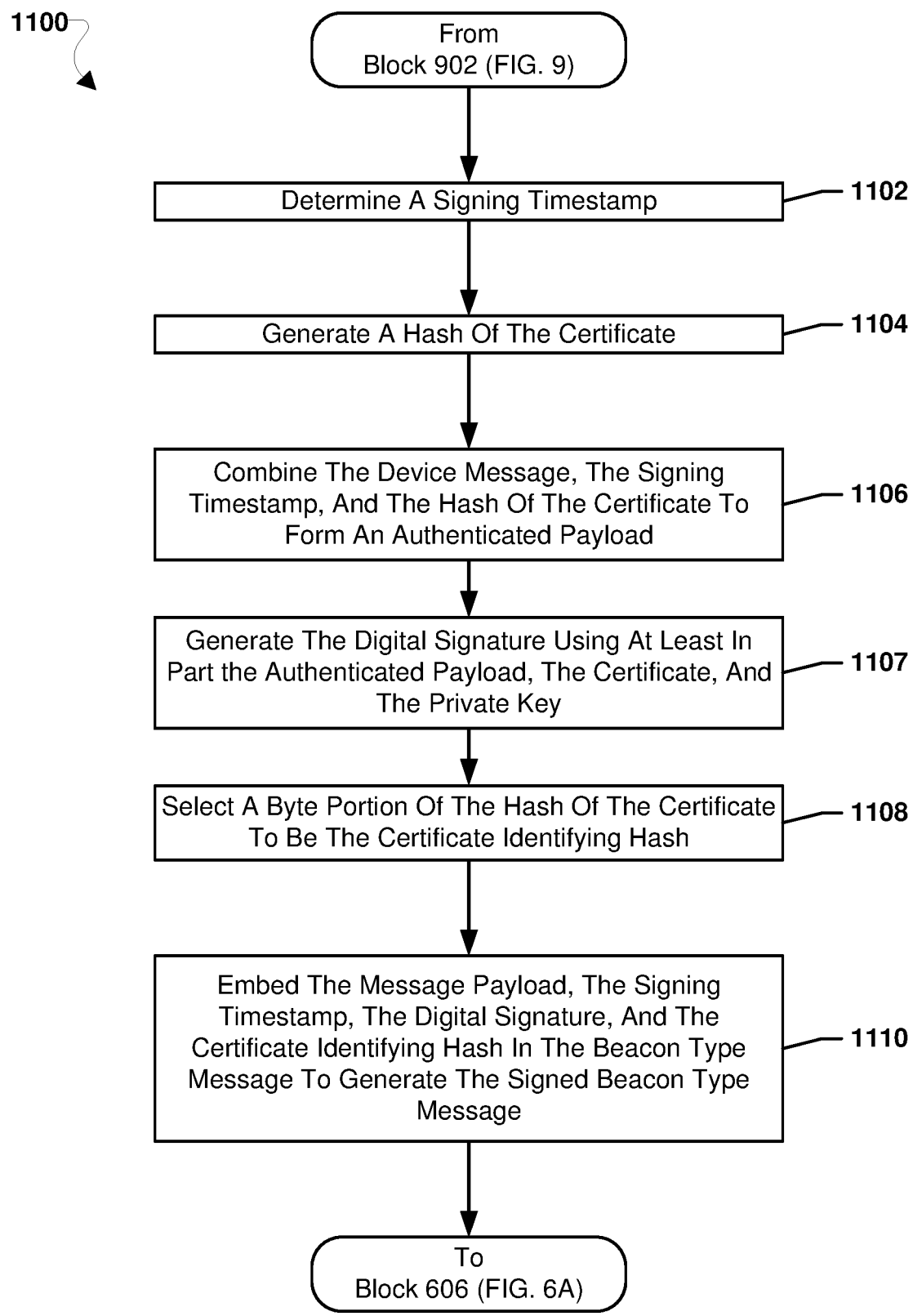
FIG. 11 is a process flow diagram illustrating a method for providing broadcast communications security in accordance with various embodiments.

FIG. 11 is a process flow diagram illustrating a method 1100 for providing broadcast communications security in accordance with various embodiments. With reference to FIGS. 1-11, the method 1100 may be implemented by a processor (such as 210, 212, 214, 216, 218, 252, 260) of a device, such as a wireless device (e.g., the wireless device 120a-120f, 200, 270, 320 402, 407a-d) or a base station (e.g., the base station 110a, 350, BRD 290). In some embodiments, the operations of method 1100 may be performed by a processor of a wireless device that is configured to broadcast small size messages, such as messages of a length of 125 bytes or less. As examples, the operations of method 1100 may be performed by a processor of an IoT device, a processor of an autonomous, or semi-autonomous vehicle, a processor of a robot, a processor of a roadside infrastructure device, a processor of a UAS, etc. With reference to FIGS. 1-11, means for performing each of the operations of the method 1100 may be one or more processors of a device (e.g., a wireless device 120a-120f, 200, 270, 320 402, 407a-d, a base station 110a, 350, BRD 290, etc.), such as one or more of the processors 210, 212, 214, 216, 218, 252, 260 and/or the like. In various embodiments, the operations of method 1100 may be performed in conjunction with the operations of methods 600, 650, 660, and/or 900. In various embodiments, the operations of method 1100 may be performed when the message payload is a device message (e.g., a 25 byte ASTM F3411-19 message, an ADS-B message, etc.) and upon generating a message payload in block 902 of method 900 (FIG. 9).

In some embodiments, the operations of blocks 1102, 1104, 1106, and 1107 may be performed by the processor to generate the digital signature using at least in part the certificate and the private key.

In block 1102, the processor may determine a signing timestamp. In some embodiments, the signing timestamp may indicate the indicate the signing time of the message. In some embodiments, the signing timestamp may have a size of 4 bytes or up to 8 bytes if included in the IEEE 1609.2 security header.

In block 1104, the processor may generate a hash of the certificate. In some embodiments, the hash of the certificate may be a hash over the entire certificate, such as a SHA-256 hash digest over the entire certificate.

In block 1106, the processor may combine the device message, the signing timestamp, and the hash of the certificate to form an authenticated payload. The authenticated payload may be a payload used in a signature profile, such as an IEEE 1609.2 signature profile illustrated in FIG. 10, to generate a digital signature.

In block 1107, the processor may generate the digital signature using at least in part the cryptographically authenticated payload, the certificate, and the private key. In some embodiments, the digital signature may be generated using a signature profile, such as standardized in IEEE 1609.2 and illustrated in FIG. 10. In some embodiments, the digital signature may be 64 bytes in length or 32 bytes if compressed.

In block 1108, the processor may select a byte portion of the hash of the certificate to be the certificate identifying hash. In this manner, the processor may generate the certificate identifying hash of the certificate. As an example, the selecting of the byte portion of the hash of the certificate to be the certificate identifying hash may include performing HashedID8 operations to define the 8 least significant bytes of the SHA-256 hash digest over the entire certificate as the certificate identifying hash.

In block 1110, the processor may embed the message payload, the signing timestamp, the digital signature, and the certificate identifying hash in the beacon type message to generate the signed beacon type message. In some embodiments, the message payload, the signing timestamp, the digital signature, and the certificate identifying hash may have a combined size of 125, 109 bytes or less. In some embodiments, the embedded message payload, the signing timestamp, the digital signature, and the certificate identifying hash may be cryptographic overhead embedded in the beacon type message to thereby sign the beacon type message. As an example, the embedded message payload, the signing timestamp, the digital signature, and the certificate identifying hash may be embedded as IEEE 1609.2 SignedData. In some embodiments, the signing timestamp may be included in a header of the signed beacon message in addition to, or instead of, being in a payload of the signed beacon type message.

Upon generating the signed message, the processor may perform operations of block 606 of FIG. 6A to send the signed beacon message.

Figure 12A:
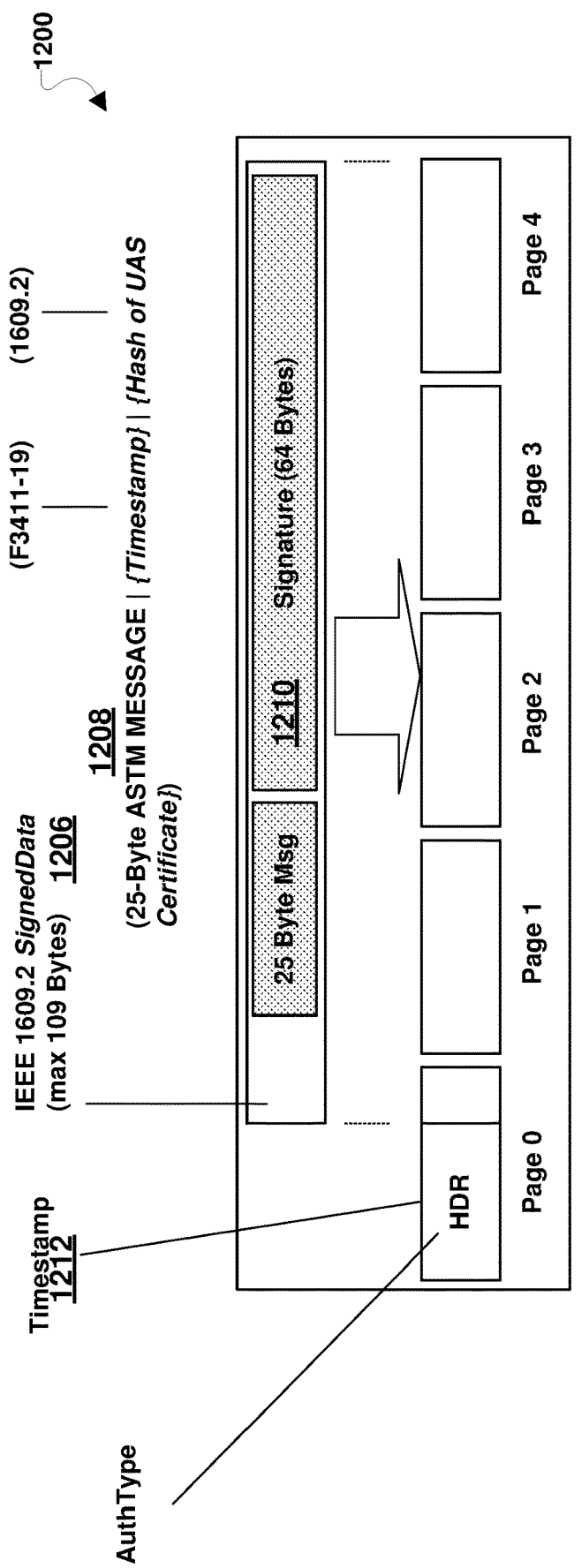
FIG. 12A is a block diagram illustrating a beacon type message in accordance with various embodiments.

FIG. 12A is a block diagram illustrating a beacon type message 1200 in accordance with various embodiments. With reference to FIGS. 1-12A, the beacon type message 1200 may be an example ASTM F3411-19 authentication message generated according operations of methods 600, 900, and 1100. The timestamp 1212 may be the signing timestamp. The 25 byte message 1208 may be a device message, such as a 25 byte ASTM message. Specific examples of the 25 byte message 1208 may include a Basic ID Message (Type 0x0) to be used for a drone's identification (e.g., serial number, UUID, etc.) that is limited to 25 Bytes; a Location/Vector Message (Type 0x1) that provides the drone's Location, speed, direction, and altitude that is also limited to 25 Bytes; a Self ID Message (Type 0x3) that may be a short text describing the drone's current actions and that is limited to 25 Bytes; a System Message (Type 0x4) that identifies the operator location and/or flight region and is limited to 25 Bytes; and/or an Operator ID Message (Type 0x5) that includes a regulator-issued operator ID and is limited to 25 Bytes. The IEEE 1609.2 SignedData 1206 may be cryptographic overhead of the message 1200 and may include the 25 byte message 1208 and the signature 1210 (e.g., a 64 byte signature). The message 1200 may be sent across five pages (Page 0-4) of broadcast transmission (e.g., five Bluetooth 4 pages, five Bluetooth 5 pages, five Wi-Fi NAN pages, etc.).

Figure 12B:
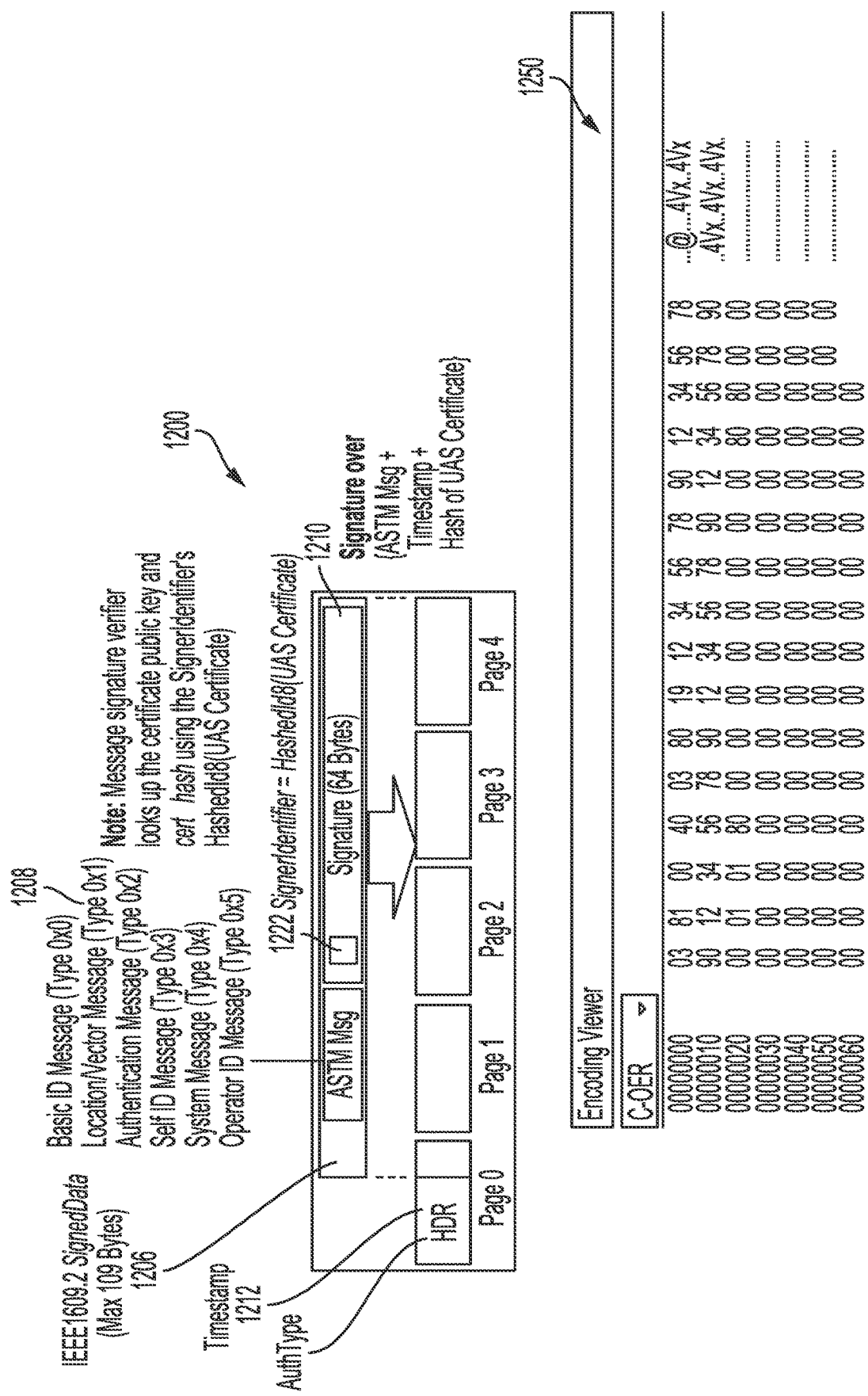
FIG. 12B is a block diagram illustrating a beacon type message and its encoder values and encoded sizes in accordance with various embodiments.

FIG. 12B is a block diagram illustrating the beacon type message 1200 and its encoder values 1250 in accordance with various embodiments. With reference to FIGS. 1-12B, FIG. 12B further illustrates the SignerIdentifier 1222, a certificate identifying hash (e.g., the HashedID8 of the UAS certificate) included with the 25 byte message 1208 (or optionally, an attached certificate) and signature 1210. IEEE 1609.2 supports additional signature size-reductions by omitting the 1609.2 certificate (containing the verification public key or reconstruction value) from the signature and instead attaching a hash-based identifier of the certificate. While omitting the certificate is supported, attaching the full certificate is also supported. The structure indicating which method to use is provided in the SignedData sub-structure, SignerIdentifier 1222. When pointing to the signing certificate using its hash, SignerIdentifier 1222 is of type 'digest' [a HashedId8 structure] where HashedId8 is defined as the 8 least significant bytes of the SHA-256 hash digest over the entire certificate. A full 1609.2 SignedData structure identifying the signing certificate using a 1609.2 HashedId8 is approximately 100 Bytes in size. 1609.2 support of ASTM is realized by the compactness of this structure and its ability to fit within the 5-page, 109 Byte authentication data structure defined in the ASTM Authentication message or similar message types constructed from multiple pages each limited to 25 bytes in length.

FIG. 12C illustrates elements of signed data, such as IEEE 1609.2 SignedData 1206, for use in a beacon type message, such as message 1200, in accordance with various embodiments. With reference to FIGS. 1-12C, the 125 Byte container may include the following fields: AuthType (options are 'None', 'UAS ID Signature', 'Operator ID Signature', 'Message Set Signature' and 'Authentication Provided by Network Remote ID)—4 bits; Page Number (4 Bits) shown on each page; Page Count (1 Byte) shown on Page 0 only; Length (1 Byte) indicating the length of the contents in the Authentication Data/Signature field; Timestamp (4 Bytes) indicating the signing time; Authentication Data/Signature (109 Bytes) indicating all of the signature-related data provides for an IEEE 1609.2 SignedData structure that fits within the 109-Byte constraint of the Authentication Data/Signature field as illustrated in FIG. 12C, or optionally greater message sizes if embedding in native IEEE 1609.2 headers.

In some embodiments, a message 1200 may be generated to support legacy single message authentication with any of Bluetooth 4, Bluetooth 5 and WiFi communication technologies. In such embodiments, the authentication method allows the UAS to authenticate its identity, that of the UAS operator or a single, arbitrary 25-Byte ASTM message using a 5-page ASTM Authentication message or an IEEE 1609.2 signed data structure independent on the ASTM message size constraint. ASTM version 0 legacy-mode supports a single Authentication message consisting of up to 5 25-Byte pages that can be broadcast in 25-Byte sequences over Bluetooth 4 beacons (legacy) or either of the 250-Byte Bluetooth 5 or WiFi NAN protocols. The 125 Byte container may include the following fields: AuthType (options are 'None', 'UAS ID Signature', 'Operator ID Signature', 'Message Set Signature' and 'Authentication Provided by Network Remote ID)—4 bits; Page Number (4 Bits) shown on each page; Page Count (1 Byte) shown on Page 0 only; Length (1 Byte) indicating the length of the contents in the Authentication Data/Signature field; Timestamp (4 Bytes) indicating the signing time; Authentication Data/Signature (109 Bytes) indicating all of the signature-related data Method A provides for an IEEE 1609.2 SignedData structure that fits within the 109-Byte constraint of the Authentication Data/Signature field. A minimalist, but complete IEEE 1609.2 SignedData structure with 25-Bytes of signed payload (e.g., arbitrary ASTM message), with a 1-Byte PSID, SignerIdentifier type of 'Digest' may result as shown in FIGS. 12A-C. Thus, using IEEE 1609.2 methods, a UAS may authenticate any of the 25-byte legacy F3411-19 messages, not just identity information, using legacy Bluetooth communication technologies. When signing with this embodiment, there is no need to send a dedicated message to authenticate the UAS or its operator (i.e., Basic ID Message or Operator ID message), because the use of the certificate associated with either identifier type already authenticates both the message signed with that certificate as well as the identity who sent it. For example, the IEEE 1609.2 signing of an ASTM location/vector message authenticates the sender as well as the message. In this embodiment, the message signing process may include: generating an ASTM 25-Byte message, which is the payload; collecting the timestamp and performing a 1609.2 ECDSA signature over {payload+timestamp+cert-hash}, which is the signature; indicating Indicate a signer of type 'digest', per section 6.3.26 of IEEE 1609.2, generating the HashedId8 of the certificate, per [1609.2] and populate this in the signer 'digest' field; populate the signature field with the signature; C-OER-encode the [1609.2] SignedData structure with the resultant binary placed into the ASTM Authentication message Authentication Data/Signature field and include the same timestamp used in the signature; and cryptographically authenticating the resultant Authentication message, embedding the ASTM message and message-sender. The UAS may then broadcast the resulting message over Bluetooth 4, Bluetooth 5 Extended advertising or WiFi NAN, per ASTM. In a similar embodiment, a native IEEE 1609.2 SignedData structure may form its own Authentication message with similar size constraints (i.e., fragmented across a small number of 25-byte beacon frames) but independent of ASTM Authentication message fields.

In this embodiment, the inclusion of the certHash in the signature is automatic in IEEE 1609.2, which prevents certificate mis-binding attacks. Most signature types today do not provide this added protection.

Figure 13:
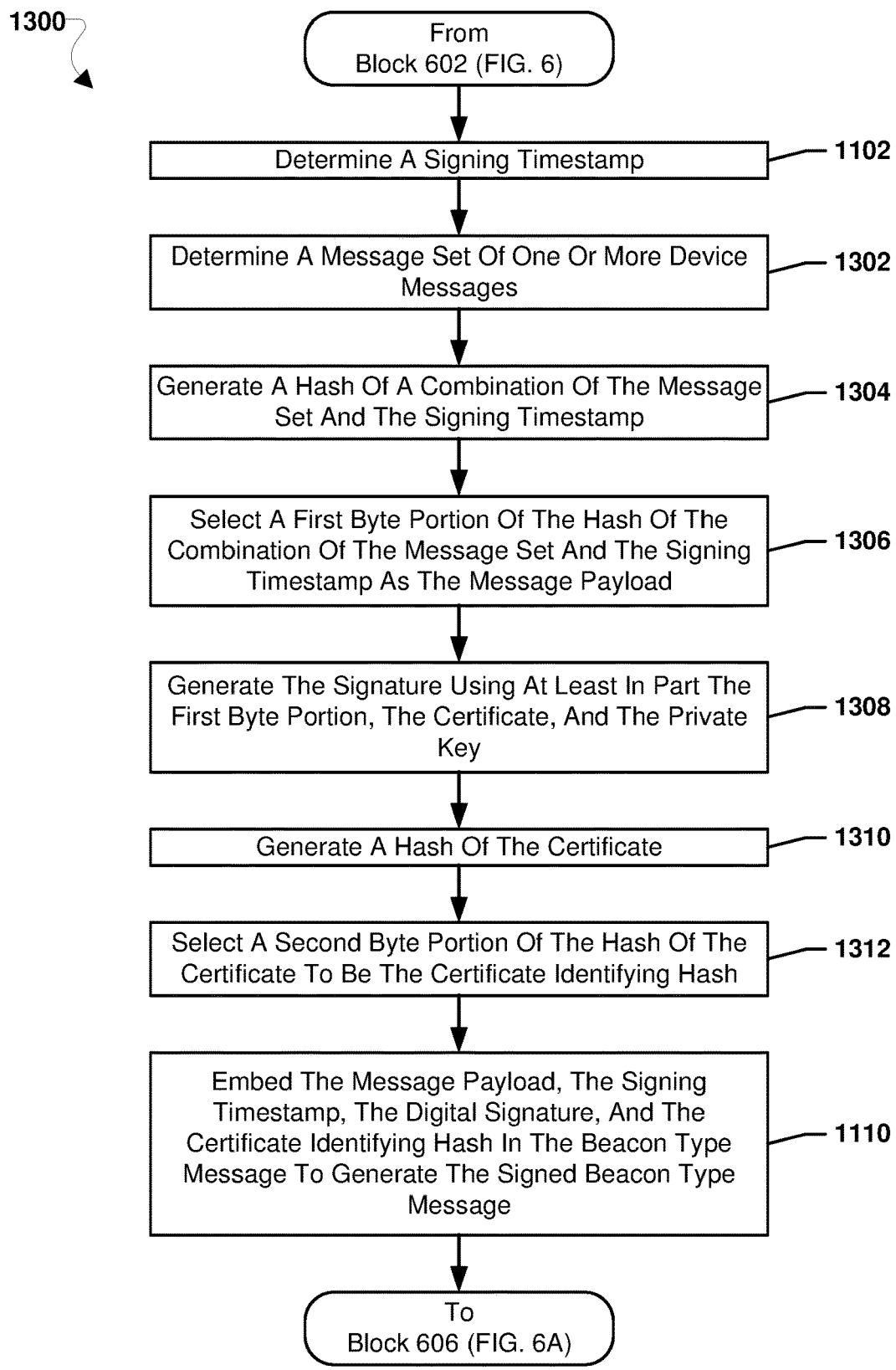
FIG. 13 is a process flow diagram illustrating a method for providing broadcast communications security in accordance with various embodiments.

FIG. 13 is a process flow diagram illustrating a method 1300 for providing broadcast communications security in accordance with various embodiments. With reference to FIGS. 1-13, the method 1300 may be implemented by a processor (such as 210, 212, 214, 216, 218, 252, 260) of a device, such as a wireless device (e.g., the wireless device 120a-120f, 200, 270, 320 402, 407a-d) or a base station (e.g., the base station 110a, 350, BRD 290). In some embodiments, the operations of method 1300 may be performed by a processor of a wireless device that is configured to broadcast small size messages, such as messages of a length of 125 bytes or less. As examples, the operations of method 1300 may be performed by a processor of an IoT device, a processor of an autonomous, or semi-autonomous vehicle, a processor of a robot, a processor of a roadside infrastructure device, a processor of a UAS, etc. With reference to FIGS. 1-13, means for performing each of the operations of the method 1300 may be one or more processors of a device (e.g., a wireless device 120a-120f, 200, 270, 320 402, 407a-d, a base station 110a, 350, BRD 290, etc.), such as one or more of the processors 210, 212, 214, 216, 218, 252, 260 and/or the like. In various embodiments, the operations of method 1300 may be performed in conjunction with the operations of methods 600, 650, 660, and/or 900. In various embodiments, the operations of method 1300 may be performed to authenticate a message set. The operations of method 1300 may support native ASTM encapsulation with various broadcast technologies, such as Bluetooth 5, Wi-Fi communication technologies, etc. The operations of method 1300 may be performed upon generating a beacon type message in block 602 of method 600 (FIG. 6).

In some embodiments, the operations of blocks 1102, 1302, 1304, and 1306 may be performed by the processor to generate a message payload.

In block 1102, the processor may determine a signing timestamp. For example, the processor may perform operations as discussed with reference to method 1100 (FIG. 11) to determine a signing timestamp.

In block 1302, the processor may determine a message set of one or more device messages. A message set may be a group of messages, such as ASTM messages to be broadcast by the device.

In block 1304, the processor may generate a hash of a combination of the message set and the signing timestamp. For example, the processor may perform a SHA-256 hash over the message set and the signing timestamp according to IEEE 1609.2.

In block 1306, the processor may select a first byte portion of the hash of the combination of the message set and the signing timestamp as the message payload. For example, the HashedId16 (the least 16 significant bytes of the SHA-256 hash) over the concatenation of the message and timestamp may be selected as the message payload, or the message payload may be an entire ASTM message pack if transmitting on a service advertisement frame up to 250 or 255 bytes in length.

In block 1308, the processor may generate the digital signature using at least in part the first byte portion, the certificate, and the private key. For example, the processor may perform an IEEE 1609.2 signature over the message payload to produce an IEEE 1609.2 SignedData structure (using signer of type 'digest') as the digital signature.

In some embodiments, the processor may perform operations of blocks 1310 and 1312 to generate the certificate identifying hash.

In block 1310, the processor may generate a hash of the certificate. The hash of the certificate may be a SHA-256 hash of the certificate according to HashedID8 of IEEE 1609.2.

In block 1312, the processor may select a second byte portion of the hash of the certificate to be the certificate identifying hash. The certificate identifying hash of the certificate may be a truncated hash of the certificate used by a broadcast receiver to lookup the full certificate. As an example, the certificate identifying hash of the certificate may be generated using HashedID8 of IEEE 1609.2.

In block 1110, the processor may embed the message payload, the signing timestamp, the digital signature, and the certificate identifying hash in the beacon type message to generate the signed beacon type message. For example, the processor may perform operations as discussed with reference to method 1100 (FIG. 11) to embed the message payload, the signing timestamp, the digital signature, and the certificate identifying hash in the beacon type message to generate the signed beacon type message.

Upon generating the signed message, the processor may perform operations of block 606 of FIG. 6A to send the signed beacon message.

Figure 14:
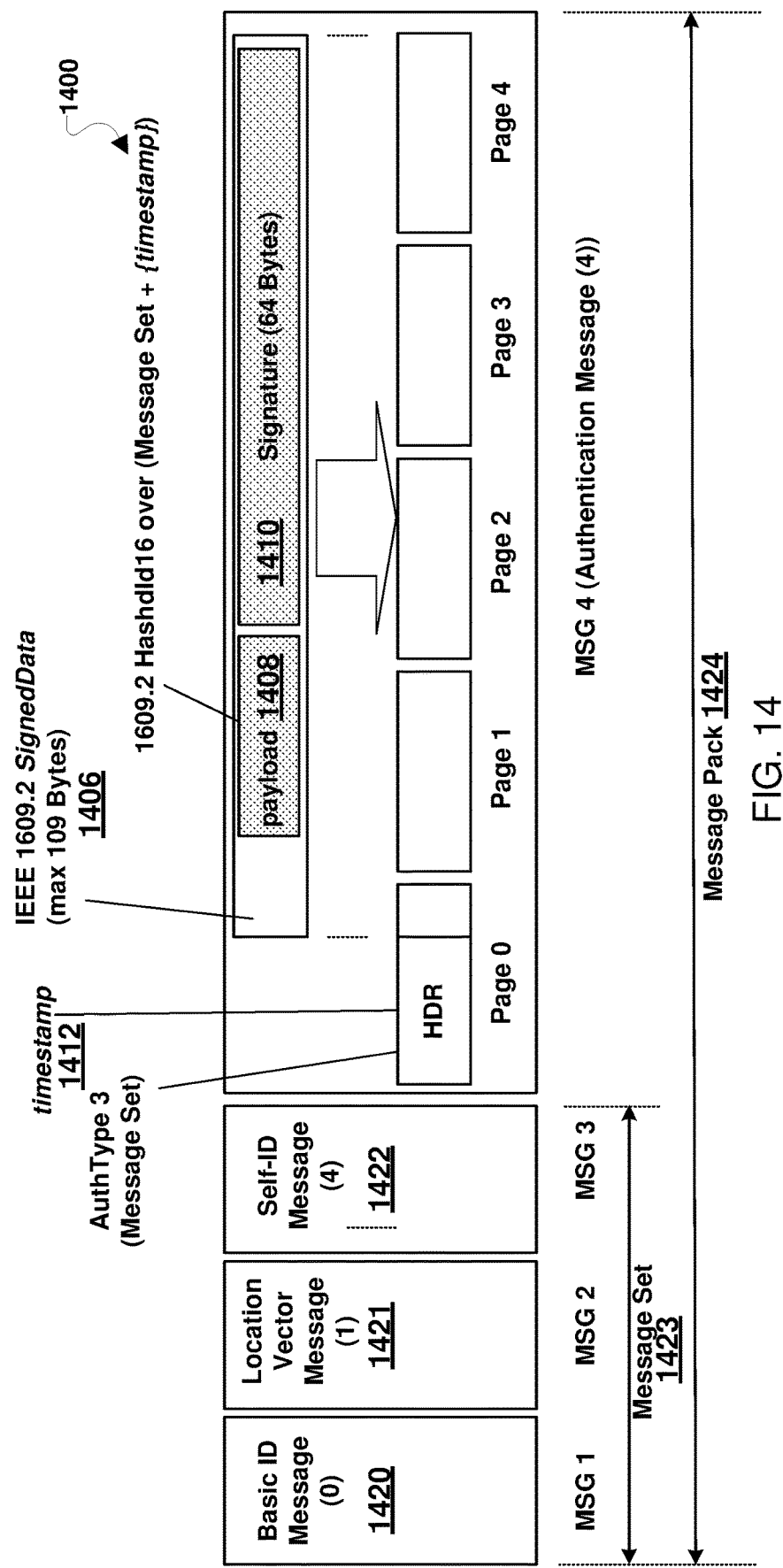
FIG. 14 is a block diagram illustrating a beacon type message, message set, and message pack in accordance with various embodiments.

FIG. 14 is a block diagram illustrating a beacon type message 1400, message set 1423, and message pack 1424 in accordance with various embodiments. With reference to FIGS. 1-14, the beacon type message 1400 may be an example ASTM F3411-19 authentication message generated according operations of methods 600, 900, 1100, and 1300. The message set 1423 may include a basic ID message 1420, location vector message 1421, and self-ID message 1422. The timestamp 1412 may be the signing timestamp. The IEEE 1609.2 SignedData 1406 may be cryptographic overhead of the message 1400 and may include the message payload 1408 that may be the HashedID16 over the concatenation of the message set 1423 and the timestamp 1412. The IEEE 1609.2 SignedData 1406 may also include the signature 1410 (e.g., a 64 byte signature or 32 byte compressed signature). The beacon type message 1400 may be sent across five pages (Page 0-4) of broadcast transmission (e.g., five Bluetooth 5 pages, five Wi-Fi NAN pages, etc.) as part of the message pack 1424 including the message set 1423 and the beacon type message 1400.

In some embodiments, the beacon type message 1400 may be generated by a UAS to authenticate a message set using native ASTM encapsulation with various communications technologies, such as with Bluetooth 5, Wi-Fi, etc., communication technologies. In such embodiments, the authentication method allows the UAS to authenticate an arbitrary message set by appending it with a 5-page ASTM Authentication message. This method permits an open drone ID message set to be authenticated by appending an ASTM Authentication message to one or more ASTM-defined Broadcast ID messages. The UAS may authenticate the messages so long as the cumulative length of the messages along with the appended Authentication message do not exceed 250 Bytes. Alternatively, the prepended ASTM messages may be fully contained in a native IEEE 1609.2 SignedData structure and authenticated without pre-hashing or providing pointers to prepended content to include in the signature calculation.

In this embodiment, a process for the message sender may include: generating an ASTM message set; generating a timestamp for the Message Set; performing an IEEE 1609.2 HashedId16 (the least 16 significant bytes of the SHA-256 hash) over the concatenation of the Message Set and timestamp (the result called the payload); performing an IEEE 1609.2 signature over payload to produce an IEEE 1609.2 SignedData structure (using signer of type 'digest'); putting the signature and header info into the SignedData structure; inserting the COER-encoded SignedData structure into the ASTM Authentication message's Authentication Data/Signature field (per Tables 8-9 of ASTM), resulting in a 99-100 Bytes field (depending on whether a 1 or 2-Byte PSID is used); putting the COER-encoded SignedData into the ASTM Authentication Message Authentication Data/Signature field including the timestamp; and appending the message set with the Authentication message within a Message Pack not exceeding the 250 Byte limit. The result is a Message Set that is authenticated and the completed Message Pack can be broadcast over Bluetooth 5 Extended advertising or Wi-Fi NAN.

A broadcast receiver may verify messages according to this embodiment by: parsing and extracting the Message Set; appending the Message set with the timestamp taken from the Authentication Message; generating a HashedId16 over this data (the resultant called toBeVerified); determining whether this value is identical to the payload in the SignedData structure, the verification fails; and performing a signature verification over payload using the public key from the cached UAS certificate in response to the toBeVerified value is not identical to the payload in the SignedData structure. If the signature verification is successful, the Message Set and the UAS are authenticated. If the toBeVerified value is not identical to the payload in the SignedData structure then verification fails.

In another embodiment method, UASs may authenticate a message or message pack with full IEEE 1609 encapsulation with either Bluetooth 5 or WiFi communication technologies. In such embodiments, the authentication method encapsulates a full ASTM message or message pack in an IEEE 1609.2 SignedData structure of its own message type and makes no use of the version 0 ASTM Authentication message. This authentication method may enable broader use of the IEEE 1609.2 security services and precludes use of the ASTM Authentication message (message 4) and its 109 Byte limitation on authentication data size. This method would, at minimum, slightly exceed the existing 109 limitation, and thus would not be available using the Bluetooth 4 communication technology. If constraining to 109-byte or 125-byte ASTM message and frame size limitations, this embodiment can also work over multiple pages of Bluetooth 4 beacons and embed a single 25-byte ASTM message as signed payload.

This embodiment may involve defining an additional message type. With the addition of a new message type in ASTM or another standard, Bluetooth 5 Extended and WiFi NAN broadcasting can benefit from using additional IEEE 1609.2 encapsulation, 1609.2 header elements, and associated security capabilities. This method makes use of a 1609.2 SignedData encapsulation of a complete ASTM Message Pack. The proposed message structure may be a variation of the version 0 ASTM Message Pack message.

In this embodiment, a process for the UAS to authenticate Broadcast ID messages may include: generating an ASTM message or message pack consisting of multiple messages, up to six (6), which is referred to as Authenticated Data; generating the IEEE 1609.2 security header including a one or two-byte Provider Service Identifier (PSID) and an 8-byte entry for GenerationTime, as well as adding any additional IEEE 1609.2 header parameters based on the needed security profile of the broadcast application, the result of which called HeaderInfo; concatenating SignedDataPayload with HeaderInfo to produce to-be-signed data (tbsData); generating an IEEE 1609.2 SignedData structure by performing a 1609.2 signature over tbsData using the private key corresponding to the IEEE 1609.2 public key of the UAS certificate using signer type 'digest' and indicating which UAS authorization certificate signed this message by indicating its HashedId8; and encapsulating SignedData in an Ieee1609Dot2Data (2-Byte header).

This embodiment method will support ASTM message packs up to six messages in length (150 Bytes) and does not use the native ASTM Authentication message. Additionally, this embodiment method makes use of the IEEE 1609.2 Security Services to provide message generation time (8 bytes), a feature that may be helpful in mitigating replay attacks before the receiving application has even accepted the message for processing. The embodiment method also provides greater flexibility in using additional security header fields related to generation location, service-specific permissions and others.

In this embodiment, broadcast receivers may verify the IEEE 1609.2-secured message or message pack by: extracting the 1609.2 Authenticated data from the 1609SecuredMessagePack message; verifying the 1609.2 ECDSA signature; checking the generation time in 1609.2 security header for message freshness if signature verification was successful; extracting the message payload, a fully qualified ASTM message pack (or message); and parsing and processing the ASTM Message pack.

Existing 1609.2-supporting PKI definitions, client interfaces and services are available today for use in UAS Broadcast ID. Client interfaces to PKI are defined in IEEE 1609.2.1. A PKI is the source of 1609.2 credential-based trust for any UAS operating securely in the National Airspace System. Based on the architecture defined for the transportation industry, the PKI may include the following nodes: Root CA, which may be the root of trust, a self-signed or Elector-signed credential used to issue Intermediate CA, Enrollment CA and other CA credentials within the PKI; Enrollment CA, which may issue Enrollment credentials to UAS communications modules in the manufacturing environment (or secure depot facility); Intermediate CA, which issues other Intermediate CAs, Misbehavior Authorities, Enrollment Authorities and Authorization Authorities (likely in a specific domain); Authorization CA, which signs and issues Authorization certificates for UAS. Authorization certificates may be of type Identity (uses static identifiers) or of type Pseudonym (short-term certificates with no publicly linking identifiers linking operator to the UAS); Registration Authority (RA), which provides the external interface through which a UAS obtains Authorization certificates from the Authorization CA; Misbehavior Authority (MA), which is the PKI entity through which the FAA may revoke a UAS enrollment from its trust relationship in the National Airspace System (NAS).

In this PKI trust architecture, the UAS may not interact directly with the Authorization CA—the entity that issues certificates used to sign UAS Broadcast ID messages—and may need to go through a Registration Authority (RA). The RA may be run by a USS provider, or the USS may have direct, contracted services from a RA. The UAS may connect to the RA directly or via the USS. In the Misbehavior Authority (MA) PKI entity, the FAA may indicate (directly, or via a USS) that a UAS with a specific serial number, Enrollment certificate or Authorization certificate needs to be revoked. The MA may coordinate the blacklisting of the Enrollment credential (such that it may obtain no more Authorization certificates) and the addition of the UAS to a published Certificate Revocation list (CRL). The MA (or the Enrollment CA, depending on the implementation) may expose an interface to law enforcement that allows the discovery of the UAS owner/operator associated with a given certificate (as obtained by a misbehaving UAS broadcasting its certificate-signed ID/Tracking data).

Activities associated with UAS production and provisioning in the supply chain may include security processes to ensure the security of fielded ID and tracking functions. Broadly, supply chain security may include the following processes: bootstrapping and enrolling the UAS Hardware; registering the UAS; operationalizing the UAS; transferring ownership; and revoking the UAS.

Provisioning a trusted UAS ID/Tracking communications in the National Airspace System (NAS) may involve the following processes. The chipset hardware manufacturer may provision the chip's cryptographic hardware root of trust into the chip/board hardware security module (HSM). All subsequent trust of the chipset stems from this root of trust. The UAS manufacturer may acquire chipsets or communications modules with integrated chips. The UAS manufacturer integrates the communications module into the UAS along flight command, control and communications firmware. The UAS manufacturer may authenticate the chip via its root of trust and its trust relationship with the chipset manufacturer, assign and install a UAS serial number, and bootstrap and enroll the UAS into the SCMS (Public Key Infrastructure). At the conclusion of this stage, the UAS has a serial number and IEEE 1609.2 enrollment certificate mapping to or containing that serial number. The enrollment certificate may be used later by the UAS owner or operator (e.g., via the UAS ground control software) to sign and request authorization [Broadcast ID] certificates from the PKI). Broadcast ID certificates may be short-lived or longlived, and their embedded identifiers may be cryptographically constructed using a secret or private key value in conjunction with a cryptographic function using operator and/or UAS identifier information as inputs.

The Enrollment certificate (with the UAS serial number) and/or its hash value may be transmitted or made available to the FAA. The FAA does not yet associate the enrollment to a specific operator, however, until the operator registers the UAS and conveys the same serial number.

Upon purchase, an owner/operator may acquire the UAS from a seller/manufacturer. During FAA registration, the FAA may link the known UAS (serial number) and Enrollment certificate to the registered owner. In this process, the UAS owner/operator may register the UAS with the FAA using an FAA registration portal, providing the UAS serial number, enrollment certificate hash, and owner/operator information. The FAA may then look up the enrollment certificate based on its hash (provided by manufacturers), confirm that the provided UAS serial number matches the serial number in the stored enrollment certificate, map the enrollment certificate (and embedded UAS serial number) to the owner/operator, and provide a registration receipt to the owner/operator. The UAS owner/operator now possesses a FAA registration receipt that may be used during USS/PKI sign-up to indicate that the owner/operator has the right to obtain authorization (Broadcast ID) certificates from a PKI certificate provider and obtain USS Identity and Tracking services. In some embodiments, a registration receipt may be substituted by leveraging a trusted interface between the FAA and USS/Authentication providers, through which the registration status of an enrollment certificate and serial number can be provided to the USS. A USS may additionally offer PKI registration services and provide authorization certificates at the time USS services are obtained. Otherwise, a UAS operator may obtain certificates directly from the PKI as a prerequisite to registering with a USS. USS entities may support both options. In addition, a UAS owner may add or remove other operators as authorized operators of a given UAS. Such operators may obtain unique Broadcast ID certificates that associate or bind them with the given UAS.

The owner/operator may sign up for and obtain USS services. Either prior to, or in conjunction with such sign up, the UAS may be provisioned with UAS Broadcast ID certificates from the PKI. PKI services may be provided opaquely to the UAS owner via the USS. The USS may implement its own PKI Registration Authority or obtain contracted services from a third-party Registration Authority.

A change-of-ownership may be performed by the UAS owner/operator initiating a 'release' of the UAS (allowing its Enrollment certificate and serial number to be associated to a new owner) with the FAA registration portal. A release code (receipt verifying the release) may be provided by the FAA to the old owner/operator. This release also is indicated to the PKI. Once released, the new UAS owner may register the UAS with the FAA and secure her own PKI and USS services. The new owner may then add or remove authorized operators who may obtain unique Broadcast ID certificates binding them individually with the UAS.

An owner/operator may permanently decommission and de-register a UAS, using the FAA registration portal to request the decommissioning. This may be necessary, for example, if the UAS is damaged or otherwise inoperable. In response to such a request, the FAA may no longer allow the Enrollment Certificate and serial number to be associated with a new owner/operator. The FAA may additionally notify the PKI 'issuer' of the Enrollment certificate such that it blacklists from requesting operational Broadcast ID certificates. To ensure the aviation community no longer trusts the UAS, the PKI may add any of the UAS' unexpired broadcast certificates to a network-published Certificate Revocation List (CRL).

Figure 15:
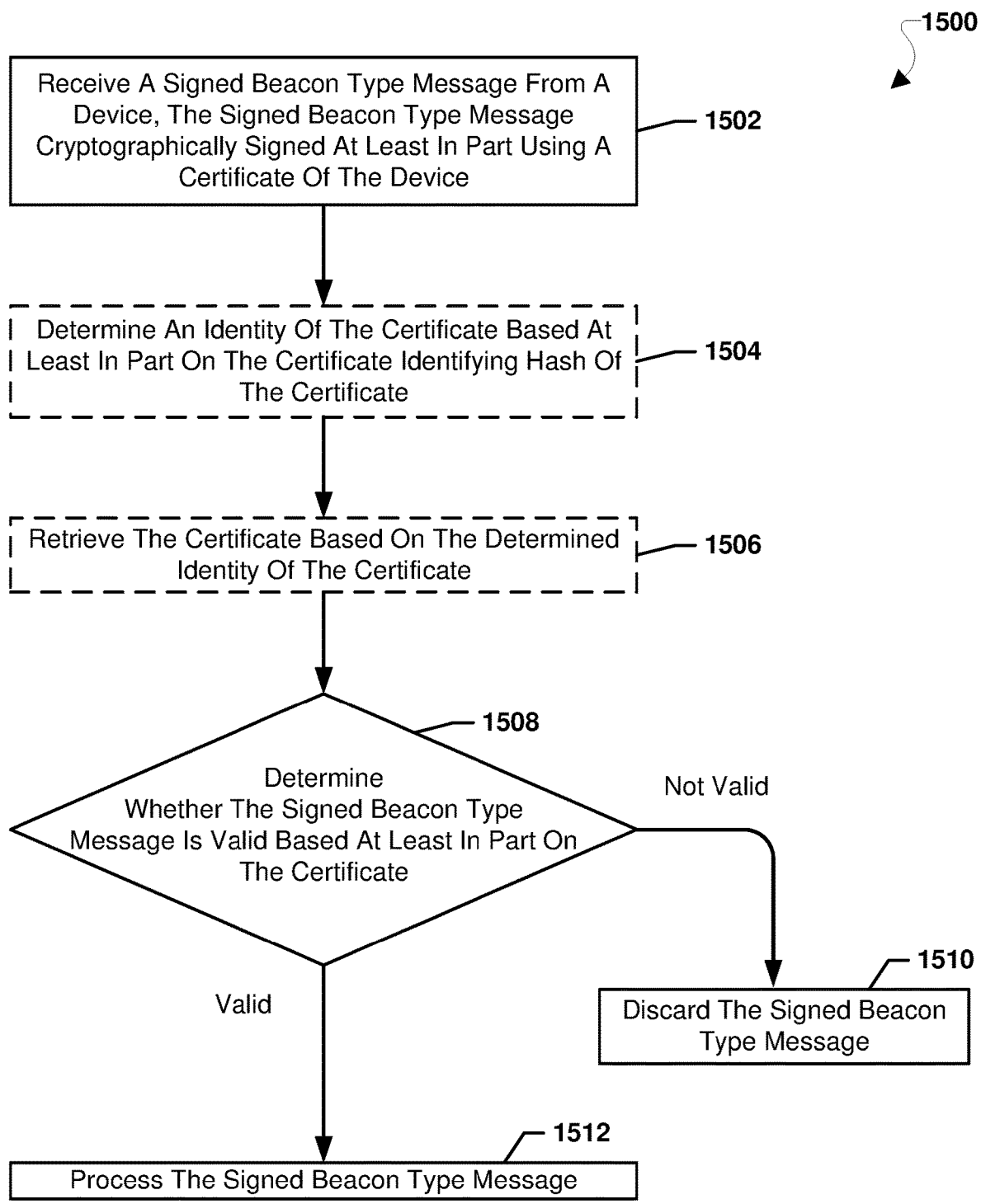
FIG. 15 is a process flow diagram illustrating a method for authenticating broadcast communications in accordance with various embodiments.

FIG. 15 is a process flow diagram illustrating a method 1500 for authenticating broadcast communications in accordance with various embodiments. With reference to FIGS. 1-15, the method 1500 may be implemented by a processor (such as 210, 212, 214, 216, 218, 252, 260) of a device, such as a wireless device (e.g., the wireless device 120a-120f, 200, 270, 320 402, 407a-d) or a base station (e.g., the base station 110a, 350, BRD 290). In some embodiments, the operations of method 1500 may be performed by a processor of a wireless device that is configured to receive small size messages, such as messages of a length of 125 bytes or less, broadcast by another device. As examples, the operations of method 1500 may be performed by a broadcast receiver device of a law enforcement entity (e.g., a police officer's UE), a broadcast receiver device of an emergency responder, a broadcast receiver device of a military unit, etc. With reference to FIGS. 1-15, means for performing each of the operations of the method 1500 may be one or more processors of a device (e.g., a wireless device 120a-120f, 200, 270, 320 402, 407a-d, a base station 110a, 350, BRD 290, etc.), such as one or more of the processors 210, 212, 214, 216, 218, 252, 260 and/or the like. In various embodiments, the operations of method 1500 may be performed in conjunction with the operations of methods 600, 650, 660, 900, 1100, and/or 1300. In various embodiments, the operations of method 1500 may be performed to verify messages originating from a device, such as messages originating from a UAS, an IoT device, a vehicle, a robot, etc.

In block 1502, the processor may receive a signed beacon type message from a device, the signed beacon type message cryptographically signed at least in part using a certificate of the device. For example, the signed beacon type message may be a signed beacon type message broadcast by a device (e.g., the wireless device 120a-120f, 200, 270, 320 402, 407a-d, the base station 110a, 350, BRD 290, etc.) in block 606 according to the operations of methods 600, 900, 1100, and/or 1300.

In optional block 1504, the processor may determine an identity of the certificate based at least in part on the certificate identifying hash of the certificate. For example, the processor may determine an identity of the certificate using HashedID8 procedures of IEEE 1609.2.

In optional block 1506, the processor may retrieve the certificate based on the determined identity of the certificate. In some embodiments, the certificate may be cached on the broadcast receiver device and the retrieval may be from a memory of the broadcast receiver device. In some embodiments, the processor may download the certificate from a remote entity, such as a CA server (e.g., CA server 156) or other trust establishment entity.

Blocks 1504 and 1506 may be optional because in some embodiments the certificate itself may be included in the signed beacon type message.

In determination block 1506, the processor may determine whether the signed beacon type message is valid based at least in part on the certificate. For example, the processor may perform various cryptographic functions using the certificate to validate the signed beacon type message, data elements within the signed beacon type message, and/or the signature of the signed beacon type message.

In response to determining that the signed beacon type message is not valid (i.e., determination block 1508="Not Valid"), the processor may discard the signed beacon type message in block 1510.

In response to determining that the signed beacon type message is valid (i.e., determination block 1508="Valid"), the processor may process the signed beacon type message in block 1512. Processing the signed beacon type message may include authenticating a broadcasting device, determining an identity of a broadcasting device, starting pairing operations with a broadcasting device, etc.

In various embodiments, a certificate hash may be used by broadcast receivers as an index to the full certificate that it received from prior UAS broadcasts or from out-of-band methods (e.g., a web-based Authentication service lookup). When disconnected from a network, the UAS certificate may be made available to the broadcast receiver that requires its public key to cryptographically verify the drone's broadcasted message. Caching of certificate hashes and associated certificate public keys enables quick receiver-side signature verification of UAS messages.

A full 1609.2 SignedData structure identifying the signing certificate using a 1609.2 HashedId8 is approximately 100 Bytes in size. 1609.2 support of ASTM is realized by the compactness of this structure and its ability to fit within the 5-page, 109 Byte authentication data structure defined in the ASTM Authentication message.

Various embodiments may include methods for securing UAS ID and Tracking broadcasts within the constraints of ASTM. Cryptographic identities may be represented and authenticated in the form of digital certificates containing public keys vouched for, i.e., 'signed', by a Certificate Authority. The public key may be used by a broadcast receiver to verify messages signed by a UAS. Both sender and receiver may trust the Certificate Authority that generated the UAS certificate. Absent a cryptographic binding of the UAS identity to its certificate, verification of UAS broadcasts is not feasible without network support.

To enable 1609.2 authentication of messages, a Certificate Authority trust chain may be deployed in or made available to the broadcast receiver. The Certificate Authority trust chain is a structure indicating one or more Certificate Authorities and their roots of trust. This structure may be published electronically and made available to any entity needing to trust UAS broadcasts.

To implement 1609.2 authentication, the UAS may be provisioned a 1609.2 Enrollment certificate and issued a flight Certificate. The UAS will use this certificate for requesting flight-usable Authorization certificates from an approved certificate provider (described in Certificate Management Services) or a PKI-integrated USS. The flight Certificate may be used by the UAS to sign its broadcasts. This certificate is defined as an IEEE 1609.2 Identity or Application Certificate (note: the certificate type must be 'Implicit' to ensure the compactness of the certificate and its ability to be broadcast within ASTM message size limitations).

To enable 1609.2 authentication of messages, broadcast receiver may obtain the UAS certificate so that it can verify signed messages received from the UAS.

The proposed Federal Aviation Regulations stipulate three identification methods supported by ASTM in its Basic ID Message (Type 0x0): the UAS Serial Number—per the ANSI/CTA-2063-A Serial Number format; Civil Aviation Authority (CAA) issued Registration ID; and UTM-assigned Identifier in the form of a 128-bit UUID (16 Bytes). The maximum size of these identifiers may 20 Bytes if using the ASTM Basic ID Message.

Achieving basic communications security objectives in a disconnected network environment may be facilitated if the UAS identity can be authenticated and the integrity and non-repudiation all UAS broadcast messages can be maintained and cryptographically bound to a specific UAS. Absent these provisions, any entity can easily tamper, spoof or maliciously replay a UAS broadcast ID message.

Various embodiments include methods of binding broadcast identifier types to a 1609.2 UAS certificate, which may include embedding an existing, pre-generated identifier. An additional option defines a UAS UUID as the cryptographic hash (or derivative thereof) of the UAS broadcast certificate.

In some embodiments, a UAS be identified using its static serial number. In this case, the UAS serial number (or a cryptographic hash or keyed message authentication code over the UAS serial number and operator ID) may populate the 1609.2 certificate's certificate_id field. The UAS certificate profile may include the UAS serial number or related identifier and have a format such as: type: Implicit Certificate (uses public key reconstruction value); certificate_id=Serial Number (length=16 Bytes); 1-Byte PSID (Provider Service Identifier); 2-Byte SSP (Service Specific Permissions); and Signer identifier type=hash. A serial number based UAS certificate may be static and unchanging, and so should not be used by entities requiring greater privacy. Privacy may be enhanced using a short-lived identity and further enhanced by rotating the broadcast ID certificate each time the Bluetooth or WiFi MAC address changes. The lifetime of the serial number based 1609.2 certificate identifier may be encoded directly in the 1609.2 certificate; however, regional policies may permit this identifier to be indefinite. Most non-commercial UAS are likely to use this method. The UAS certificate size when embedding a UAS Serial Number may be 86 Bytes.

In some embodiments, a UAS be identified using a CAA-issued identifier used to populate the 1609.2 certificate's certificate_id field. Embedding this 20-Byte identifier, the UAS certificate profile may have the format: type: Implicit Certificate (uses public key reconstruction value); certificate_id=CAA-issued Identifier (length=Up to 20 Bytes); 1-Byte PSID (Provider Service Identifier); 2-Byte SSP (Service Specific Permissions); and Signer identifier type=hash. A CAA-issued identifier may be short or long-term and its lifetime can be encoded directly in the 1609.2 certificate, as dictated by regional policy. The total UAS certificate size when embedding a CAA-Issued Registration ID may be 90 Bytes.

In some embodiments, a UAS be identified using a short-duration UUID similar to a network session ID. UUIDs are intended to be short-lived to reduce tracking related privacy threats to UAS operators. In some embodiments, the UUID may be cryptographically authenticated by embedding the UUID in the UAS certificate or constructing the UUID from 128 bits of hash-based or message authentication code values using operator and/or UAS identifiers as input. In some embodiments, the UUID may be cryptographically authenticated by defining the UUID as the least significant 16 Bytes of the SHA-256 hash of the UAS certificate. Either option may be performed depending on the USS and certificate services business model. The latter option may be simpler and negate the need to manage both a UUID and a certificate hash to link the UUID to the certificate.

In embodiments in which the UUID may be cryptographically authenticated by embedding the UUID in the UAS certificate in conjunction with the operator's certificate request, the USS provides a fresh UUID to an internal or external PKI service. This UUID may be provided in conjunction with the operator's certificate request generated during flight planning. The PKI may be used to generate the UAS certificate with the USS-provided UUID and authenticate the certificate. Using a 16-Byte embedded UUID in this embodiment, the 1609.2 certificate profile may have the following format: type: Implicit Certificate; certificate_id=UUID (16 Bytes); 1-Byte PSID (Provider Service Identifier); 2-Byte SSP (Service Specific Permissions); and Signer identifier type=hash. The certificate size when embedding the USS-Issued ID (Option 1) may be 86 Bytes.

In embodiments in which the UUID may be cryptographically authenticated by defining a UUID or session ID as the least significant 8 or 16 Bytes of the SHA-256 hash of the UAS certificate, the USS may obtain a short-term UUID by passing the operator's UAS certificate request to the PKI and indicating 'no pre-generated UUID.' PKI may be used to generate the certificate_id either with a null value or a code indicating the cryptographic hash function to use for deriving the UUID from the certificate. In the embodiment, the certificate profiled have the following format: type: Implicit Certificate; certificate_id=NULL (0 Bytes); 1-Byte PSID (Provider Service Identifier); 2-Byte SSP (Service Specific Permissions); and Signer identifier type=hash. The UAS certificate size in this embodiment may be, minimally, 72 Bytes. This small size is achievable because the UUID (certificate identifier) is not a separate parameter, but the resultant of a one-way function over the certificate itself. The USS may compute the UUID by performing an IEEE 1609.2 HashedId8 or HashedId16 of the UAS certificate, both of which are truncations of the certificate's SHA-256 hash. This value may be transformed into a human-readable form, as needed, within user interfaces.

In various embodiments, broadcast receivers need the UAS's broadcast ID certificate to verify messages originating from the UAS. A broadcast receiver may obtain the UAS certificate in a variety of ways. In some embodiments, a broadcast receiver may detect a UAS-signed message broadcast and determine whether the broadcast receiver already has the UAS certificate and can cryptographically verify messages signed with it. This may be performed by checking the HashedId8 value indicated in the received broadcast's 1609.2 SignedData structure and determining whether the receiver has already cached the UAS authorization certificate pertaining to that value. If the certificate has already been cached, no action is necessary because the broadcast receiver may verify the signature on this and subsequent broadcasts from the broadcasting UAS using the cached authorization certificate. If the certificate has not been cached, the broadcast receiver may elect to temporarily store the unverified message and verify it once the broadcast receiver has obtained the UAS authorization certificate from the UAS's own broadcast. In some embodiments, the UAS may also drop the unverified message and only verify subsequent UAS broadcasts once it has obtained the UAS certificate.

When network-connected, a broadcast receiver may also query an authentication service to 1) obtain a copy of the certificate using its HashedId8 identifier the receiver obtained from a signed broadcast, or 2) relay the signed message to the service for proxy-verification. In a flight in which the UAS is transitioning in and out of network connectivity, both options may be useful. For example, in some instances of network connectivity, broadcast receivers may elect to cross-correlate authenticated UAS Broadcasts with authentication from the authentication service.

When network-disconnected, the broadcast receiver has no access to third party authentication services, and therefore there may be a need to trust cryptographic identities in the UAS flight environment. Public keys transmitted outside of a certificate should not be trusted because they can originate from anywhere and cannot be properly verified outside of a trusted certificate issuance process.

Figure 16:
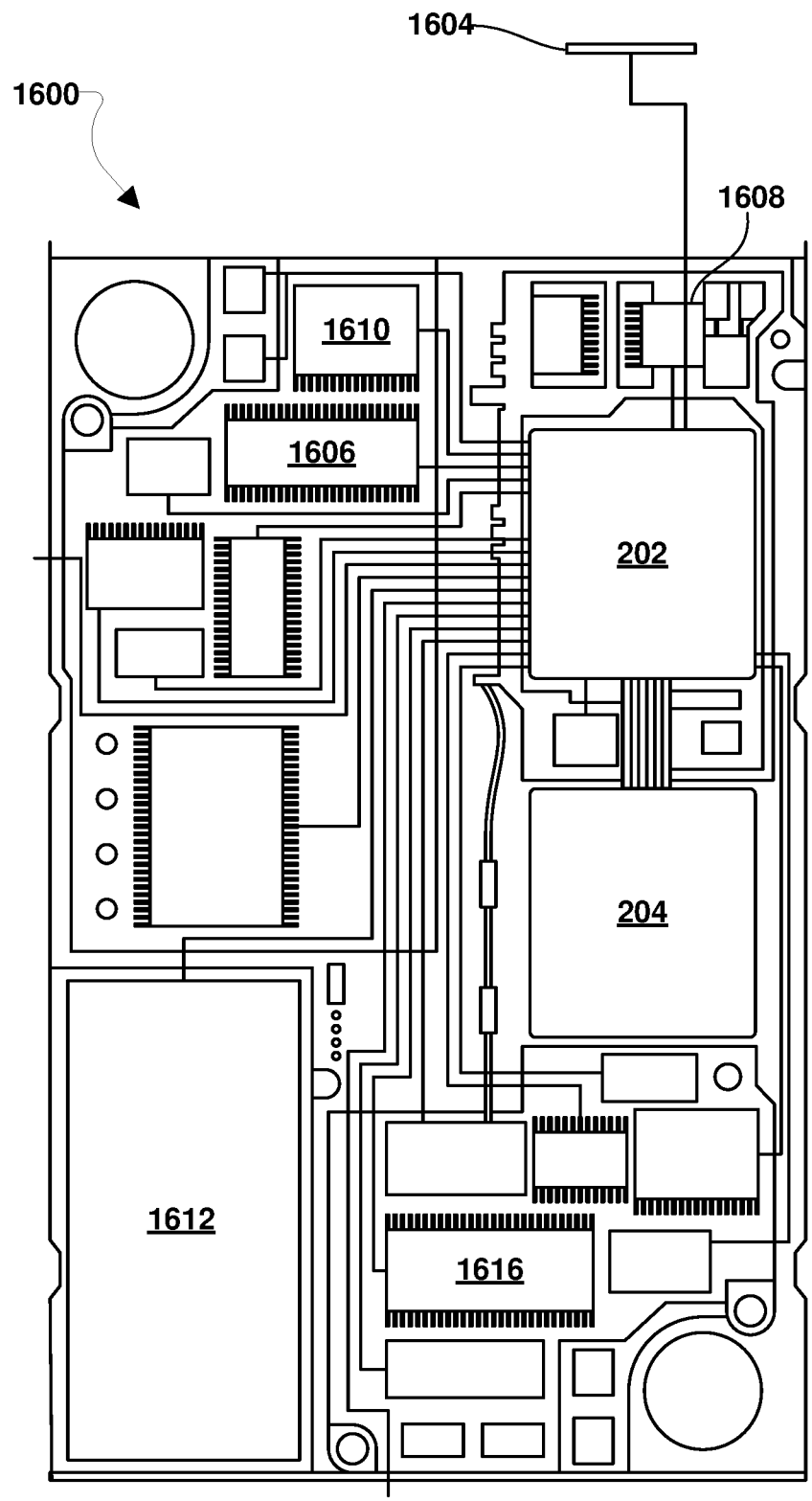
FIG. 16 is a component block diagram of an IoT device suitable for use in accordance with various embodiments of the present disclosure.

The various embodiments may be implemented on a variety of IoT devices, an example in the form of a circuit board for use in a device is illustrated in FIG. 16. With reference to FIGS. 1-16, an IoT device 1600 may include a first SOC 202 (e.g., a SOC-CPU) coupled to a second SOC 204 (e.g., a 5G capable SOC). The first and second SOCs 202, 204 may be coupled to internal memory 1606. Additionally, the IoT device 1600 may include or be coupled to an antenna 1604 for sending and receiving wireless signals from a cellular telephone transceiver 1608 or within the second SOC 204. The antenna 1604 and transceiver 1608 and/or second SOC 204 may support communications using various RATs, including NB-IoT, CIoT, GSM, BlueTooth, Wi-Fi, VoLTE, etc.

A IoT device 1600 may also include a sound encoding/decoding (CODEC) circuit 1610, which digitizes sound received from a microphone into data packets suitable for wireless transmission and decodes received sound data packets to generate analog signals that are provided to a speaker to generate sound in support of voice or VoLTE calls. Also, one or more of the processors in the first and second SOCs 202, 204, wireless transceiver 1608 and CODEC 1610 may include a digital signal processor (DSP) circuit (not shown separately).

Some IoT devices may include an internal power source, such as a battery 1612 configured to power the SOCs and transceiver(s). Such IoT devices may include power management components 1616 to manage charging of the battery 1612.

Figure 17:
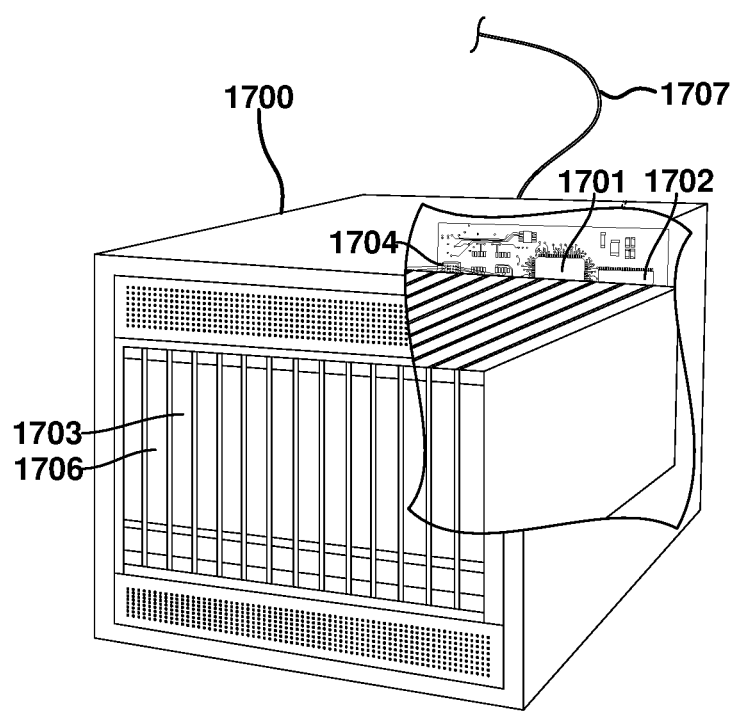
FIG. 17 is a component diagram of an example server suitable for use with the various embodiments.

The various embodiments (including, but not limited to, embodiments discussed above with reference to FIGS. 1-15) may also be implemented on any of a variety of commercially available server devices, such as the server 1700 illustrated in FIG. 17. With reference to FIGS. 1-17, such a server 1700 typically includes a processor 1701 coupled to volatile memory 1702 and a large capacity nonvolatile memory, such as a disk drive 1703. The server 1700 may also include a floppy disc drive, compact disc (CD) or digital versatile disc (DVD) drive 1706 coupled to the processor 1701. The server 1700 may also include one or more network transceivers 1704, such as a network access port, coupled to the processor 1701 for establishing network interface connections with a communication network 1707, such as a local area network coupled to other announcement system computers and servers, the Internet, the public switched telephone network, and/or a cellular network (e.g., CDMA, TDMA, GSM, PCS, 3G, 4G, 5G, LTE, or any other type of cellular network).

Figure 18:
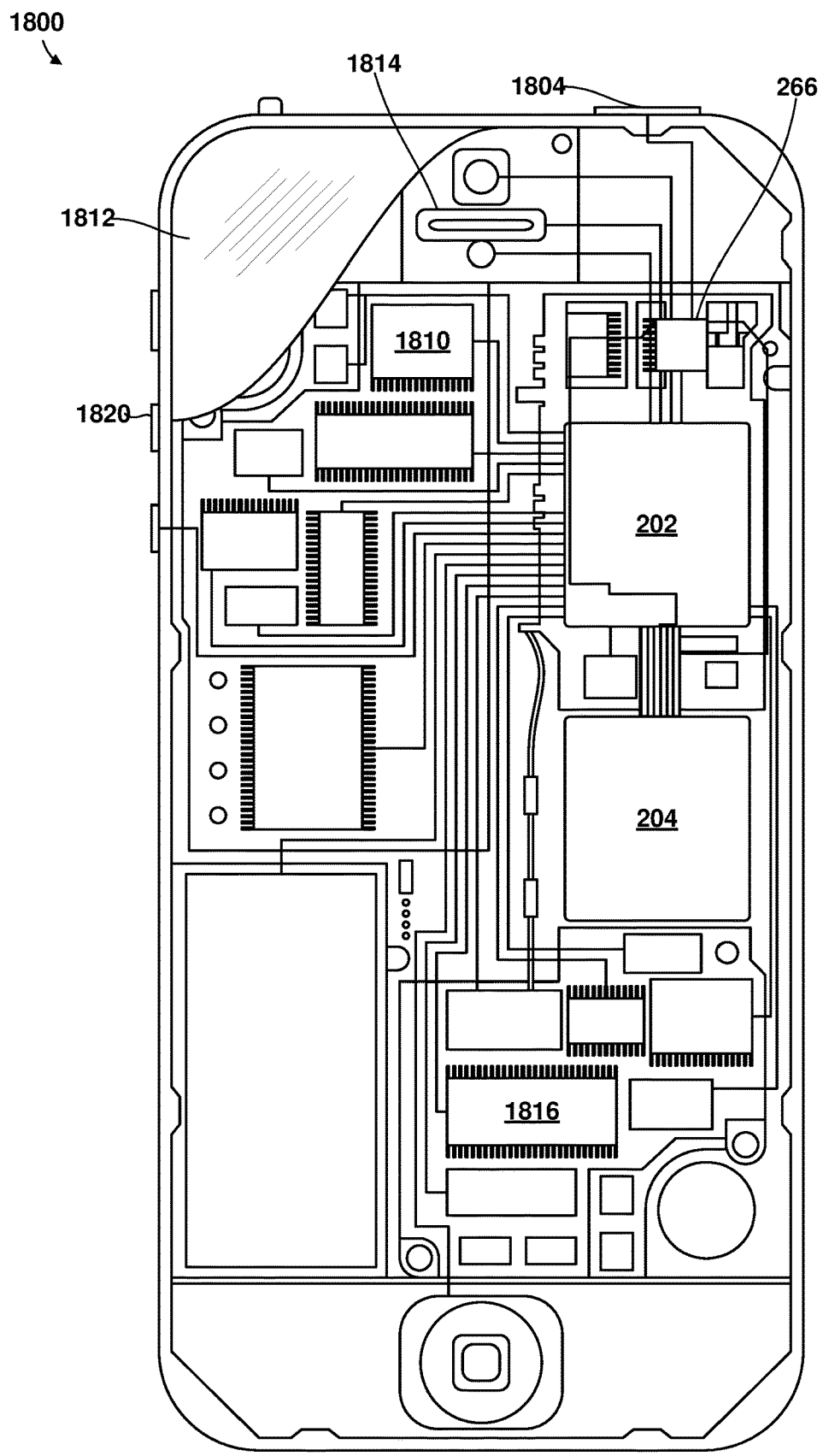
FIG. 18 is a component block diagram of a wireless device suitable for use with various embodiments.

FIG. 18 is a component block diagram of a wireless device 1800 suitable for use with various embodiments. With reference to FIGS. 1-18, various embodiments may be implemented on a variety of wireless device 1800 (e.g., the wireless device 120a-120f, 200, 270, 320 402, 407a-d, 290), an example of which is illustrated in FIG. 18 in the form of a smartphone. The wireless device 1800 may include a first SOC 202 (e.g., a SOC-CPU) coupled to a second SOC 204 (e.g., a 5G capable SOC). The first and second SOCs 202, 204 may be coupled to internal memory, 1816, a display

1812, and to a speaker 1814. Additionally, the wireless device 1800 may include an antenna 1804 for sending and receiving electromagnetic radiation that may be connected to a wireless transceiver 266 coupled to one or more processors in the first and/or second SOCs 202, 204. The wireless device 1800 may also include menu selection buttons or rocker switches 1820 for receiving user inputs.

The wireless device 1800 also includes a sound encoding/decoding (CODEC) circuit 1810, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1810 may include a digital signal processor (DSP) circuit (not shown separately).

The processors of the IoT device 1600, server 1700, and wireless device 1800 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., Bluetooth, Wi-Fi, third generation partnership project (3GPP), LTE systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 600, 650, 660, 900, 1100, 1300, and/or 1500 may be substituted for or combined with one or more operations of the methods 600, 650, 660, 900, 1100, 1300, and/or 1500, and vice versa.

Implementation examples are described in the following paragraphs. While some of the following implementation examples are described in terms of example methods, further example implementations may include: the example methods discussed in the following paragraphs implemented by a device, such as a wireless device, broadcast receiver device, or any other type device, including a processor configured to perform operations of the example methods; the example methods discussed in the following paragraphs implemented by a device, such as a wireless device, broadcast receiver device, or any other type device, including means for performing functions of the example methods; and the example methods discussed in the following paragraphs implemented as a non-transitory processor-readable storage medium having stored thereon processor-executable instructions configured to cause a processor of a device, such as a wireless device, broadcast receiver device, or any other type device, to perform the operations of the example methods.

Example 1. A method for providing broadcast communications security performed by a processor of a device, including: generating a beacon type message; cryptographically signing the beacon type message at least in part using a certificate to generate a signed beacon message; and sending the signed beacon type message in one or more broadcast transmissions from the device.

Example 2. The method of example 1, in which cryptographically signing the beacon type message at least in part using the certificate to generate the signed beacon type message includes: generating a message payload; generating a digital signature using at least in part the certificate and a private key of the device, the private key corresponding to a public key of the device associated with the certificate; generating a certificate identifying hash of the certificate; and embedding the message payload, the digital signature, and the certificate identifying hash in the beacon type message to generate the signed beacon type message.

Example 3. The method of example 2, in which: the message payload includes a device message; generating the digital signature using at least in part the certificate and the private key includes: determining a signing timestamp;

generating a hash of the certificate; combining the device message, the signing timestamp, and the hash of the certificate to form an authenticated payload; and generating the digital signature using at least in part the authenticated payload, the certificate, and the private key; generating the certificate identifying hash of the certificate includes selecting a byte portion of the hash of the certificate to be the certificate identifying hash; and embedding the message payload, the digital signature, and the certificate identifying hash in the beacon type message to generate the signed beacon type message includes embedding the message payload, the signing timestamp, the digital signature, and the certificate identifying hash in the beacon type message to generate the signed beacon type message.

Example 4. The method of example 3, in which the byte portion is: a least significant eight bytes of the hash of the certificate; a most significant eight bytes of the hash of the certificate; a least significant or most significant sixteen bytes of the hash of the certificate; a least significant or most significant twenty-four bytes of the hash of the certificate; a byte portion smaller than the hash of the certificate; or the full hash of the certificate.

Example 5. The method of example 2, in which: generating the message payload includes: determining a signing timestamp; determining an individual message or message set of one or more device messages; generating a hash of a combination of the message or message set and the signing timestamp; selecting a first byte portion of the hash of the combination of the message or message set and the signing timestamp as the message payload; generating the digital signature using at least in part the certificate and the private key includes generating the digital signature using at least in part the first byte portion, the certificate, and the private key; generating the certificate identifying hash of the certificate includes: generating a hash of the certificate; and selecting a second byte portion of the hash of the certificate to be the certificate identifying hash; and embedding the message payload, the digital signature, and the certificate identifying hash in the beacon type message to generate the signed beacon type message includes embedding the message payload, the signing timestamp, the digital signature, and the certificate identifying hash in the beacon type message to generate the signed beacon type message.

Example 6. The method of example 5, in which: the first byte portion is a full or partial output of the hash of the combination of the message or message set and the signing timestamp; and the second byte portion is a subset or complete hash of the certificate.

Example 7. The method of any of examples 1-6, in which the signed beacon type message further includes the certificate.

Example 8. The method of any of examples 1-6, further including: generating a second beacon type message including the certificate, certificate trust chain information or certificate revocation information; and sending the second beacon type message in another one or more broadcast transmissions from the device.

Example 9. The method of any of examples 1-8, in which the beacon type messages are Bluetooth beacon frames.

Example 10. The method of example 9, in which Bluetooth beacon frames are Bluetooth 4 beacon frames or Bluetooth 5 beacons.

Example 11. The method of any of examples 1-8, in which the beacon type messages are Wi-Fi beacon frames.

Example 12. The method of example 11, in which the Wi-Fi beacon frames are Wi-Fi Neighbor Awareness Networking (NAN) service discovery frames.

Example 13. The method of any of examples 1-8, further including: generating an unsigned beacon type message pointing to the signed beacon type message; and sending the unsigned beacon type message in one or more broadcast transmissions on a different channel than a channel of the one or more broadcast transmissions of the signed beacon type message.

Example 14. The method of example 13, in which the signed beacon type message is a Bluetooth 5 extended advertising frame or a Wi-Fi Neighbor Awareness Networking (NAN) service discovery frame.

Example 15. The method of any of examples 1-14, in which the message payload, the digital signature, and the certificate identifying hash have a combined size of 109 bytes or less or a combined size of 125 bytes or less.

Example 16. The method of any of examples 1-15, in which the signed message payload has a size of 25 bytes.

Example 17. The method of any of examples 1-16, in which the device is an Internet of Things (IoT) device, smart phone, tablet, an autonomous vehicle, or a semi-autonomous vehicle, a robot, or a roadside infrastructure device.

Example 18. The method of any of examples 1-16, in which the device is an unmanned aerial system (UAS).

Example 19. The method of example 18, in which the device messages are ASTM F3411-19 messages.

Example 20. The method of any of examples 18-19, in which the signed beacon type message is an ASTM F3411-19 authentication message or an IEEE 1609.2 signed message contained within an ASTM F3411-19 compliant frame.

Example 21. The method of any of examples 18-21, in which a bit portion of the certificate hash corresponds to a universally unique identifier (UUID) or session identifier (session ID) assigned to the UAS, its operator or a tuple of the UAS and its operator.

Example 22. The method of example 21, in which the bit portion is a first or last 64, 96, 100, or 128 bits of the certificate hash.

Example 23. The method of any of examples 18-22, in which the certificate includes an embedded permission bit indicating a type, role, and/or permission of the UAS or its operator.

Example 24. The method of any of examples 18-23, in which the signed beacon type message includes a message consistency indication.

Example 25. The method of any of examples 1-24, in which the certificate is an implicit format certificate not including a full version of the public key.

Example 26. The method of example 25, in which the certificate includes a public key reconstruction value, the public key reconstruction value configured to allow the public key to be reconstructed.

Example 27. The method of any of examples 1-26, in which sending the signed beacon type message in one or more broadcast transmission from the device includes sending the signed beacon type message in a plurality of broadcast pages or broadcast frames from the device.

Example 28. The method of example 27, in which the plurality of broadcast pages or broadcast frames from the device is five broadcast pages or broadcast frames from the device.

Example 29. A method for authenticating broadcast communications performed by a processor of a broadcast receiver device, including: receiving a signed beacon type message from a device, the signed beacon type message cryptographically signed at least in part using a certificate of the device; determining whether the signed beacon type message is valid based at least in part on the certificate;

processing the signed beacon type message in response to determining that the signed beacon type message is valid; and discarding the signed beacon type message in response to determining that the signed beacon type message is not valid.

Example 30. The method of example 29, in which the signed beacon type message includes a certificate identifying hash of the certificate, the method further including: determining an identity of the certificate based at least in part on the certificate identifying hash of the certificate; and retrieving the certificate based on the determined identity of the certificate.

Example 31. The method of example 30, in which retrieving the certificate based on the determined identity of the certificate includes retrieving the certificate from a certificate authority server remote from the broadcast receiver device.

Example 32. The method of example 30, in which retrieving the certificate based on the determined identity of the certificate includes retrieving the certificate from the memory of the broadcast receiver device.

Example 33. The method of example 32, in which the certificate was received from the device in another beacon type message.

Example 34. The method of any of examples 29-33, in which: the device is a device according to any of examples 1-28; the signed beacon type message is a signed beacon type message according to any of examples 1-28; the certificate is a certificate according to any of examples 1-28; and/or the certificate identifying hash of the certificate is a certificate identifying hash of the certificate according to any of examples 1-28.

Example 35. The method of any of examples 29-34, in which the broadcast receiver device is a law enforcement broadcast receiver device.

Example 36. The method of any of examples 29-35, in which processing the signed beacon type message in response to determining that the signed beacon type message is valid includes determining an unmanned aerial vehicle identity and/or operator of an unmanned aerial vehicle identity at least in part using the signed beacon type message.

Example 37. The method of example 36, in which a broadcast identifier is contained within a signing certificate and the broadcast identifier is a cryptographic output of a keyed hash, message authentication code algorithm or public key signing algorithm using the UAS and/or UAS operator identifying information as inputs.

Example 38. The method of example 37, in which the keyed hash, message authentication code or public key signing algorithm is invoked repeatedly with a unique counter input and/or nonce, and each output constitutes another identifier of a short-lived (session ID) Broadcast ID certificate associating the UAS and UAS operator.

Example 39. The method of example 2 or 34, in which the message payload is an Automatic Dependent Surveillance-Broadcast (ADS-B) message to be broadcast over a small beacon or service advertisement frame.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non- The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for providing broadcast communications security performed by a processor of a device, comprising:
generating a beacon type message;
cryptographically signing the beacon type message at least in part using a certificate to generate a signed beacon message, wherein cryptographically signing the beacon type message at least in part using the certificate to generate the signed beacon type message comprises:
generating a message payload;
generating a digital signature using at least in part the certificate and a private key of the device, the private key corresponding to a public key of the device associated with the certificate, wherein generating the digital signature using at least in part the certificate and the private key comprises:
generating a hash of the certificate;
combining the device message, a determined signing timestamp, and the hash of the certificate to form an authenticated payload; and
generating the digital signature using at least in part the authenticated payload, the certificate, and the private key;
generating a certificate identifying hash of the certificate; and
embedding the message payload, the digital signature, and the certificate identifying hash in the beacon type message to generate the signed beacon type message; and
sending the signed beacon type message in one or more broadcast transmissions from the device.

2. The method of claim 1, wherein:
the message payload comprises a device message;
generating the certificate identifying hash of the certificate comprises selecting a byte portion of the hash of the certificate to be the certificate identifying hash; and
embedding the message payload, the digital signature, and the certificate identifying hash in the beacon type message to generate the signed beacon type message comprises embedding the message payload, the signing timestamp, the digital signature, and the certificate identifying hash in the beacon type message to generate the signed beacon type message.

3. The method of claim 1, wherein:
generating the message payload comprises:
determining a signing timestamp;
determining an individual message or message set of one or more device messages;
generating a hash of a combination of the message or message set and the signing timestamp;
selecting a first byte portion of the hash of the combination of the message or message set and the signing timestamp as the message payload;
generating the digital signature using at least in part the certificate and the private key comprises using at least in part the first byte portion as the authenticated payload;
generating the certificate identifying hash of the certificate comprises:
generating a hash of the certificate; and
selecting a second byte portion of the hash of the certificate to be the certificate identifying hash; and
embedding the message payload, the digital signature, and the certificate identifying hash in the beacon type message to generate the signed beacon type message comprises embedding the message payload, the signing timestamp, the digital signature, and the certificate identifying hash in the beacon type message to generate the signed beacon type message.

4. The method of claim 3, wherein:
the first byte portion is a full or partial output of the hash of the combination of the message or message set and the signing timestamp; and
the second byte portion is a subset or complete hash of the certificate.

5. The method of claim 1, wherein the signed beacon type message further includes the certificate or the certificate is included in a different signed beacon type message.

6. The method of claim 1, further comprising:
generating a second beacon type message including the certificate, certificate trust chain information or certificate revocation information; and
sending the second beacon type message in another one or more broadcast transmissions from the device.

7. The method of claim 1, further comprising:
generating an unsigned beacon type message pointing to the signed beacon type message; and
sending the unsigned beacon type message in one or more broadcast transmissions on a different channel than a channel of the one or more broadcast transmissions of the signed beacon type message.

8. The method of claim 7, wherein the signed beacon type message is a Bluetooth 5 extended advertising frame or a Wi-Fi Neighbor Awareness Networking (NAN) service discovery frame.

9. The method of claim 1, wherein:
the device is an unmanned aerial system (UAS); and
the device messages are ASTM F3411-19 messages.

10. The method of claim 9, wherein the signed beacon type message is an ASTM F3411-19 authentication message or an IEEE 1609.2 signed message contained within an ASTM F3411-19 compliant frame.

11. The method of claim 9, wherein a hit portion of the certificate hash corresponds to a universally unique identifier (UUID) or session identifier (session ID) assigned to the UAS, its operator or a tuple of the UAS and its operator.

12. The method of claim 11, wherein the hit portion is a first or last 64, 92, 120 or 128 bits of the certificate hash.

13. The method of claim 9, wherein:
the certificate includes an embedded permission bit indicating a type, role, and/or permission associated with the UAS or its operator; and
the signed beacon type message includes a message consistency indication.

14. The method of claim 1, wherein the certificate is an implicit format certificate not including a full version of the public key.

15. The method of claim 1, wherein the certificate includes a public key reconstruction value, the public key reconstruction value configured to allow the public key to be reconstructed.

16. The method of claim 1, wherein the message payload is an Automatic Dependent Surveillance—Broadcast (ADS-B) message to be broadcast over a small beacon or service advertisement frame.

17. The method of claim 1, wherein sending the signed beacon type message in one or more broadcast transmissions from the device comprises sending the signed beacon type message in a plurality of broadcast pages or broadcast frames from the device.

18. A method for authenticating broadcast communications performed by a processor of a broadcast receiver device, comprising:
receiving a signed beacon type message from a device, the signed beacon type message cryptographically signed at least in part using a certificate of the device;
retrieving the certificate based at least in part on a certificate identifying hash of the certificate, wherein retrieving the certificate comprises retrieving the certificate from memory of the broadcast receiver device;
processing the signed beacon type message in response to determining that the signed beacon type message is valid based at least in part on the certificate; and
discarding the signed beacon type message in response to determining that the signed beacon type message is not valid based at least in part on the certificate.

19. The method of claim 18, wherein the certificate was received from the device in another beacon type message.

20. The method of claim 18, wherein processing the signed beacon type message in response to determining that the signed beacon type message is valid comprises determining an unmanned aerial vehicle identity or operator of an unmanned aerial vehicle identity at least in part using the signed beacon type message.

21. The method of claim 20, wherein a broadcast identifier is contained within a signing certificate and the broadcast identifier is a cryptographic output of a keyed hash, message authentication code algorithm or public key signing algorithm.

22. The method of claim 21, wherein the keyed hash, message authentication code or public key signing algorithm is invoked repeatedly with a unique counter input or nonce, and each output constitutes another identifier of a short-lived broadcast ID certificate associating an unmanned aerial vehicle and unmanned aerial vehicle operator.

23. A device, comprising:
a processor configured with processor-executable instructions to:
generate a beacon type message;
cryptographically sign the beacon type message at least in part using a certificate to generate a signed beacon message, wherein cryptographically signing the beacon type message at least in part using the certificate to generate the signed beacon type message comprises:
generating a message payload;
generating a digital signature using at least in part the certificate and a private key of the device, the private key corresponding to a public key of the device associated with the certificate, wherein generating the digital signature using at least in part the certificate and the private key comprises:
generating a hash of the certificate;
combining the device message, a determined signing timestamp, and the hash of the certificate to form an authenticated payload; and
generating the digital signature using at least in part the authenticated payload, the certificate, and the private key;
generating a certificate identifying hash of the certificate; and
embedding the message payload, the digital signature, and the certificate identifying hash in the beacon type message to generate the signed beacon type message; and
send the signed beacon type message in one or more broadcast transmissions from the device.

24. The device of claim 23, wherein:
the message payload comprises a device message;
the processor is further configured with processor-executable instructions to generate the certificate identifying hash of the certificate by selecting a byte portion of the hash of the certificate to be the certificate identifying hash; and
the processor is further configured with processor-executable instructions to embed the message payload, the digital signature, and the certificate identifying hash in the beacon type message to generate the signed beacon type message by embedding the message payload, the signing timestamp, the digital signature, and the certificate identifying hash in the beacon type message to generate the signed beacon type message.

25. The device of claim 23, wherein:
the processor is further configured with processor-executable instructions to generate the message payload by:
determining a signing timestamp;
determining an individual message or message set of one or more device messages;
generating a hash of a combination of the message or message set and the signing timestamp;
selecting a first byte portion of the hash of the combination of the message or message set and the signing timestamp as the message payload;
the processor is further configured with processor-executable instructions to generate the digital signature using at least in part the first byte portion as the authenticated payload;
the processor is further configured with processor-executable instructions to generate the certificate identifying hash of the certificate by:
generating a hash of the certificate; and
selecting a second byte portion of the hash of the certificate to be the certificate identifying hash; and
the processor is further configured with processor-executable instructions to embed the message payload, the digital signature, and the certificate identifying hash in the beacon type message to generate the signed beacon type message by embedding the message payload, the signing timestamp, the digital signature, and the certificate identifying hash in the beacon type message to generate the signed beacon type message.

26. The device of claim 25, wherein:
the first byte portion is a full or partial output of the hash of the combination of the message or message set and the signing timestamp; and
the second byte portion is a subset or complete hash of the certificate.

27. The device of claim 23, wherein the signed beacon type message further includes the certificate or the certificate is included in a different signed beacon type message.

28. The device of claim 23, wherein the processor is further configured with processor-executable instructions to:
generate a second beacon type message including the certificate, certificate trust chain information or certificate revocation information; and
send the second beacon type message in another one or more broadcast transmissions from the device.

29. The device of claim 23, wherein the processor is further configured with processor-executable instructions to:
generate an unsigned beacon type message pointing to the signed beacon type message; and
send the unsigned beacon type message in one or more broadcast transmissions on a different channel than a channel of the one or more broadcast transmissions of the signed beacon type message.

30. The device of claim 29, wherein the signed beacon type message is a Bluetooth 5 extended advertising frame or a Wi-Fi Neighbor Awareness Networking (NAN) service discovery frame.

31. The device of claim 23, wherein:
the device is an unmanned aerial system (UAS); and
the device messages are ASTM F3411-19 messages.

32. The device of claim 31, wherein the signed beacon type message is an ASTM F3411-19 authentication message or an IEEE 1609.2 signed message contained within an ASTM F3411-19 compliant frame.

33. The device of claim 31, wherein a bit portion of the certificate hash corresponds to a universally unique identifier (UUID) or session identifier (session ID) assigned to the UAS, its operator or a tuple of the UAS and its operator.

34. The device of claim 33, wherein the bit portion is a first or last 64, 92, 120 or 128 bits of the certificate hash.

35. The device of claim 31, wherein:
the certificate includes an embedded permission bit indicating a type, role, and/or permission associated with the UAS or its operator; and
the signed beacon type message includes a message consistency indication.

36. The device of claim 23, wherein the certificate is an implicit format certificate not including a full version of the public key.

37. The device of claim 23, wherein the certificate includes a public key reconstruction value, the public key reconstruction value configured to allow the public key to be reconstructed.

38. The device of claim 23, wherein the message payload is an Automatic Dependent Surveillance—Broadcast (ADS-B) message to be broadcast over a small beacon or service advertisement frame.

39. The device of claim 23, wherein the processor is configured with processor-executable instructions to send the signed beacon type message in one or more broadcast transmissions from the device by sending the signed beacon type message in a plurality of broadcast pages or broadcast frames from the device.

40. A broadcast receiver device, comprising:
a processor configured with processor-executable instructions to:
receive a signed beacon type message from a device, the signed beacon type message cryptographically signed at least in part using a certificate of the device;
retrieve the certificate based at least in part on a certificate identifying hash of the certificate, wherein retrieving the certificate comprises retrieving the certificate from memory of the broadcast receiver device;
retrieve the certificate based at least in part on a certificate identifying hash of the certificate, wherein retrieving the certificate comprises retrieving the certificate from memory of the broadcast receiver device;
process the signed beacon type message in response to determining that the signed beacon type message is valid based at least in part on the certificate; and
discard the signed beacon type message in response to determining that the signed beacon type message is not valid based at least in part on the certificate.

41. The broadcast receiver device of claim 40, wherein the certificate was received from the device in another beacon type message.

42. The broadcast receiver device of claim 40, wherein the processor is further configured with processor-executable instructions to process the signed beacon type message in response to determining that the signed beacon type message is valid by determining an unmanned aerial vehicle identity or operator of an unmanned aerial vehicle identity at least in part using the signed beacon type message.

43. The broadcast receiver device of claim 42, wherein a broadcast identifier is contained within a signing certificate and the broadcast identifier is a cryptographic output of a keyed hash, message authentication code algorithm or public key signing algorithm.

44. The broadcast receiver device of claim 43, wherein the keyed hash, message authentication code or public key signing algorithm is invoked repeatedly with a unique counter input or nonce, and each output constitutes another identifier of a short-lived broadcast ID certificate associating an unmanned aerial vehicle and unmanned aerial vehicle operator.

* * * * *